United States Patent
Nakanishi et al.

(10) Patent No.: US 8,432,518 B2
(45) Date of Patent: Apr. 30, 2013

(54) LIQUID CRYSTAL DISPLAY DEVICE

(75) Inventors: Yohei Nakanishi, Kawasaki (JP); Kunihiro Tashiro, Kawasaki (JP); Katsufumi Ohmuro, Kawasaki (JP); Kazutaka Hanaoka, Kawasaki (JP); Jin Hirosawa, Kawaski (JP); Norio Sugiura, Kawasaki (JP); Kengo Kanii, Himeji (JP); Shota Makimoto, Kawasaki (JP); Naoto Kondo, Imabari (JP); Isao Tsushima, Herts (GB); Tomonori Tanose, Kawasaki (JP); Takashi Takagi, Kawasaki (JP); Tetsuya Fujikawa, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/007,894

(22) Filed: Jan. 17, 2011

(65) Prior Publication Data

US 2011/0109826 A1 May 12, 2011

Related U.S. Application Data

(62) Division of application No. 12/785,215, filed on May 21, 2010, now Pat. No. 7,920,239, which is a division of application No. 12/723,977, filed on Mar. 15, 2010, which is a division of application No. 11/104,309, filed on Apr. 12, 2005, now Pat. No. 7,710,523.

(30) Foreign Application Priority Data

Jan. 6, 2005 (JP) .................................. 2005-001356

(51) Int. Cl.
G02F 1/1337 (2006.01)
G02F 1/1343 (2006.01)

(52) U.S. Cl.
USPC .............. 349/129; 349/39; 349/144; 349/141

(58) Field of Classification Search .................. 349/129, 349/144
See application file for complete search history.

(56) References Cited

U.S. PATENT DOCUMENTS 5,576,858 A * 11/1996 Ukai et al. ...................... 349/42
5,724,111 A 3/1998 Mizobata et al.
(Continued)

FOREIGN PATENT DOCUMENTS

JP 5-232465 9/1993
JP 8-36186 2/1996
(Continued)

OTHER PUBLICATIONS

Office Action issued by the United States Patent and Trademark Office for U.S. Appl. No. 12/723,977, mailed Sep. 29, 2010.
Amendment C filed on Oct. 21, 2010, in response to the Sep. 29, 2010 Office Action issued for U.S. Appl. No. 12/723,977.
(Continued)

Primary Examiner — Wen-Ying P Chen
(74) Attorney, Agent, or Firm — Greer, Burns & Crain, Ltd.

(57) ABSTRACT

A liquid crystal display device including first and second substrates; liquid crystal contained between the substrates; a polymer which determines directions in which liquid crystal molecules tilt; a plurality of gate and data bus lines; and a plurality of picture elements. At least one of the picture elements includes a switching element, and first and second sub picture element electrodes. The first sub picture element electrode connects to the switching element and the second sub picture element electrode connects, via capacitive coupling, to the switching element. The first substrate further includes a control electrode that is connected to the switching element and the first sub picture element electrode. The control electrode is capacitively coupled to the second sub picture element electrode through an insulating film. The area of the second sub picture element electrode is larger than the area of the first sub picture element electrode.

25 Claims, 33 Drawing Sheets

U.S. PATENT DOCUMENTS

| | | | |
|---|---|---|---|
| 5,777,700 A * | 7/1998 | Kaneko et al. | 349/39 |
| 6,078,367 A * | 6/2000 | Satou | 349/46 |
| 6,512,564 B1 | 1/2003 | Yoshida et al. | |
| 6,747,712 B2 | 6/2004 | Noh et al. | |
| 6,850,302 B2 | 2/2005 | Song | |
| 7,113,241 B2 | 9/2006 | Hanaoka | |
| 7,379,143 B2 | 5/2008 | Lyu | |
| 7,697,093 B2 | 4/2010 | Chan et al. | |
| 7,710,523 B2 | 5/2010 | Nakanishi et al. | |
| 2002/0075437 A1 | 6/2002 | Fukumoto et al. | |
| 2003/0043336 A1 | 3/2003 | Sasaki et al. | |
| 2003/0058374 A1 | 3/2003 | Takeda et al. | |
| 2003/0071774 A1 | 4/2003 | Hanaoka et al. | |
| 2003/0071952 A1 | 4/2003 | Yoshida et al. | |
| 2003/0112394 A1 | 6/2003 | Yoshida et al. | |
| 2003/0137628 A1 | 7/2003 | Nagaoka | |
| 2003/0160750 A1 | 8/2003 | Ueda et al. | |
| 2004/0119898 A1 | 6/2004 | Song | |
| 2005/0036091 A1 | 2/2005 | Song | |
| 2005/0078253 A1 | 4/2005 | Kim et al. | |
| 2006/0023137 A1 | 2/2006 | Kamada et al. | |

FOREIGN PATENT DOCUMENTS

| | | |
|---|---|---|
| JP | 8-338993 | 12/1996 |
| JP | 10-239692 | 9/1998 |
| JP | 11-95221 | 4/1999 |
| JP | 11-133429 | 5/1999 |
| JP | 2000-193938 | 7/2000 |
| JP | 2001-281690 | 10/2001 |
| JP | 2002-169159 | 6/2002 |
| JP | 2003-149647 | 5/2003 |
| JP | 2003-156731 | 5/2003 |
| JP | 2003-270653 | 9/2003 |
| JP | 2003-315781 | 11/2003 |
| KR | 2003-0019080 | 3/2003 |
| KR | 2003-0030822 | 4/2003 |
| TW | 591278 | 6/2004 |

OTHER PUBLICATIONS

Office Action issued by the United States Patent and Trademark Office for U.S. Appl. No. 12/723,977, mailed Dec. 27, 2010.
Amendment D filed on Jun. 21, 2011, in response to the Dec. 27, 2010 Office Action issued for U.S. Appl. No. 12/723,977.
Office Action issued by the United States Patent and Trademark Office for U.S. Appl. No. 12/723,977, mailed Jul. 21, 2011.
Amendment E filed on Dec. 21, 2011, in response to the Jul. 21, 2011 Office Action issued for U.S. Appl. No. 12/723,977.
Office Action issued by the United States Patent and Trademark Office for U.S. Appl. No. 13/007,908, mailed Mar. 29, 2011.
Amendment A filed on Jun. 27, 2011, in response to the Mar. 29, 2011 Office Action issued for U.S. Appl. No. 13/007,908.
Office Action issued by the United States Patent and Trademark Office for U.S. Appl. No. 13/007,908, mailed Jul. 21, 2011.
Amendment B filed on Dec. 20, 2011, in response to the Jul. 21, 2011 Office Action issued for U.S. Appl. No. 13/007,908.
Amendment A filed Jun. 27, 2011, in response to the Mar. 29, 2011 Office Action issued for U.S. Appl. No. 13/007,908.
Office Action issued by the United States Patent and Trademark Office for U.S. Appl. No. 13/069,640, mailed Jun. 16, 2011.
Amendment A filed on Oct. 14, 2011, in response to the Jun. 16, 2011 Office Action issued for U.S. Appl. No. 13/069,640.
Notice of Allowance issued by the United States Patent and Trademark Office for U.S. Appl. No. 13/007,908, mailed Feb. 23, 2012.
Notice of Allowance issued by the United States Patent and Trademark Office for U.S. Appl. No. 13/069,640, mailed Feb. 7, 2012.
Office Action issued by the United States Patent and Trademark Office for U.S. Appl. No. 12/979,060, mailed Mar. 30, 2011.
Notice of Allowance issued by the United States Patent and Trademark Office for U.S. Appl. No. 12/979,060, mailed Jul. 27, 2011.
Notice of Allowance issued by the United States Patent and Trademark Office for U.S. Appl. No. 12/979,060, mailed Nov. 15, 2011.

* cited by examiner

WITHOUT BLACK
MATRICES   INTERVAL 7 μm

WITHOUT BLACK
MATRICES   INTERVAL 5 μm

WITH BLACK
MATRICES   INTERVAL 7 μm

170cd/m²

WITH BLACK
MATRICES   INTERVAL 5 μm

181cd/m²

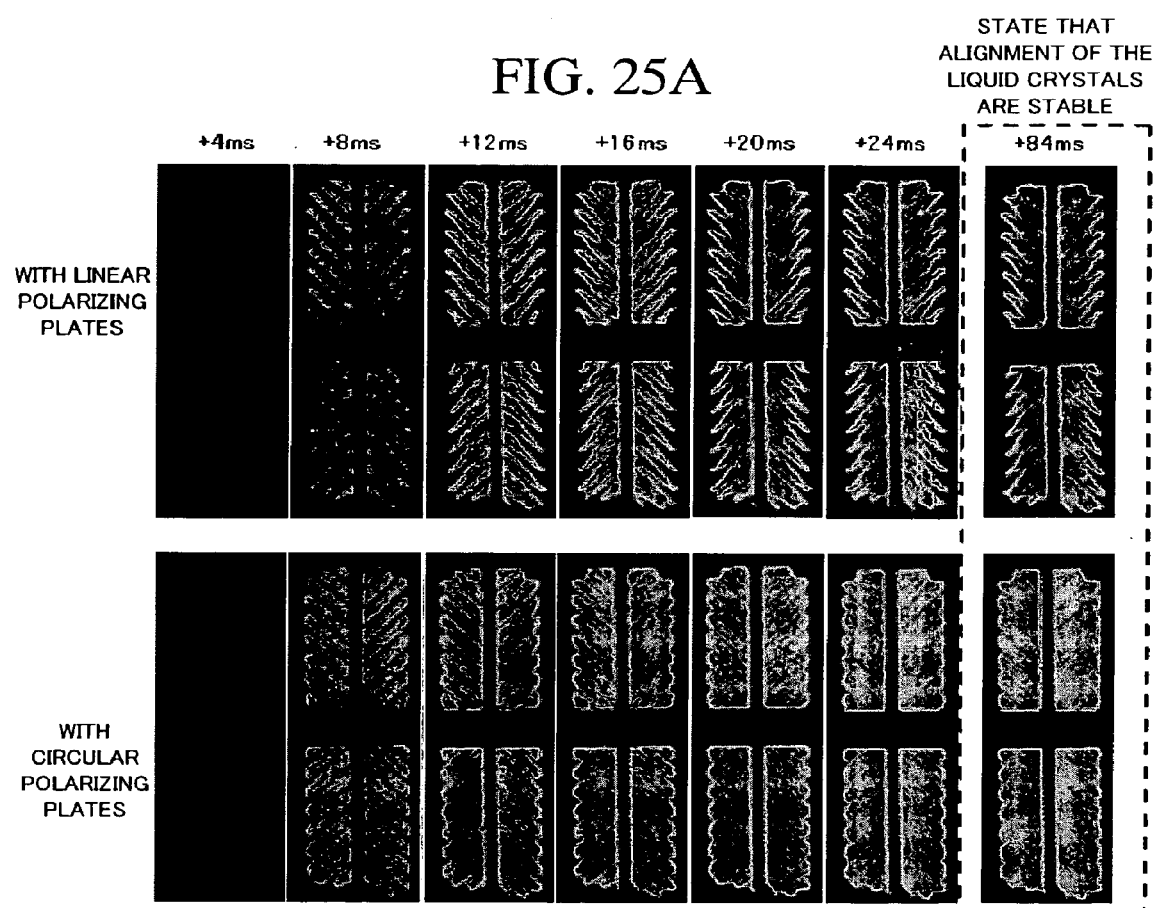

LIQUID CRYSTAL DISPLAY DEVICE

CROSS-REFERENCE TO RELATED APPLICATIONS

This application is a divisional of application Ser. No. 12/785,215, filed May 21, 2010, which is a Divisional of application Ser. No. 12/723,977, filed Mar. 15, 2010, which is a divisional of application Ser. No. 11/104,309, filed Apr. 12, 2005, now U.S. Pat. No. 7,710,523, which claims priority of Japanese Patent Application No. 2005-001356, filed on Jan. 6, 2005, the contents being incorporated herein by reference.

BACKGROUND OF THE INVENTION

1. Field of the Invention

The present invention relates to a MVA (Multi-domain Vertical Alignment) mode liquid crystal display device, and particularly to a liquid crystal display device in which a polymer for determining a direction in which liquid crystal molecules tilt while voltage is being applied is formed in a liquid crystal layer thereof.

2. Description of the Prior Art

In general, a liquid crystal display device is constituted of: a liquid crystal panel which is fabricated to contain liquid crystal between two substrates thereof; and polarizing plates which are arranged respectively in the two sides of the liquid crystal panel. A picture element electrode is formed in each of picture elements in one substrate of the liquid crystal panel. A common electrode used commonly for the picture elements is formed in the other substrate of the liquid crystal panel. When voltage is applied between the picture element electrode and the common electrode, alignment directions of liquid crystal molecules change depending on the voltage. As a result, this changes an amount of light which passes the liquid crystal panel and the polarizing plates arranged respectively on the two sides of the liquid crystal panel. If applied voltage were controlled for each of the picture elements, a desired image can be displayed on the liquid crystal display device.

With regard to a TN (Twisted Nematic) mode liquid crystal display device which has been heretofore used widely, liquid crystal with positive dielectric anisotropy is used, and liquid crystal molecule is twisted and aligned between the two substrates. However, the TN mode liquid crystal display device has a disadvantage of having insufficient viewing angle characteristics. In other words, with regard to the TN mode liquid crystal display device, tone and contrast are extremely deteriorated when the liquid crystal panel is viewed in an oblique direction. Accordingly, the contrast is reversed in extreme cases.

An IPS (In-Plane Switching) mode liquid crystal display device and a MVA (Multi-domain Vertical Alignment) mode liquid crystal display device have been known as liquid crystal display devices having good viewing angle characteristics. With regard to the IPS mode liquid crystal display device, picture element electrodes shaped like a line and common electrodes shaped like a line are arranged alternately in one of the two substrates. If voltage were applied between one of the picture element electrodes and neighboring one of the common electrodes, the orientations respectively of the liquid crystal molecules change in a plane parallel with a surface of the substrate depending on the voltage.

Although, however, the IPS mode liquid crystal display device is good at viewing angle characteristics, the orientations respectively of the liquid crystal molecules above the picture element electrode and the common electrode cannot be controlled since voltage is applied in a direction which is parallel with the substrate. This brings about a disadvantage that the IPS mode liquid crystal display device substantially has a low aperture ratio, and that the screen of it is dark if a powerful backlight were not used.

With regard to the MVA mode liquid crystal display device, picture element electrodes are formed in one of the two substrates, and a common electrode is formed in the other of the two substrates. In addition, with regard to a generally-used MVA mode liquid crystal display device, bank-shaped protrusions made of dielectric material extending in an oblique direction are formed on the common electrode. Each of the picture element electrodes is provided with slits parallel with the protrusions.

With regard to the MVA mode liquid crystal display device, while voltage is not being applied, the liquid crystal molecules are aligned in a direction perpendicular to the substrates. When voltage is applied between each of the picture element electrodes and the corresponding common electrode, the liquid crystal molecules are aligned to tilt at an angle corresponding to the voltage. In this occasion, a plurality of domains are formed in each of the picture elements by the slits provided into the picture element electrode and by the corresponding bank-shaped protrusions. The directions in which the liquid crystal molecules tilt vary from one domain to another. If the plurality of domains were formed in any one of the picture elements while the directions in which the liquid crystal molecules tilt vary from one domain to another, good viewing angle characteristics can be obtained.

With regard to the aforementioned MVA mode liquid crystal display device, the slits and the protrusions decrease the substantial aperture ratio. Accordingly, the substantial aperture ratio of the MVA mode liquid crystal display device is lower than that of the TN mode liquid crystal display device, although the substantial aperture ratio is not so low as that of the IPS mode liquid crystal display device. For this reason, the MVA mode liquid crystal display device needs a powerful backlight. As a result, this kind of MVA mode liquid crystal display device has hardly been adopted for a notebook personal computer, which requires power consumption to be low.

Japanese Patent Laid-open Official Gazette No. 2003-149647 has disclosed a MVA mode liquid crystal display device which was developed in order to solve the aforementioned problems. FIG. 1 is a plan view showing the MVA mode liquid crystal display device. Incidentally, FIG. 1 shows two picture element regions.

A plurality of gate bus lines 11 extending in the horizontal direction (X-axis direction) and a plurality of data bus lines 12 extending in the vertical direction (Y-axis direction) are formed on one of the two substrates constituting a liquid crystal panel. An insulating film (gate insulating film) is formed in each of the rectangular areas defined by the gate bus lines 11 and the data bus lines 12. This formation electrically isolates the gate bus lines 11 from the data bus lines 12. Each of the rectangular areas defined by the gate bus lines 11 and the data bus lines 12 is a picture element region.

A TFT (thin film transistor) 14 and a picture element electrode 15 are formed in each of the picture element region. As shown in FIG. 1, the TFT 14 uses part of the gate bus line 11 so as to cause the part to function as a gate electrode. A semiconductor film (not illustrated) which functions as an active layer of the TFT 14 is formed above the gate electrode. A drain electrode 14a and a source electrode 14b are connected respectively to the two sides of this semiconductor film in the Y-axis direction. The source electrode 14b of the TFT 14 is electrically connected to the data bus line 12, and the drain electrode 14a is electrically connected to the picture element electrode 15.

In this patent application, out of the two electrodes connected to the semiconductor film which functions as the active layer of the TFT, one electrode to be connected to the data bus line is termed as a source electrode, and the other electrode to be connected to the picture element electrode is termed as a drain electrode.

The picture element electrode 15 is formed of a transparent conductive material such as ITO (Indium-Tin Oxide). Slits 15a are formed in this picture element electrode 15 in order to cause liquid crystal molecules to be aligned in one of four directions when voltage is applied. In other words, the picture element electrode 15 is divided into four domains with the center line in parallel with the X-axis direction and the center line in parallel with the Y-axis direction defined as boundaries. A plurality of slits 15a extending in a direction at an angle of 45 degrees to the X axis are formed in a first domain (upper right domain). A plurality of slits 15a extending in a direction at an angle of 135 degrees to the X axis are formed in a second domain (upper left domain). A plurality of slits 15a extending in a direction at an angle of 225 degrees to the X axis are formed in a third domain (lower left domain). A plurality of slits 15a extending in a direction at an angle of 315 degrees to the X axis are formed in a fourth domain (lower right domain). A vertical alignment film (not illustrated) made of polyimide is formed on the picture element electrode 15.

Black matrices, color filters and a common electrode are formed in the other substrate. The black matrices are made of a metal such as Cr (chromium), or of black resin. The black matrices are arranged respectively in positions, each of which is opposite to any one of the gate bus lines 11, the data bus lines 12 and the TFTs 14. The color filters are classified into three types, such as red, green and blue. Any one of the three types of color filters is arranged in each of the picture elements. The common electrode is made of a transparent conductive material such as ITO, and is formed on the color filters. A vertical alignment film made of polyimide is formed on the common electrode.

A liquid crystal panel is constituted in the following manner. These substrates are arranged to be opposite to each other with spacers (not illustrated) interposed between the two substrates. Liquid crystal with negative dielectric anisotropy is filled between the two substrates. Hereinafter, out of the two substrates constituting the liquid crystal panel, one substrate on which a TFT is formed will be termed as a TFT substrate, and the other substrate which is arranged to be opposite to the TFT substrate will be termed as an opposing substrate.

In the case of the MVA mode liquid crystal display device shown in FIG. 1, the liquid crystal molecules are aligned virtually perpendicularly to the surface of each of the substrates while voltage is not being applied to the picture element electrode 15. When voltage is applied to the picture element electrode 15, the liquid crystal molecules 10 tilt in the directions in which the respective slits 15a extend as schematically shown in FIG. 1. Accordingly, four domains are formed in any of the picture elements while the directions in which the liquid crystal molecules tilt vary from one domain to another. This inhibits light from leaking in oblique directions, and thus securing good viewing angle characteristics.

Changing the subject. In the case of the MVA mode liquid crystal display device shown in FIG. 1, it remains to be determined whether the liquid crystal molecules 10 tilt inwards (in directions of the center of the picture element) or outwards (in directions of the outside of the picture element), immediately after voltage is applied to the picture element electrode 15. First of all, the electric field in extremities of the picture element electrode 15 determines the liquid crystal molecules 10 in extremities of the slits 15a (near the data bus line 12) to tilt inwards. Subsequently, the liquid crystal molecules 10 in positions inwards from the extremities tilt towards the center of the picture element. Then, the liquid crystal molecules 10 in positions further inwards from the extremities tilt towards the center of the picture element. This process is repeated until all the liquid crystal molecules tilt towards the center of the picture element. Accordingly, it takes time for all the liquid crystal molecules 10 in a picture element to complete tilting in predetermined directions. This brings about a problem that the response time is long.

The aforementioned Japanese Patent Laid-open Official Gazette No. 2003-149647 has disclosed that a liquid crystal display device is fabricated in the following manner. First, liquid crystal to which a polymer component (monomer) is added is filled into the space between the pair of the substrates. Then, voltage is applied between the picture element electrode and the common electrode, thereby causing the liquid crystal to align in predetermined directions. Thereafter, beams of ultraviolet light are irradiated to the polymer component, and thereby the polymer component is polymerized. By this, polymer is made in the liquid crystal layer. In the case of the liquid crystal display device thus fabricated, the polymer in the liquid crystal layer determines directions in which the liquid crystal molecules tilt. For this reason, no sooner is voltage applied between the picture element electrode and the common electrode than all of the liquid crystal molecules in the picture element start to tilt in predetermined directions. Accordingly, the response time is reduced to a large extent.

In addition, addition of a polymer component to liquid crystal has been disclosed, also, by Japanese Patent Laid-open Official Gazette No. Hei. 11-95221 and Japanese Patent Laid-open Official Gazette No. Hei. 8-36186.

In general, in the case of a vertical alignment (VA) mode liquid crystal display device, it has been known that the gray-scale brightness characteristics to be observed when the liquid crystal display device is viewed from the front is different from that to be observed when the liquid crystal display device is viewed in an oblique direction. The aforementioned MVA mode liquid crystal display device also has the same defect. FIG. 2 is a diagram showing a gray-scale brightness characteristics to be observed when the MVA mode liquid crystal display device is viewed from the front, and a gray-scale brightness characteristics to be observed when the MVA mode liquid crystal display device is viewed in a direction at an azimuth angle of 90 degrees and at a polar angle of 60 degrees (in a direction downwards diagonally). In FIG. 2, the axis of abscissa represents the gray scale, and the axis of ordinate represents the transmittance. It should be noted that, in this patent application, the center of the liquid crystal panel is defined as the origin of ordinates, an angle between the x axis of the liquid crystal panel and a line along which a line of sight is projected onto the liquid crystal panel is termed as an azimuth angle, and an angle between a normal line of the liquid crystal panel and the line of sight is termed as a polar angle. Brightness between black and white is divided into 256 gray scales in FIG. 2. Each gray scale corresponds to applied voltage to a picture element electrode. The larger the gray scale number is, the larger voltage is applied to the picture element electrode. Furthermore, in FIG. 2, a transmittance is indicated by a value relative to the transmittance (Twhite) which is defined as 1 (one) when white is displayed.

As understood from FIG. 2, in the case of the conventional MVA mode liquid crystal display device, the gray-scale transmittance characteristics to be observed when the liquid crystal display device is viewed from the front is much different from that to be observed when the liquid crystal display device is viewed in an oblique direction. For this reason, the conventional MVA mode liquid crystal display device has a disadvantage that the display quality is deteriorated when viewed in an oblique direction although a preferable display quality can be obtained when viewed from the front. In particular, as understood from FIG. 2, the line representing the gray-scale transmittance characteristics to be observed when the liquid crystal is viewed in the oblique direction undulates to a large extent in comparison with the line representing the gray-scale transmittance characteristics to be observed when the liquid crystal display device is viewed from the front. Accordingly, when middle gray-scales are displayed, the difference in brightness becomes smaller between the viewing from the front and the viewing in the oblique direction. For this reason, a phenomenon occurs in which an image to be viewed in the oblique direction looks whitish (washes out) in comparison with that to be viewed from the front, thus deteriorating the display quality. Moreover, an anisotropy in terms of a refractive index of the liquid crystal has wavelength dependency. For this reason, color to be seen when the conventional MVA mode liquid crystal display device is viewed from the front is much different from that to be seen when the conventional MVA mode liquid crystal display device is viewed in the oblique direction in some cases.

Furthermore, the slits 15a of the picture element electrode 15 as shown in FIG. 1 are formed by use of a photolithography technique. Unevenness of the thickness of a photoresist film and a slight difference (shot irregularity) in exposure during stepper exposure make the widths of the respective slits 15a ununiformed. This causes optical characteristics of the picture element to be irregular, thus constituting a cause of display unevenness. For example, when a display is performed with middle gray scales in the entire surface of the panel, tile-shaped patterns appear in some cases.

Additionally, improvement of the substantial aperture ratio and further reduction in power consumption have been awaited. In addition, in the case of a recent liquid crystal display device, further improvement in its response characteristics has been awaited.

SUMMARY OF THE INVENTION

With the aforementioned matters taken into consideration, an object of the present invention is to provide a MVA mode liquid crystal display device whose substantial aperture ratio is higher so as to be applicable to a notebook personal computer, and which is better at the display quality even when viewed in an oblique direction.

Another object of the present invention is to provide a MVA mode liquid crystal display device whose substantial aperture ratio can be further improved.

Yet another object of the present invention is to provide a MVA mode liquid crystal display device, whose substantial aperture ratio is higher so as to be applicable to a notebook personal computer, which prevents display unevenness from occurring due to a photolithography process, and which accordingly is better at the display quality.

Still another object of the present invention is to provide a MVA mode liquid crystal display device whose substantial aperture ratio is higher so as to be applicable to a notebook personal computer, and which is better at the response characteristics.

The aforementioned problems are solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, a switching element, a first sub picture element electrode and a second sub picture element electrode are formed for each picture element. The first sub picture element electrode is constituted of a plurality of band-shaped microelectrode parts, and a connecting electrode part which electrically connects the microelectrode parts with one another. The second sub picture element electrode is constituted of a plurality of band-shaped microelectrode parts, and a connecting electrode part which electrically connects the microelectrode parts with one another. In the second substrate, a common electrode which is opposite to the first and the second sub picture element electrodes is formed. First voltage is applied to the first sub picture element electrode through the switching element. Second voltage which is lower than the first voltage is applied to the second sub picture element electrode.

In the case of the present invention, voltage, which is lower than that to be applied to the first sub picture element electrode, is applied to the second sub picture element electrode. If there were a plurality of fields whose applied voltages are different from each other in a single picture element in the aforementioned manner, this inhibits a phenomenon (termed as "wash out") in which the screen would otherwise look whitish when being viewed in an oblique direction. Accordingly, the display quality is improved.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, a switching element and a picture element electrode are formed for each picture element. The picture element electrode is constituted of a plurality of band-shaped microelectrode parts and a connecting electrode part which electrically connects the microelectrode parts with one another. The microelectrode part has a notch in a portion of its extremity, the portion being opposite to no neighboring microelectrode part.

Liquid crystal molecules between a microelectrode part and a bus line are aligned in a direction which is different from a direction in which the microelectrode part extends. This causes a dark portion between the microelectrode part and the bus line, thus constituting a cause for decreasing the substantial aperture ratio. If the interval between the microelectrode part and the bus line were made smaller, this makes smaller an area where the dark portion occurs, thud enabling the substantial aperture ratio to be improved. In this case, however, the capacitance between the microelectrode part and the bus line becomes larger. This deteriorates the display quality due to the crosstalk.

Meanwhile, the portion of the extremity of the microelectrode part, which portion is opposite to no neighboring microelectrode part, makes no contribution to aligning the liquid crystal molecules in predetermined directions. In addition, the portion constitutes a cause for increasing a parasitic capacitance between the microelectrode part and the bus line. With this taken into consideration, in the case of the present invention, a notch is provided to the portion of the extremity of the microelectrode part, which portion is opposite to no neighboring microelectrode part. Thereby, the crosstalk can be inhibited from occurring, and the substantial aperture ratio can be improved.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, a switching element and a picture element electrode are formed for each picture element. The picture element electrode is constituted of a plurality of band-shaped microelectrode parts, and a connecting electrode part which electrically connects the microelectrode parts with one another. A shape of an area between two neighboring microelectrode parts, which area is located near the base ends of the two neighboring microelectrode parts, is symmetrical along the center line of the area between two neighboring microelectrode parts.

If the shape of an area between two neighboring microelectrodes, which area is located near the base ends of the two neighboring microelectrode parts, were symmetrical along the center line of the area between two neighboring microelectrode parts as described above, this enables liquid crystal molecules in the area to be aligned in the same direction as the microelectrode parts extend. Thereby, the dark portion is inhibited from occurring, and accordingly the substantial aperture ratio is improved.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, a switching element and a picture element electrode are formed for each picture element. The picture element electrode is constituted of a plurality of band-shaped microelectrode parts, and a connecting electrode part which electrically connects the microelectrode parts with one another. The microelectrode part includes a notch in the portion of the extremity of the microelectrode part, which portion is opposite to no neighboring microelectrode part. A shape of an area between two neighboring microelectrode parts, which area is located near the base ends of the two neighboring microelectrode parts, is symmetrical along the center line of the area between two neighboring microelectrode parts.

In the case of the present invention, alignment disorder of the liquid crystal molecules are inhibited in the area between two neighboring microelectrode parts, which area is located near the base ends of the two neighboring microelectrodes, and also in the area between two neighboring microelectrode parts, which area is located near the extremities of the two neighboring microelectrode parts. Accordingly, the substantial aperture ratio can be further improved. This enables the liquid crystal display device to consume far less electric power.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, each picture element is provided with: a gate bus line, a data bus line, an auxiliary capacitance bus line, a switching element, a first sub picture element electrode, a second picture element electrode, an auxiliary capacitance electrode, control electrodes, and auxiliary capacitance lower electrodes. The gate bus line extends in a direction. The data bus line extends in a direction which crosses the gate bus line. The auxiliary capacitance bus line is in parallel with the gate bus line. The switching element is formed in each of picture element regions defined by the gate bus lines and the data bus lines. The first sub picture element electrode is constituted of a plurality of band-shaped microelectrode parts, and a connecting electrode part which electrically connects the microelectrode parts with one another. The first sub picture element electrode includes a plurality of domain control fields which are different from one another in alignment direction of liquid crystal molecules, and is directly connected with the switching element. The second sub picture element electrode is arranged in the same picture element region as the first sub picture element electrode is, and is constituted of a plurality of band-shaped microelectrode parts, and a connecting electrode part which electrically connects the microelectrode parts with one another. The second sub picture element electrode includes a plurality of domain control fields which are different from one another in alignment direction of liquid crystal molecules. The auxiliary capacitance electrode is arranged in a position opposite to the auxiliary capacitance bus line with a first insulating film interposed therebetween. The control electrodes are connected to the switching element, and are arranged respectively in a position opposite to a boundary between a domain control field of the first sub picture element electrode and a corresponding domain control field of the second sub picture element electrode, and in a position opposite to a boundary between another domain control field of the first sub picture element electrode and another corresponding domain control field of the second sub picture element electrode. The control electrodes are capacitively coupled to the corresponding second sub picture element electrodes through a second insulating film. The auxiliary capacitance lower electrodes are connected to the auxiliary capacitance bus line, and are arranged in positions opposite respectively to the control electrodes with the first insulating film interposed therebetween. In the second substrate, a common electrode which is opposite to the first and the second sub picture element electrodes is formed.

In the case of the present invention, the control electrode and the auxiliary capacitance lower electrode are arranged with the first insulating film interposed therebetween, in the position opposite to the boundary between a domain control field of the first sub picture element electrode and a corresponding domain control field of the second sub picture element electrode. This increases a capacitance value of an auxiliary capacitance connected to a picture element electrode in parallel, thus improving the response characteristics.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, a switching element, and a picture element electrode which is divided into a plurality of fields which are different from one another in alignment direction of liquid crystal molecules are formed for each picture element. With regard to the picture element electrode, each of its fields is constituted of a plurality of band-shaped microelectrode parts, and a connecting electrode part which electrically connects the microelectrode parts with one another. The width of the microelectrode part corresponding to an edge of the picture element is larger than that corresponding to a center portion of the picture element.

If the width of the microelectrode part corresponding to an edge of the picture element were larger than that corresponding to a center portion of the picture element in this manner, this can avoid display unevenness which would otherwise occur due to a photolithography process.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. In the first substrate, a switching element, a first sub picture element electrode and a second sub picture element electrode are formed for each picture element. The first sub picture element electrode is divided into a plurality of fields which are different from one another in alignment direction of liquid crystal molecules. The second sub picture element electrode is divided into a plurality of fields which are different from one another in alignment direction of liquid crystal molecules. With regard to the first sub picture element electrode, each of its fields is constituted of: a plurality of band-shaped microelectrode parts extending in a predetermined direction; and a connecting electrode part which electrically connects the microelectrode parts with one another. The first sub picture element electrode is directly connected to the switching element. With regard to the second sub picture element electrode, each of its fields is constituted of: a plurality of band-shaped microelectrode parts extending in a predetermined direction; and a connecting electrode part which electrically connects the microelectrode parts with one another. The second sub picture element electrode is connected to the switching element through capacitive coupling. The width of each of the microelectrode parts in the first sub picture element electrode is larger than the width of each of the microelectrode parts in the second sub picture element electrode.

If, as described above, the width of each of the microelectrode parts in the first sub picture element electrode directly connected to the switching element were larger than the width of each of the microelectrode parts in the second sub picture element electrode connected to the switching element through capacitive coupling, this can avoid display unevenness which would otherwise occur due to a photolithography process.

The aforementioned problem is solved by a liquid crystal display device which has the following configuration. The liquid crystal display device includes: a first and a second substrates which are arranged to be opposite to each other; liquid crystal with negative dielectric anisotropy which is contained between the first and the second substrates; and a polymer which is made by polymerizing a polymer component added to the liquid crystal, and which determines a direction in which liquid crystal molecules tilt when voltage is applied. With regard to the first substrate, a switching element as well as a first and a second sub picture element electrodes are formed in each of its picture elements. The first sub picture element electrode is divided into a plurality of fields which are different from one another in alignment direction of liquid crystal molecules. The second sub picture element electrode is divided into a plurality of fields which are different from one another in alignment direction of liquid crystal molecules. With regard to the first sub picture element electrode, each of its fields is constituted of a plurality of band-shaped microelectrode parts extending in a predetermined direction, and a connecting electrode part which electrically connects the microelectrode parts with one another. The first sub picture element electrode is directly connected to the switching element. With regard to the second sub picture element electrode, each of its fields is constituted of a plurality of band-shaped microelectrode parts extending in a predetermined direction, and a connecting electrode part which electrically connects the microelectrode parts with one another. The second sub picture element electrode is connected to the switching element through capacitive coupling. Ten percent to seventy percent is a ratio of an area of the first sub picture element electrode to a sum of the area of the first sub picture element electrode and an area of the second sub picture element electrode.

If an area ratio of the first sub picture element electrode directly connected to the switching element were in a range of 10% to 70%, this can inhibit a phenomenon in which the screen looks whitish while viewed in an oblique direction.

BRIEF DESCRIPTION OF THE DRAWINGS

FIGS. 25A and 25B are diagrams showing a result of examining transition characteristics of a liquid crystal display device from a time when voltage is applied to the liquid crystal till a time when alignment of the liquid crystal becomes stable by use of a high-speed camera.

DESCRIPTION OF THE PREFERRED EMBODIMENTS

Hereinbelow, descriptions will be provided for embodiments of the present invention with reference to the attached drawings.

(First Embodiment)

Figure 3:
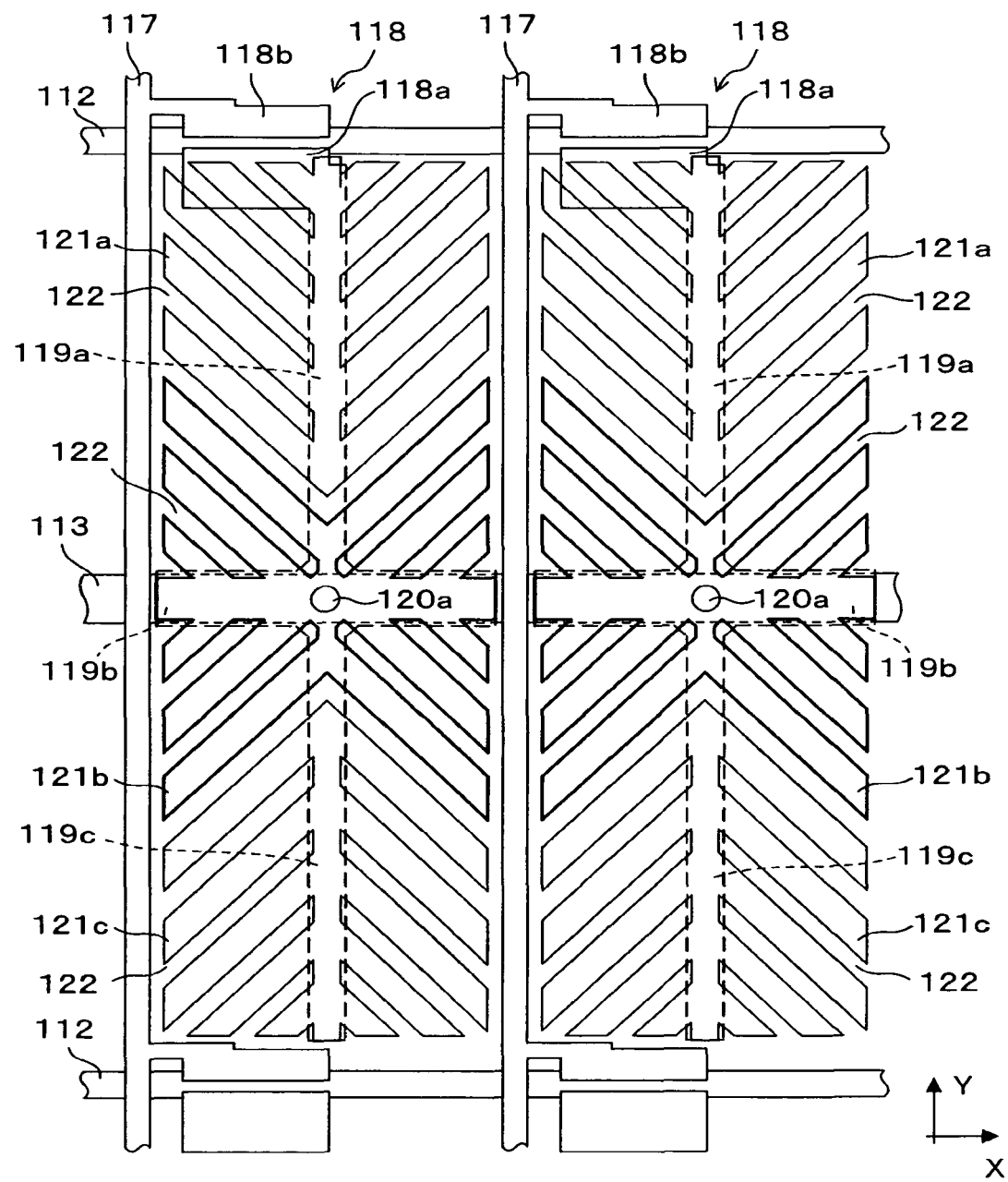
FIG. 3 is a plan view showing a liquid crystal display device according to a first embodiment of the present invention.
Figure 4:
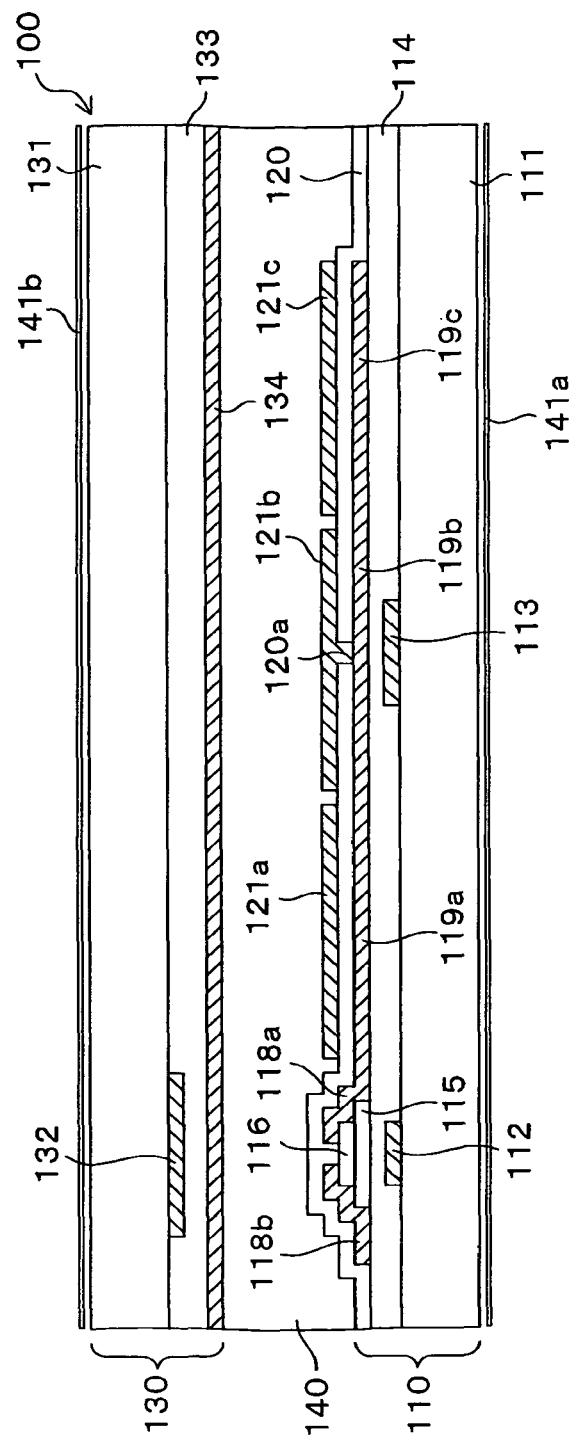
FIG. 4 is a cross-sectional schematic view showing the liquid crystal display device according to the first embodiment.

FIG. 3 is a plan view of a liquid crystal display device according to a first embodiment of the present invention. FIG. 4 is a cross-sectional schematic view of the liquid crystal display device according to the first embodiment. Incidentally, FIG. 3 shows two picture element regions.

As shown in FIG. 4, a liquid crystal panel 100 is constituted of: a TFT substrate 110; an opposing substrate 130; and a liquid crystal layer 140, made of liquid crystal with negative dielectric anisotropy, which is contained in the space between the TFT substrate 110 and the opposing substrate 130. Polarizing plates 141a and 141b are arranged respectively on the two sides in the thickness direction of this liquid crystal panel 100. The liquid crystal layer 140 includes a polymer which has been formed in the following process. Polymer components (monomer or oligomer) are added to the liquid crystal, and beams of ultraviolet light are irradiated to the polymer components. Thereby, the polymer components are polymerized into the polymer.

A plurality of gate bus lines 112 extending in the horizontal direction (X-axis direction) and a plurality of data bus lines 117 extending in the vertical direction (Y-axis direction) are formed in the TFT substrate 110, as shown in FIG. 3. Each of rectangles defined by these gate bus lines 112 and these data bus lines 117 is a picture element region. In addition, auxiliary capacitance bus lines 113 which are arranged respectively in parallel with the gate bus lines 112, and each of which traverses the center of the picture element region, is formed in the TFT substrate 110. In the case of this embodiment, the absorption axis of one of the polarizing plates 141a and 141b is arranged in parallel with the gate bus line 112, and the absorption axis of the other of the polarizing plates 141a and 141b is arranged in parallel with the data bus line 117.

A TFT 118, three sub picture element electrodes 121a to 121c, control electrodes 119a and 119c and an auxiliary capacitance electrode 119b are formed in each of the picture element regions. The sub picture element electrodes 121a to 121c are made of a transparent conductive material such as ITO. Each of the sub picture element electrodes 121a to 121c is provided with slits 122 which regulate alignment directions respectively of liquid crystal molecules when voltage is applied.

Hereinbelow, detailed descriptions will be provided for the structure of the TFT substrate 110 and the opposing substrate 130 with reference to the plan view of FIG. 3 and the cross-sectional schematic view of FIG. 4.

The gate bus lines 112 and the auxiliary capacitance bus lines 113 are formed in a glass substrate 111 which is a base for the TFT substrate 110. These gate bus lines 112 and these auxiliary capacitance bus lines 113 are formed respectively of a metallic film into which, for example, Al (Aluminum) and Ti (Titanium) are laminated.

A first insulating film 114 (gate insulating film) made, for example, of $SiO_2$, SiN or the like is formed over the gate bus lines 112 and the auxiliary capacitance bus lines 113. A semiconductor film 115 (for example, an amorphous silicon film or a polysilicon film) which is an active layer of the TFT 118 is formed in each predetermined area on the first insulating film 114. A channel protecting film 116 made of SiN or the like is formed on top of the semiconductor film 115. A drain electrode 118a and a source electrode 118b of the TFT 118 are formed respectively on the two sides of the channel protecting film 116.

In addition, the data bus lines 117 connected respectively to the source electrodes 118b of the TFTs 118, the control electrodes 119a and 119c connected respectively to the drain electrodes 118a of the TFTs 118, and the auxiliary capacitance electrodes 119b are formed on the first insulating film 114. As shown in FIG. 4, the auxiliary capacitance electrodes 119b are formed in the respective positions opposite to the auxiliary capacitance bus lines 113 with the first insulating film 114 interposed between the auxiliary capacitance electrodes 119b and the corresponding auxiliary capacitance bus lines 113. Each of an auxiliary capacitance is constituted of the auxiliary capacitance bus line 113, the auxiliary capacitance electrode 119b and the first insulating film 114 which is interposed between the auxiliary capacitance bus line 113 and the auxiliary capacitance electrode 119b. The control electrodes 119a and 119c are formed so as to be along the center line of each of the picture element regions, the center line being in parallel with the Y axis. The auxiliary capacitance electrode 119b is formed so as to be along the center line of each of the picture element region, the center line being in parallel with the X axis.

The data bus lines 117, the drain electrodes 118a, the source electrodes 118b, the control electrodes 119a and 119c, and the auxiliary capacitance electrodes 119b are formed respectively of metallic films into which Ti, Al and Ti are laminated.

A second insulating film 120 made, for example, of SiN is formed over the data bus lines 117, the drain electrodes 118a, the source electrodes 118b, the control electrodes 119a and 119c, and the auxiliary capacitance electrodes 119b. Groups constituting of three sub picture element electrodes 121a to 121c are formed on the second insulating film 120. As shown in FIG. 4, each of the sub picture element electrodes 121a is capacitively coupled to the corresponding control electrode 119a with the second insulating film 120 interposed between the sub picture element electrode 121a and the control electrode 119a. Each of the sub picture element electrodes 121c is capacitively coupled to the corresponding control electrode 119c with the second insulating film 120 interposed between the sub picture element electrode 121c and the control electrode 119c. In addition, each of the sub picture element electrodes 121b is electrically connected to the corresponding auxiliary capacitance electrode 119b through a corresponding one of contact holes 120a which are made in the second insulating film 120.

As shown in FIG. 3, the sub picture element electrode 121a is arranged in an upper portion in the Y-axis direction of each of the picture element regions. In addition, the sub picture element electrode 121a is divided into the two bilaterally symmetrical fields (domain control fields) with the center line in parallel with the Y axis defined as the boundary. In each of the picture elements, a plurality of slits 122 extending in a direction at an angle of approximately 45 degrees to the X axis are formed in the right field. A plurality of slits 122 extending in a direction at an angle of approximately 135 degrees to the X axis are formed in the left field.

The sub picture element electrode 121b is positioned in the center of each of the picture element regions, and is divided into four fields (domain control fields) by the center line in parallel with the X axis and the center line in parallel with the Y axis. A plurality of slits 122 extending in a direction at an angle of approximately 45 degrees to the X axis are formed in a first field located upper right. A plurality of slits 122 extending in a direction at an angle of approximately 135 degrees to the X axis are formed in a second field located upper left. A plurality of slits 122 extending in a direction at an angle of approximately 225 degrees to the X axis are formed in a third field located lower left. A plurality of slits 122 extending in a direction at an angle of approximately 315 degrees to the X axis are formed in a fourth field located lower right.

The sub picture element electrode 121c is arranged in a lower portion in the Y-axis direction of each of the picture element regions. In addition, the sub picture element electrode 121c is divided into the two bilaterally symmetrical fields (domain control fields) with the center line in parallel with the Y axis defined as the boundary. A plurality of slits 122 extending in a direction at an angle of approximately 225 degrees to the X axis are formed in the left field. A plurality of slits 122 extending in a direction at an angle of approximately 315 degrees to the X axis are formed in the right field. The width of each of the slits 122 respectively of the sub picture element electrodes 121a to 121b is, for example, 3.5 μm. The interval between each two neighboring slits (the width of a microelectrode part) is, for example, 6 μm.

It should be noted that, in the specification for this patent application, a conductor part, shaped like a belt, between each two neighboring slits in each of the picture element electrodes and in each of the sub picture element electrodes is termed as a microelectrode part, and a part which electrically connects base ends respectively of the microelectrode parts is termed as a connecting electrode part.

A vertical alignment film (not illustrated) made of polyimide or the like is formed over the sub picture element electrodes 121a to 121b.

On the other hand, black matrices (light blocking films) 132, color filters 133 and a common electrode 134 are formed in one surface (on the lower side in FIG. 4) of a glass substrate 131 which is a base of the opposing substrate 130.

The black matrices 132 are arranged respectively in positions opposite to the gate bus lines 112, the data bus lines 117 and the TFTs 118 in the TFT substrate 110. Color filters 133 are classified into three types, such as red, green and blue. A color filter with any one of the three colors is arranged in each of the picture element regions. One pixel is constituted of three neighboring picture elements of a red picture element, a green picture element and a blue picture element. The pixel is designed to be capable of displaying various colors.

The common electrode 134 is formed of a transparent conductive material such as ITO, and is arranged on the color filter 133 (on the lower side of the color filter 133 in FIG. 4). A vertical alignment film (not illustrated) made of polyimide or the like is formed on the common electrode 134 (on the lower side of the common electrode 134 in FIG. 4).

In the case of the liquid crystal display device thus configured according to this embodiment, when a display signal is applied to the data bus lines 117 and concurrently a predetermined voltage (scan signal) is applied to the gate bus lines 112, the TFTs 118 are turned on. Thereby, a display signal is transmitted to the control electrodes 119a and 119c as well as the auxiliary capacitance electrodes 119b. With regard to each of the picture elements, since the sub picture element electrode 121b is connected to the auxiliary capacitance electrode 119b through the contact hole 120a, the voltage of the sub picture element electrode 121b is equal to the voltage of the display signal.

On the other hand, voltage corresponding to a capacitance value between the sub picture element electrode 121a and the control electrode 119a is applied to the sub picture element electrode 121a, and voltage corresponding to a capacitance value between the sub picture element electrode 121c and the control electrode 119c is applied to the sub picture element electrode 121c. At this point, voltage V1 to be applied commonly to the sub picture element electrodes 121a and 121c is expressed by $$V1 = VD \cdot C2/(C1+C2)$$

while the voltage of the display signal is denoted by VD; a capacitance value between a group of the sub picture element electrodes 121a and 121c as well as a group of the common electrode 134 is denoted by C1; and a capacitance value between a group of the sub picture element electrodes 121a and 121c as well as a group of the control electrodes 119a and 119c is denoted by C2.

In other words, voltage, which is lower than the voltage to be applied to the sub picture element electrode 121b, is applied commonly to the sub picture element electrodes 121a and 121c. This means that one picture element has two types of fields which are different from each other in transmittance-applied voltage characteristics (TV characteristics). In addition, the summation of the transmittance-applied voltage characteristics respectively of the two types of fields represents the transmittance-applied voltage characteristics of the overall picture element. It has been known that, if a plurality of types of fields which are different from one another in transmittance-applied voltage characteristics were formed in a single picture element, this can avoid deterioration in quality of display to be performed when the screen is viewed in an oblique direction.

In the case of this embodiment, the capacitance values C1 and C2 are set in a way that 1 volt is the difference between a threshold value of the transmittance-applied voltage in the field where the sub picture element electrode 121b (i.e. a sub picture element electrode connected to the TFT through no capacitive coupling: hereinafter, referred to as a "directly-connected picture element electrode") is arranged and a threshold value of the transmittance-applied voltage commonly in the fields where the respective sub picture element electrodes 121a and 121c (i.e. sub picture element electrodes connected to the TFT through capacitive coupling: hereinafter, referred to as "capacitively-coupled picture element electrodes") are arranged. Moreover, in the case of this embodiment, a ratio of an area of the field where the sub picture element electrode 121b (directly-connected picture element electrode) is arranged to an area of the fields where the respective sub picture element electrodes 121a and 121c (capacitively-coupled picture element electrodes) are arranged is set at 4:6. The capacitance values C1 and C2 and the area ratio may be set as needed depending on a desired gray-scale brightness characteristics.

Figure 1:
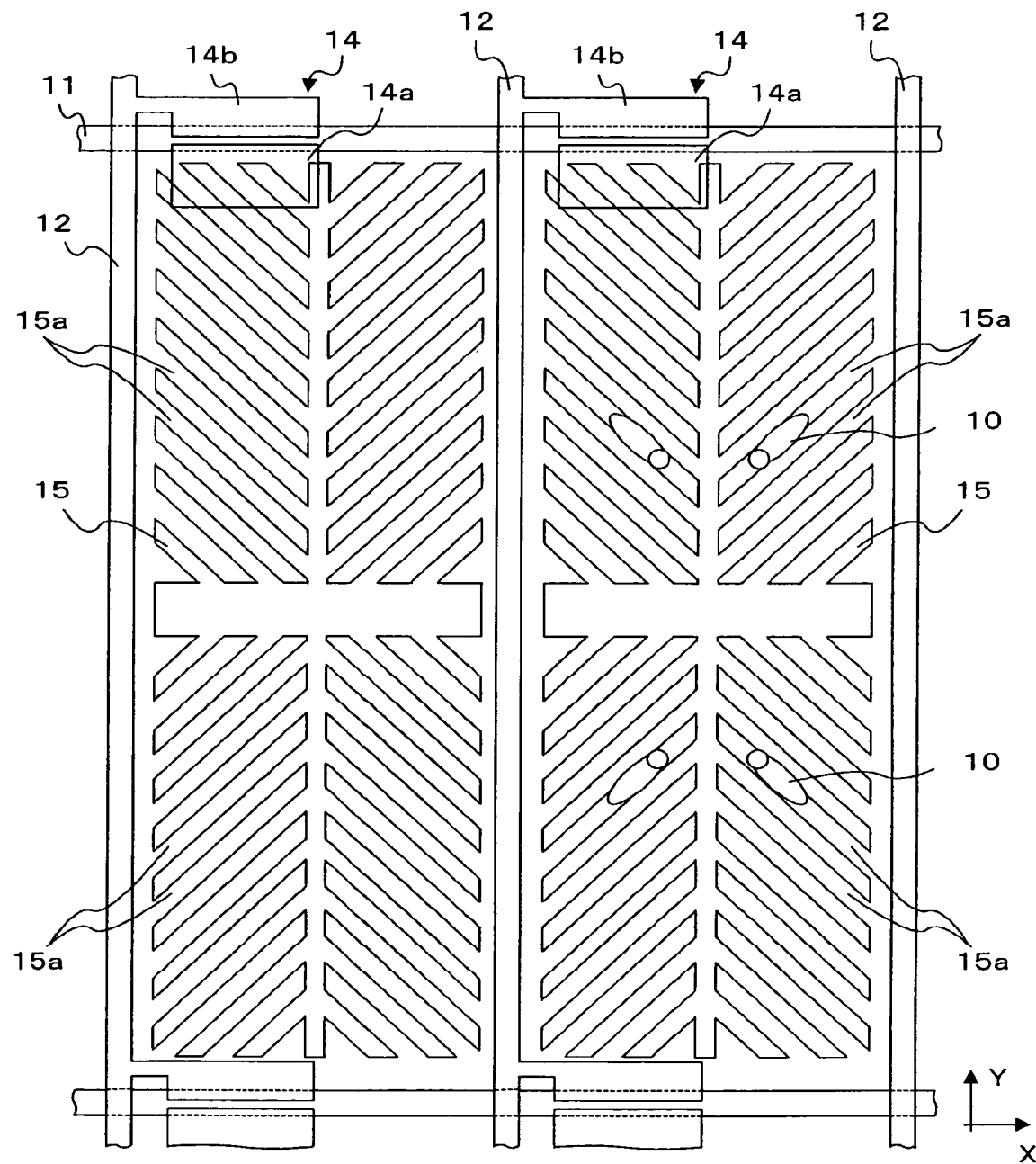
FIG. 1 is a plan view showing an example of a conventional MVA mode liquid crystal display device.
Figure 2:
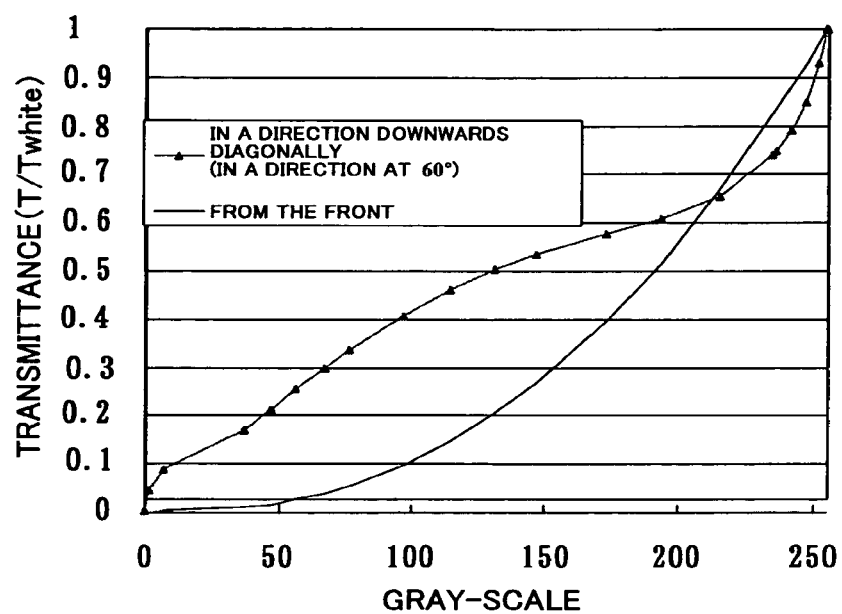
FIG. 2 is a diagram showing gray-scale brightness characteristics to be observed when the conventional MVA mode liquid crystal display device is viewed from the front and gray-scale brightness characteristics to be observed when the conventional MVA mode liquid crystal display device is viewed in a direction at an azimuth angle of 90 degrees and at a polar angle of 60 degrees.
Figure 5:
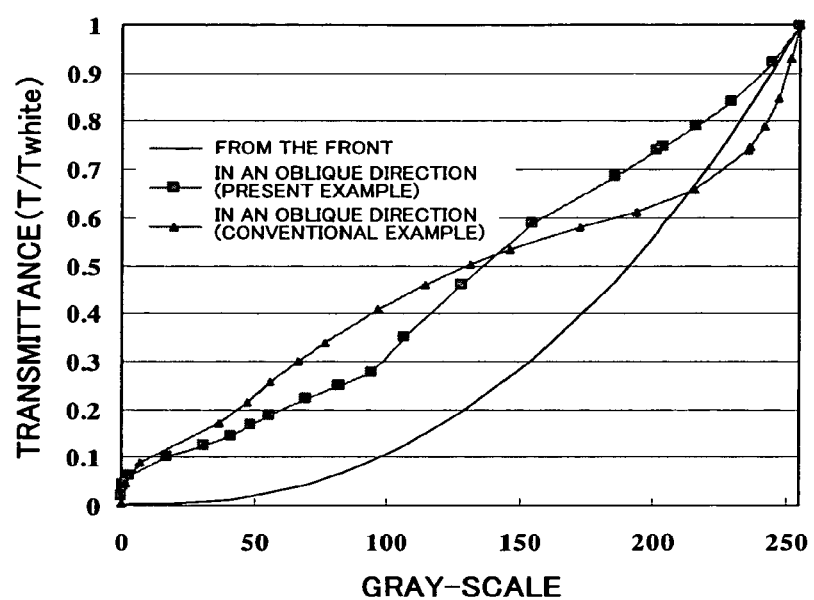
FIG. 5 is a diagram showing transmittance-applied voltage characteristics to be observed when the liquid crystal display device according to the first embodiment is viewed from the front, and transmittance-applied voltage characteristics to be observed when the liquid crystal display device according to the first embodiment is viewed in an oblique direction.

FIG. 5 is a diagram showing transmittance-applied voltage characteristics to be observed when the liquid crystal display device according to this embodiment (an example) is viewed from the front, and transmittance-applied voltage characteristics to be observed when the same liquid crystal display device is viewed in an oblique direction, while the horizontal axis represents the gray-scales and the vertical axis represents the transmittance. Incidentally, FIG. 5 additionally shows transmittance-applied voltage characteristics to be observed when a conventional liquid crystal display device with a structure as shown in FIG. 1 is viewed in an oblique direction. As learned from FIG. 5, a line representing the transmittance-applied voltage characteristics, which is observed when the liquid crystal display device according to this embodiment is viewed in the oblique direction, undulates less than a line representing the transmittance-applied voltage characteristics which is observed when the conventional liquid crystal display device as shown is viewed in the same oblique direction. It can be learned from this that the quality of display to be performed when the liquid crystal display device according to this embodiment is viewed in the oblique direction has been improved in comparison with the quality of display to be performed when the conventional liquid crystal display device as shown in FIG. 1 is viewed in the same oblique direction.

No beam of light is transmitted in areas surrounding a boundary between each two neighboring domains whose slits 122 extend in directions which are different from one domain to another, or in an area along the center line of each of the picture element regions which is in parallel with the X axis and in an area along the center line of the picture element region which is in parallel with the Y axis. This is because liquid crystal molecules in such areas are aligned in the direction in parallel with the X axis or the direction in parallel with the Y axis (i.e. in directions, in parallel with, or orthogonal to, the absorption axes respectively of the polarizing plates 141a and 141b) when voltage is applied. In the case of this embodiment, it is these boundary areas, but not other areas, where the control electrodes 119a and 119c and the auxiliary capacitance electrode 119b are provided with regard to each of the picture elements. For this reason, reduction in the aperture ratio can be minimized, although provision of the control electrodes 119a and 119c as well as the auxiliary capacitance electrode 119b to each of the picture elements inevitably reduces the aperture ratio.

Hereinbelow, descriptions will be provided for a method of manufacturing the liquid crystal display device according to this embodiment.

To begin with, the glass substrate 111 which is used as the base of the TFT substrate 110 is prepared. Subsequently, the metallic film into which, for example, Al (Aluminum) and Ti (Titanium) are laminated is formed on this glass substrate 111. Thereafter, the metallic film is patterned by use of a photolithography process. Thus, the gate bus lines 112 and the auxiliary bus lines 113 are formed. In this occasion, for example, the gate bus lines 112 are formed with a pitch of approximately 300 μm in the vertical direction.

Then, the first insulating film (gate insulating film) 114 made, for example, of an insulating material such as $SiO_2$, SiN or the like is formed in the entire upper surface of the glass substrate 111. Thence, the semiconductor films (amorphous silicon films or polysilicon films) 115 which are used respectively as the active layers of the TFTs 118 are formed in predetermined positions on the first insulating film 114.

Subsequently, the SiN film is formed in the entire upper surface of the glass substrate 111. Thereafter, the SiN film is patterned by use of a photolithography process. Thereby, the channel protecting films 116 are formed respectively on top of areas which are used respectively as the channels of the semiconductor film 115.

Then, an ohmic contact layer (not illustrated) made of a semiconductor film which has been treated with impurities in high concentration is formed in the entire upper surface of the glass substrate 111. Thence, the metallic film into which, for example, Ti, Al and Ti are laminated in this order is formed on the glass substrate 111. Thereafter, this metallic film and the ohmic contact layer are patterned by use of a photolithography process. Thus, the data bus lines 117, the drain electrodes 118a, the source electrodes 118b, the control electrodes 119a and 119c, and the auxiliary capacitance electrodes 119b are formed. In this occasion, for example, the data bus lines 117 are formed with a pitch of approximately 100 μm in the horizontal direction.

The second insulating film 120 made of an insulating material such as $SiO_2$, SiN or the like is formed in the entire upper surface of the glass substrate 111. Then, the contact holes 120a which respectively reach the auxiliary capacitance electrodes 119b are formed in the second insulating film 120.

Then, the entire upper surface of the glass substrate 111 is sputtered with ITO. Thereby, the ITO film is formed. This ITO film is electrically connected with the auxiliary capacitance electrodes 119b through the contact holes 120a. Thereafter, the ITO film is patterned by use of a photolithography process. Thereby, the sub picture element electrodes 121a to 121c are formed. The slits 122 extending in oblique directions are formed in each of the sub picture element electrodes 121a to 121c, as described above.

Thence, the entire upper surface of the glass substrate 111 is coated with polyimide. Thereby, the alignment film is formed. Accordingly, the TFT substrate 110 is completed.

Next, descriptions will be provided for a method of fabricating the opposing substrate 130.

To begin with, the glass substrate 131 which is used as the base of the opposing substrate 130 is prepared. Subsequently, the black matrices 132 are formed of Cr (Chromium) or black resin on the predetermined areas of the glass substrate 131. The black matrices 132 are formed, for example, in the respective positions opposite to the gate bus lines 112 and the data bus lines 117 in the TFT substrate 110.

Then, red color filters, green color filters and blue color filters 133 are formed on the glass substrate 131 respectively by use of red photosensitive resin, green photosensitive resin and blue photosensitive resin.

Thence, the entire upper surface of the glass substrate 131 is sputtered with ITO. Thereby, the common electrode 134 is formed. Thereafter, the common electrode 134 is coated with polyimide. By this, the alignment film is formed on the common electrode 134. Accordingly, the opposing substrate 130 is completed.

The TFT substrate 110 and the opposing substrate 130, which have been thus fabricated, are arranged to be opposite to each other. Thereafter, liquid crystal with negative dielectric anisotropy is filled into the space between the TFT substrate 110 and the opposing substrate 130. The liquid crystal panel 100 is manufactured in this manner. A polymer component, for example, a polymer component (diacrylate, methacrylate or the like) with a photo-functional group, is beforehand added to the liquid crystal by 0.3 wt %. In addition, the interval (cell gap) between the TFT substrate 110 and the opposing substrate 130 is, for example, 3.5 μm to 4 μm.

Subsequently, a predetermined signal is applied to the gate bus lines 112, and thereby the TFT 118 of each of the picture elements is turned into an "on" state. In addition, a predetermined voltage is applied to the data bus lines 117. Thereby, voltage is applied between the common electrode 134 and each of the sub picture element electrodes 121a to 121c. Accordingly, the liquid crystal molecules in each of the picture elements are aligned in predetermined directions. After the alignment of the liquid crystal molecules becomes sufficiently stable, beams of ultraviolet light are irradiated to the polymer component. Thereby, monomer in the liquid crystal layer is polymerized. The polymer thus made in the liquid crystal layer determines directions in which the respective liquid crystal molecules tilt when voltage is applied.

Thereafter, the polarizing plates 141a and 141b are arranged on the two sides of the liquid crystal panel 100 in the thickness direction. In addition, drive circuits and backlights are installed therein. In this manner, the liquid crystal display device according to this embodiment is completed.

(Second Embodiment)

Figure 6:
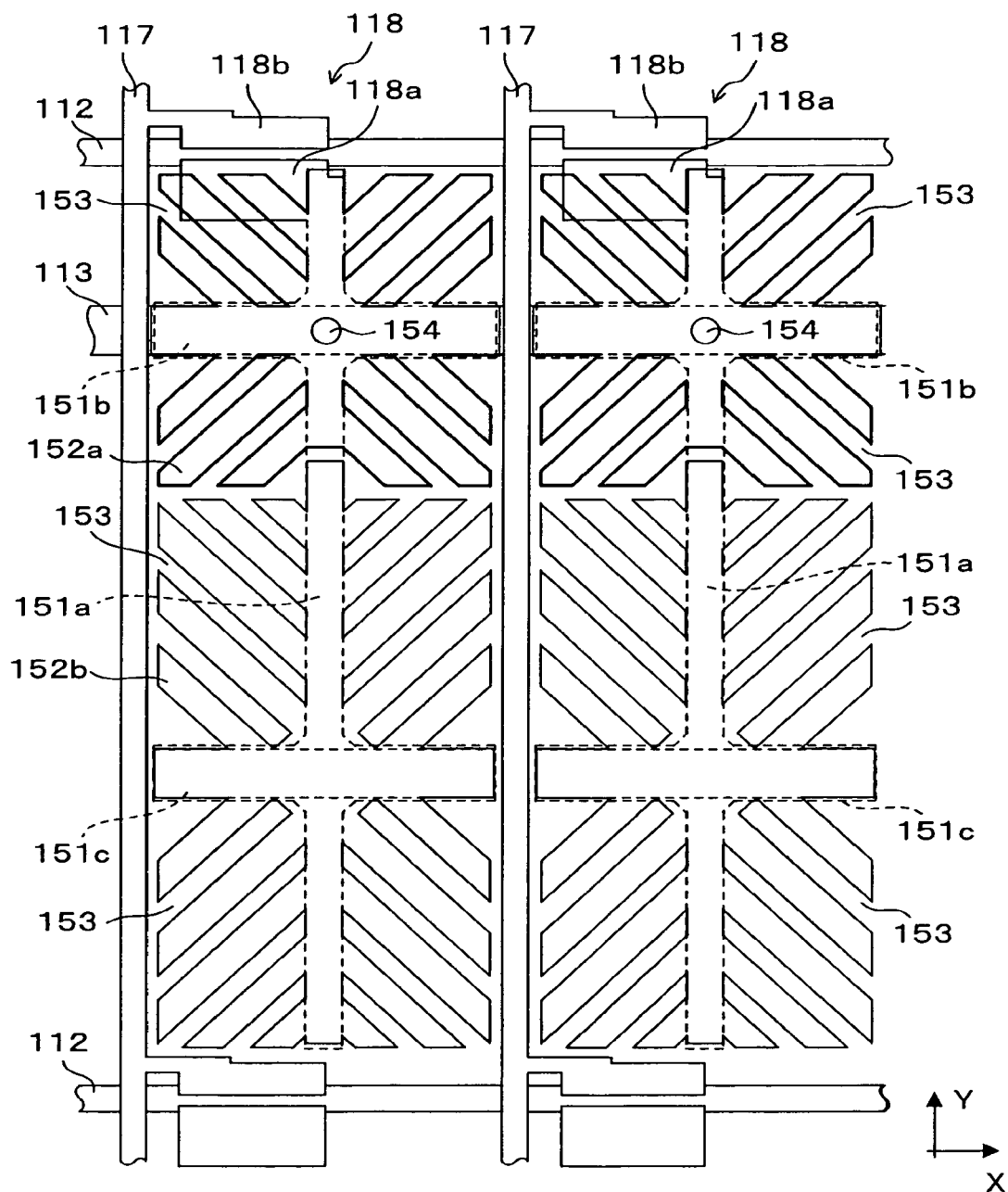
FIG. 6 is a plan view showing a liquid crystal display device according to a second embodiment of the present invention.

FIG. 6 is a plan view showing a liquid crystal display device according to a second embodiment of the present invention. Incidentally, if components and equivalents in FIG. 6 were the same as, or similar to, those in FIG. 3, the components and equivalents in FIG. 6 are denoted by the same reference numerals and symbols as those in FIG. 3 are. Thus, detailed descriptions will be omitted for the same, or similar components and equivalents in FIG. 6.

In the case of this embodiment, two sub picture element electrodes 152a and 152b are formed in a single picture element region. The sub picture element electrodes 152a (directly-connected picture element electrode) is arranged in a range upper in the Y axis direction in each of the picture element regions. The sub picture element electrode 152a is divided into four fields (domain control fields) by the center line in parallel with the X axis and the center line in parallel with the Y axis. A plurality of slits 153 extending in a direction at an angle of approximately 45 degrees to the X axis are formed in a first field located upper right. A plurality of slits 153 extending in a direction at an angle of approximately 135 degrees to the X axis are formed in a second field located upper left. A plurality of slits 153 extending in a direction at an angle of approximately 225 degrees to the X axis are formed in a third field located lower left. A plurality of slits 153 extending in a direction at an angle of approximately 315 degrees to the X axis are formed in a fourth field located lower right.

The sub picture element 152b (capacitively-coupled picture element electrode) is arranged in a range lower in the Y axis direction in each of the picture element regions. The area of the sub picture element electrode 152b is larger than that of the sub picture element electrode 152a. Like the sub picture element electrode 152a, the sub picture element electrode 152b is divided into four fields (domain control fields) by the center line in parallel with the X axis and the center line in parallel with the Y axis. A plurality of slits 153 extending in a direction at an angle of approximately 45 degrees to the X axis are formed in a first field located upper right. A plurality of slits 153 extending in a direction at an angle of approximately 135 degrees to the X axis are formed in a second field located upper left. A plurality of slits 153 extending in a direction at an angle of approximately 225 degrees to the X axis are formed in a third field located lower left. A plurality of slits 153 extending in a direction at an angle of approximately 315 degrees to the X axis are formed in a fourth field located lower right.

Underneath the sub picture element electrodes 152a and 152b, a control electrode 151a extending along a center line of each of the picture element regions is formed, the center line being in parallel with the Y axis. This control electrode 151a is electrically connected with the drain electrode 118a of each of the TFTs 118.

In addition, underneath each of the sub picture element electrodes 152a, an auxiliary capacitance bus line 113 and an auxiliary capacitance electrode 151b are formed along a center line of the sub picture element electrode 152a, the center line being in parallel with the X axis. The auxiliary capacitance bus line 113 is formed in the same layer as a gate bus line 112 is. In addition, the auxiliary capacitance electrode 151b is formed in the same layer as the control electrode 151a is, and is connected with the control electrode 151a. A first insulating film (an equivalent to the insulating film 114 in FIG. 4) is formed between the auxiliary capacitance bus line 113 and the auxiliary capacitance electrode 151b. An auxiliary capacitance is constituted of the first insulating film, the auxiliary capacitance bus line 113 and the auxiliary capacitance electrode 151b. Furthermore, the auxiliary capacitance electrode 151b is electrically connected with the sub picture element electrode 152a through a contact hole 154, which has been formed in a second insulating film (an equivalent to the insulating film 120 in FIG. 4).

Moreover, underneath each of the sub picture element electrodes 152b, a control electrode 151c is formed along a center line of the sub picture element electrode 152b, the center line being in parallel with the X axis. The control electrode 151c is formed in the same layer as the control electrode 151a is, and is electrically connected with the control electrode 151a. Additionally, the control electrode 151c is capacitively coupled to the sub picture element electrode 152b through the second insulating film.

The structure of an opposing substrate according to the second embodiment is basically the same as that according to the first embodiment, and descriptions will be omitted for the structure according to the second embodiment here. In addition, in the second embodiment, too, a polymer component such as diacrylate is added to liquid crystal, and the liquid crystal is filled into the space between a TFT substrate and the opposing substrate. Voltage is applied between a picture element electrode (each of the sub picture element electrodes 152a and 152b) and a common electrode. Thereby, liquid crystal molecules are aligned in predetermined directions. Thereafter, beams of ultraviolet light are irradiated to the polymer component. Accordingly, the polymer component is polymerized. Thus, a polymer is formed in the liquid crystal layer.

In the case of this embodiment, a single picture element is provided with two types of fields which are different from each other in transmittance-applied voltage characteristics in common with the first embodiment. This brings about an effect of avoiding deterioration in the display quality to be obtained when the screen is viewed in an oblique direction.

In addition, in the case of this embodiment, the auxiliary capacitance bus line 113 and the auxiliary capacitance electrode 151b are formed along the center line of the sub picture element electrode 152a, the center line being in parallel with the X axis. This portion constitutes a boundary between the two domains. Accordingly, when voltage is applied, the liquid crystal molecules tilt in a direction in parallel with the X axis. For this reason, light is not transmitted in this portion, even if neither the auxiliary capacitance bus line 113 nor the auxiliary capacitance electrode 151b were provided. This can avoid deterioration in the transmittance, which deterioration would otherwise be caused due to formation of the auxiliary capacitance bus line 113 and the auxiliary capacitance electrode 151b in each of the picture elements. Additionally, in this embodiment, if the length and the width of the auxiliary capacitance electrode 151b were adjusted, the capacitance value of the auxiliary capacitance can be controlled. This brings about an advantage of giving higher degree of freedom in designing the capacitance value of the auxiliary capacitance.

In common with the auxiliary capacitance bus line 113 and the auxiliary capacitance electrode 151b, the control electrode 151c is formed along the center line of the sub picture element electrode 152b, the center line being in parallel with the X axis. This can avoid deterioration in the transmittance, which would otherwise be caused due to formation of the control electrode 151c in each of the picture elements. Moreover, if the length and the width of the control electrode 151c were adjusted, this can control the capacitance value of connection between the control electrode 151a and the sub picture element electrode 152b and the capacitance value of connection between the control electrode 151c and the sub picture element electrode 152b. This brings about an advantage of giving higher degree of freedom in designing the capacitance values of the respective connections (Third Embodiment)

Figure 7:
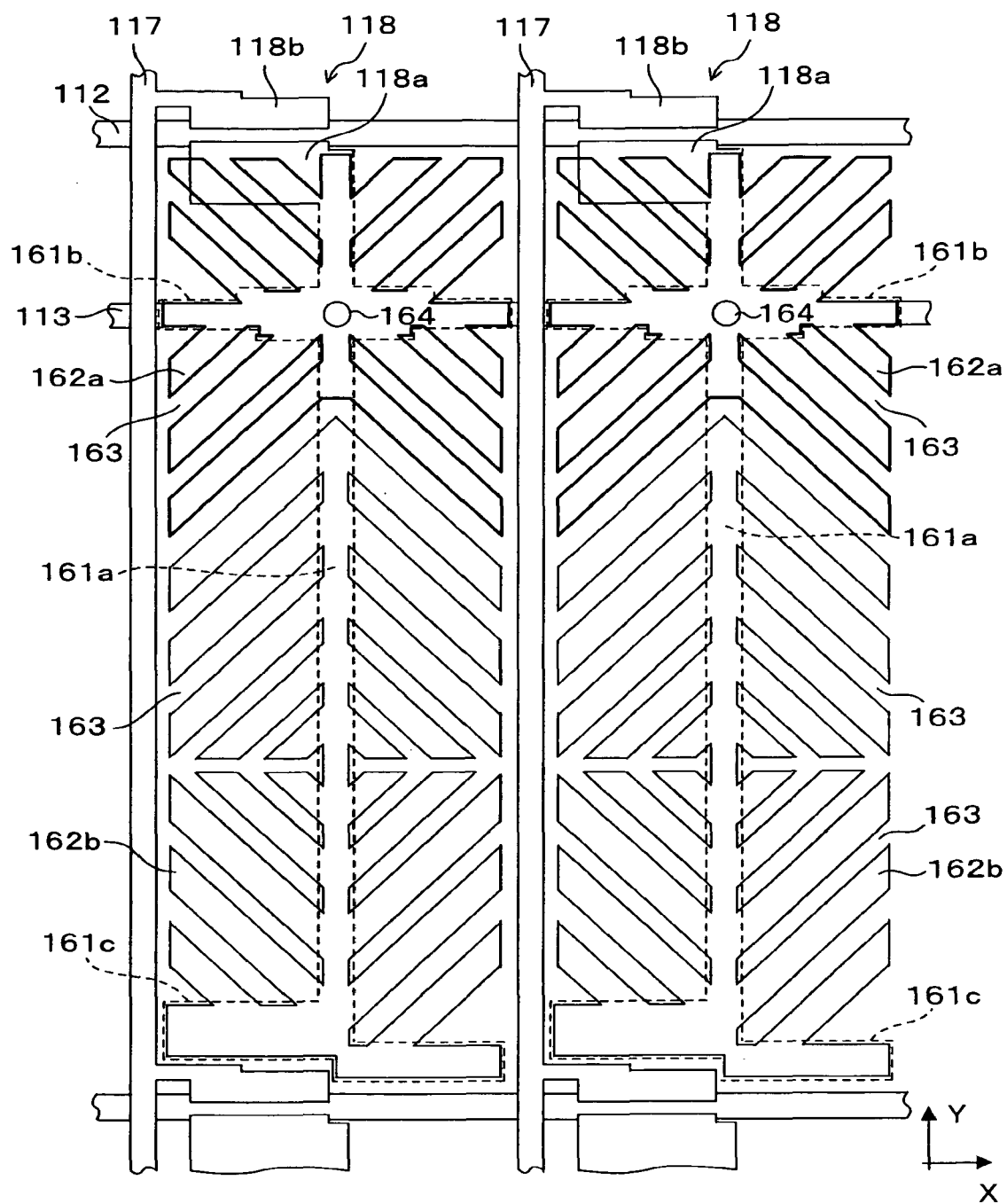
FIG. 7 is a plan view showing a liquid crystal display device according to a third embodiment of the present invention.

FIG. 7 is a plan view showing a liquid crystal display device according to a third embodiment of the present invention. If components and equivalents in FIG. 7 were the same as, or similar to, those in FIG. 3, the components and equivalents in FIG. 7 are denoted by the same reference numerals and symbols as those in FIG. 3 are. Thus, detailed descriptions will be omitted for the same, or similar, components and equivalents in FIG. 7.

In the case of this embodiment, too, two sub picture element electrodes 162a and 162b are formed in a single picture element region. The sub picture element electrode 162a (directly-connected picture element electrode) is arranged in a range upper in the Y axis direction in each of the picture element regions. The sub picture element electrode 162a is divided into four fields (domain control fields) by the center line in parallel with the X axis and the center line in parallel with the Y axis. A plurality of slits 163 extending in a direction at an angle of approximately 45 degrees to the X axis are formed in a first field located upper right. A plurality of slits 163 extending in a direction at an angle of approximately 135 degrees to the X axis are formed in a second field located upper left. A plurality of slits 163 extending in a direction at an angle of approximately 225 degrees to the X axis are formed in a third field located lower left. A plurality of slits 163 extending in a direction at an angle of approximately 315 degrees to the X axis are formed in a fourth field located lower right.

The sub picture element 162b (capacitively-coupled picture element electrode) is arranged in a range lower in the Y axis direction in each of the picture element regions. The area of the sub picture element electrode 162b is larger than that of the sub picture element electrode 162a. Like the sub picture element electrode 162a, the sub picture element electrode 162b is divided into four fields (domain control fields) by the center line in parallel with the X axis and the center line in parallel with the Y axis. A plurality of slits 163 extending in a direction at an angle of approximately 315 degrees to the X axis are formed in a first field located upper right. A plurality of slits 163 extending in a direction at an angle of approximately 225 degrees to the X axis are formed in a second field located upper left. A plurality of slits 163 extending in a direction at an angle of approximately 135 degrees to the X axis are formed in a third field located lower left. A plurality of slits 163 extending in a direction at an angle of approximately 45 degrees to the X axis are formed in a fourth field located lower right.

Underneath the sub picture element electrodes 162a and 162b, a control electrode 161a is formed along a center line of each of the picture elements, the center line being in parallel with the Y axis. This control electrode 161a is electrically connected with the drain electrode 118a of each of the TFTs 118.

In addition, underneath each of the sub picture element electrodes 162a, an auxiliary capacitance bus line 113 and an auxiliary capacitance electrode 161b are formed along a center line of the sub picture element electrode 162a, the center line being in parallel with the X axis. The auxiliary capacitance bus line 113 is formed in the same layer as a gate bus line 112 is. In addition, the auxiliary capacitance electrode 161b is formed in the same layer as the control electrode 161a is, and is electrically connected with the control electrode 161a. A first insulating film (an equivalent to the insulating film 114 in FIG. 4) is formed between the auxiliary capacitance bus line 113 and the auxiliary capacitance electrode 161b. An auxiliary capacitance is constituted of the auxiliary capacitance bus line 113, the auxiliary capacitance electrode 161b and the first insulating film therebetween. Furthermore, the auxiliary capacitance electrode 161b is electrically connected with the sub picture element electrode 162a through a contact hole 164, which has been formed in a second insulating film (an equivalent to the insulating film 120 in FIG. 4).

Moreover, underneath the extremity of each of the sub picture element electrodes 162b, a control electrode 161c is formed. This control electrode 161c also is formed in the same layer as the control electrode 161a is, and is electrically connected with the control electrode 161a. The control electrode 161c is capacitively coupled to the sub picture element electrode 162b through the second insulating film.

The structure of an opposing substrate according to this embodiment is also basically the same as that according to the first embodiment, and descriptions will be omitted for the structure according to this embodiment here. In addition, in the case of this embodiment, too, a polymer component such as diacrylate is added to liquid crystal, and the liquid crystal is filled into the space between a TFT substrate and the opposing substrate. Voltage is applied between a picture element electrode (each of the sub picture element electrodes 162a and 162b) and a common electrode. Thereby, liquid crystal molecules are aligned in predetermined directions. Thereafter, beams of ultraviolet light are irradiated to the polymer component. Accordingly, the polymer component is polymerized.

In the case of the second embodiment (see FIG. 6) which has been described, the liquid crystal molecules between the sub picture element electrodes 152a and 152b tilt in the direction in parallel with the X axis when voltage is applied. This causes a dark line between the sub picture element electrodes 152a and 152b. By contrast, in the case of this embodiment, the gap between the two sub picture element electrodes 162a and 162b extends in the same direction as the slits 163 adjacent to the gap do. This causes the liquid crystal molecules between the sub picture element electrodes 162a and 162b to tilt in the same direction as the slits 163 extend, when voltage is applied. Accordingly, a dark line does not appear between the sub picture element electrodes 162a and 162b. Thus, the substantial aperture ratio is improved.

Furthermore, in the case of this embodiment, too, a single picture element is provided with two types of fields which are different in transmittance-applied voltage characteristics, in common with the case of the first embodiment. This brings about an effect of avoiding deterioration in the display quality which would otherwise be caused when the screen is viewed in an oblique direction.

(Fourth Embodiment)

Figure 8:
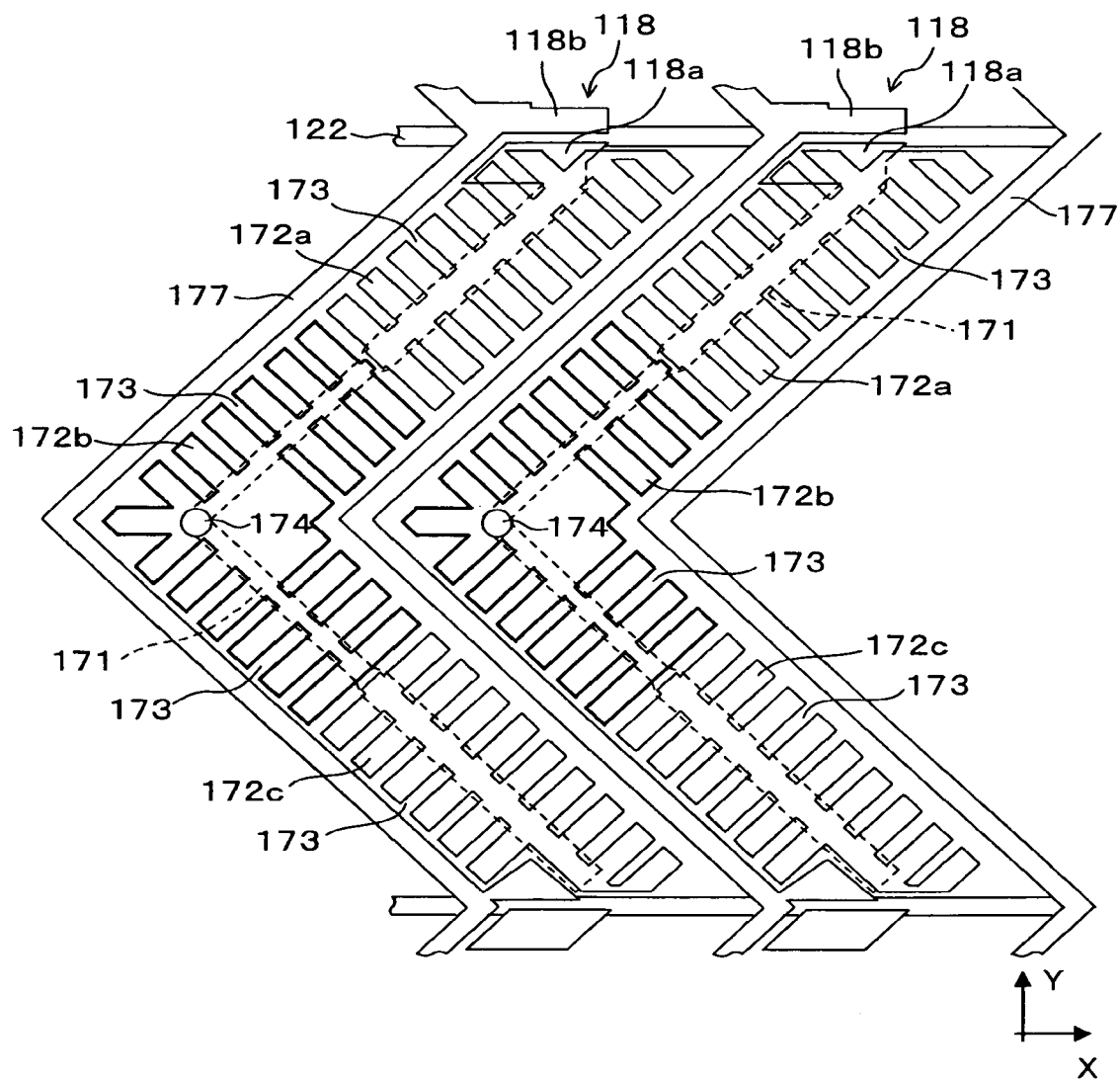
FIG. 8 is a plan view showing a liquid crystal display device according to a fourth embodiment of the present invention.

FIG. 8 is a plan view showing a liquid crystal display device according to a fourth embodiment of the present invention.

In the case of this embodiment, as shown in FIG. 8, each data bus line 177 is formed so as to be shaped like a zigzag, which causes an upper half of the data bus line in each picture element to extend in a direction at an angle of 45 degrees to the X axis, and a lower half of the data bus line in the picture element to extend in a direction at an angle of 315 degrees to the X axis. However, each gate bus line 122 is formed so as to be in parallel with the X axis, in common with the first to the third embodiments.

Three sub picture element electrodes 172a, 172b and 172c as well as a TFT 118 are formed in each of the picture element regions to be defined by the gate bus lines 122 and the data bus lines 177. In the case of this embodiment, too, a part of the gate bus line 122 is used as a gate electrode for a TFT 118. A drain electrode 118b and a source electrode 118a are formed so as to be opposite to each other with the gate bus line 122 interposed therebetween. In each of the picture element regions, a control electrode 171 bent along the center line of the picture element region is formed underneath the sub picture element electrodes 172a to 172c. This control electrode 171 is formed on a first insulating film (an equivalent to the insulating film 114 in FIG. 3), and is electrically connected with the drain electrode 118b of the TFT 118.

The sub picture element electrode 172a (a capacitively-coupled picture element electrode) is divided into two fields (domain control fields) by the center line. In addition, the right field is provided with slits 173 extending in a direction at an angle of approximately 315 degrees to the X axis. The left field is provided with slits 173 extending in a direction at an angle of approximately 135 degrees.

The sub picture element electrode 172b (a directly-connected picture element electrode) is arranged in a center portion where each of the picture elements is bent. The sub picture element electrode 172b is divided into four fields. Slits 173 extending in a direction at an angle of approximately 45 degrees to the X axis are formed in a first field. Slits 173 extending in a direction at an angle of approximately 135 degrees to the X axis are formed in a second field. Slits 173 extending in a direction at an angle of approximately 225 degrees to the X axis are formed in a third field. Slits 173 extending in a direction at an angle of approximately 315 degrees to the X axis are formed in a fourth field. This sub picture element electrode 172b is electrically connected with the control electrode 171 through a contact hole 174 which is provided into a second insulating film (an equivalent to the insulating film 120 in FIG. 3).

The sub picture element electrode 172c (a capacitively-coupled picture element electrode) is divided into two fields (domain control fields) by the center line. In addition, the right field is provided with slits 173 extending in a direction at an angle of approximately 45 degrees to the X axis. The left field is provided with slits 173 extending in a direction at an angle of approximately 225 degrees. Each of the sub picture element electrodes 172a and 172c is connected with the control electrode 171 through the second insulating film.

The structure of an opposing substrate according to this embodiment is also basically the same as that according to the first embodiment, and descriptions will be omitted for the structure according to this embodiment here. In the case of this embodiment, too, a polymer component such as diacrylate is added to liquid crystal, and the liquid crystal is filled into the space between a TFT substrate and the opposing substrate. Voltage is applied between a picture element electrode (each of the sub picture element electrodes 172a to 172c) and a common electrode. Thereby, liquid crystal molecules are aligned in predetermined directions. Thereafter, beams of ultraviolet light are irradiated to the polymer component. Accordingly, the polymer component is polymerized.

In the cases of the first to the third embodiments, slits of each of the sub picture element electrodes extend in directions respectively at angles of 45 degrees, 135 degrees, 225 degrees and 315 degrees to the X axis. Accordingly, the liquid crystal molecules tilt in the same directions as the slits extend. However, a line of electric force occurs outwards in the extremity of each of the sub picture element electrodes. This causes the liquid crystal molecules between each of the sub picture element electrodes and the data bus line to tilt in a direction in parallel with the X axis. On the other hand, with regard to one of two polarizing plates, between which the liquid crystal panel is interposed, its absorption axis is arranged in parallel with the X axis. With regard to the other of the two polarizing plates, its absorption axis is arranged in parallel with the Y axis. In this case, dark parts occur between each of the sub picture element electrodes and the data bus line in each of the picture elements in the liquid crystal display device according to any one of the first to the third embodiments. This reduces the substantial aperture ratio.

With this taken into consideration, in the case of this embodiment, the data bus line 177 is beforehand designed to extend in directions at angles of 45 degrees and 315 degrees to the gate bus line 122 in each of the picture elements, as shown in FIG. 8. This causes the liquid crystal molecules between the data bus line 177 and each of the sub picture element electrodes 172a to 172c to tilt in a direction at an angle of 45 degrees to the polarization axes of the polarizing plates. This prevents dark parts from occurring between the data bus line 177 and each of the sub picture element electrodes 172a to 172c. The substantial aperture ratio is improved in the case of this embodiment in comparison with the cases of the first to the third embodiments. This brings about an effect that enables further brighter display. When the transmittance of a liquid crystal display device according to this embodiment which had been actually manufactured was examined, it was proved that the transmittance was improved by approximately 5% in comparison with the liquid crystal display device with a structure as shown in FIG. 3.

In the case of the liquid crystal display device according to this embodiment, a single picture element is provided with the plurality of types of fields which are different from one another in transmittance-applied voltage characteristics. This brings about an effect of improving the display quality to be observed when the screen is viewed in an oblique direction.

(Fifth Embodiment)

Figure 9:
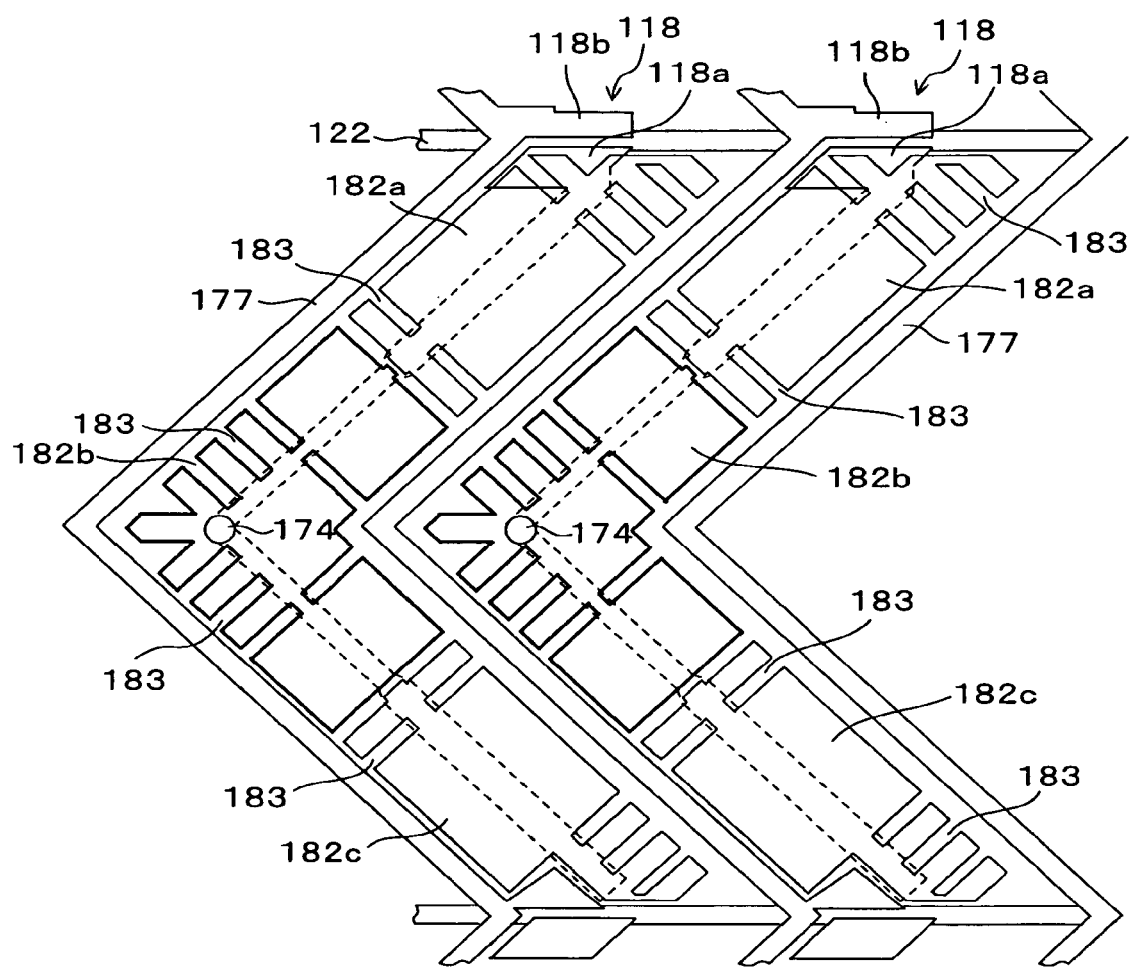
FIG. 9 is a plan view showing a liquid crystal display device according to a fifth embodiment of the present invention.

FIG. 9 is a plan view showing a liquid crystal display device according to a fifth embodiment of the present invention. This embodiment is different from the fourth embodiment in that the shapes of the sub picture element electrodes according to this embodiment are different from those of the sub picture element electrodes according to the fourth embodiment. Except for the shapes, however, this embodiment has the same configuration as that according to the fourth embodiment does. If components and equivalents in FIG. 9 were the same as, or similar to, those in FIG. 8, the components and equivalents in FIG. 9 are denoted by the same reference numerals and symbols as those in FIG. 8 are. Thus, detailed descriptions will be omitted for the same, or similar, components and equivalents in FIG. 9.

In the case of the liquid crystal display device according to the fourth embodiment as shown in FIG. 8, many slits 173 are provided into each of the sub picture element electrodes 172a to 172c. These slits 173 are formed by use of a photolithography process. In other words, an ITO film, which is made into each of the sub picture element electrodes 172a to 172c, is coated with photoresist. Thereafter, a stepper exposure process is performed on the ITO film, and then a development process is performed on the ITO film. Using remaining photoresist as a mask, the ITO film is etched. In this manner, the slits 173 are formed. However, each of the slits 173 is minute. This causes the widths of the respective slits to be nonuniform due to unevenness of the film thickness of the photoresist film and due to a slight difference (shot unevenness) in amount of being exposed during the stepper exposure process. It is likely that this affects the optical characteristics, and that the display quality is reduced accordingly.

With this taken into consideration, in the case of the fifth embodiment, slits 173 are formed only in extremities respectively of sub picture element electrodes 182a and 182c (corresponding to the sub picture element electrodes 172a and 172b according to the fourth embodiment) and in the bending portion of the sub picture element electrode 182b (corresponding to the sub picture element electrode 172b). In the case of the liquid crystal display device according to this embodiment, when a polymer component (a monomer) added to the liquid crystal is polymerized, it takes longer for the liquid crystal molecules to complete tilting in the predetermined directions after voltage is applied, in comparison with the liquid crystal display device according to the fourth embodiment. However, while the liquid crystal display device according to this embodiment is being in actual use, the directions in which the liquid crystal molecules are aligned are determined by the polymer included in the liquid crystal layer. For this reason, the liquid crystal display device according to this embodiment can obtain response characteristics equal to those of the liquid crystal display device according to the fourth embodiment.

(Sixth Embodiment)

Hereinbelow, descriptions will be provided for a sixth embodiment of the present invention.

In the case of the liquid crystal display device as shown in FIG. 1, the widths respectively of the slits are caused to be nonuniform due to a photolithography process, as described above. Accordingly, in some cases, patterns shaped like a tile are seen when a display is performed in middle gray-scale. The applicants of the present invention have carried out various experiments and studies in order to solve such a problem. As a result of them, the applicants have found that the display unevenness due to the photolithography process can be prevented from occurring if values denoted by d, L and S are set in a way that they satisfy an equation in the form $$L+d-S \geq 4 \ \mu m \quad (1)$$

where d denotes a thickness (a cell gap) of the liquid crystal layer; L, a width of conductive material portion (i.e. a microelectrode part) between two neighboring slits; and S, a width of the slit.

For example, the thickness d of the liquid crystal layer may be 4 μm, concurrently the width L of the microelectrode part may be 6 μm, and simultaneously the width S of the slit may be 3.5 μm.

When a liquid crystal display device was actually manufactured with the aforementioned conditions, it was proved that tile-shaped patterns which would otherwise occur were able to be prevented. However, a new problem occurred which reduced brightness while a white display was being performed. It is conceivable that this problem came from the following reasons.

Figure 10:
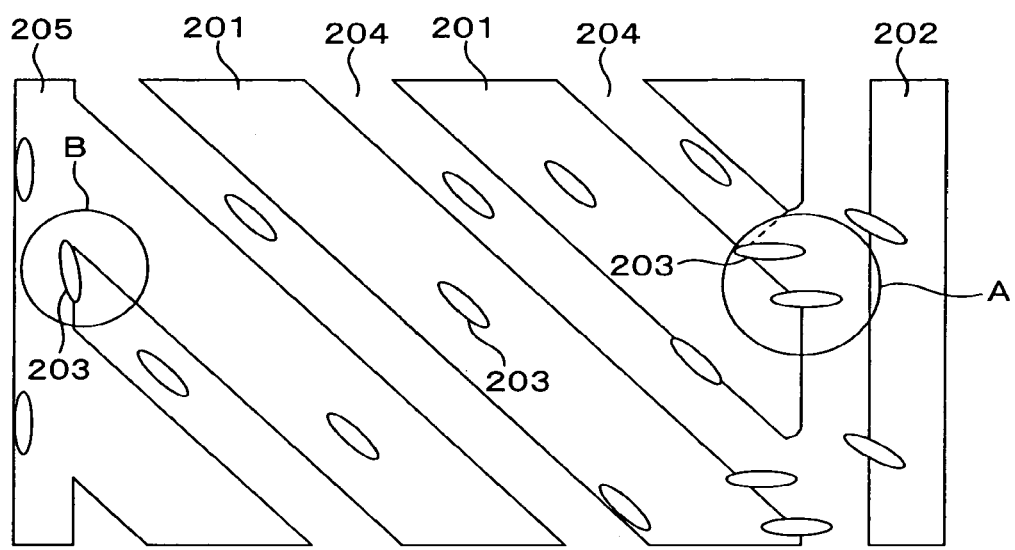
FIG. 10 is a schematic diagram showing alignment of liquid crystal molecules in the case of an MVA mode liquid crystal display device.

When voltage is applied between a picture element electrode and a common electrode, the liquid crystal molecules (liquid crystal molecules with negative dielectric anisotropy) tend to tilt in a direction orthogonal to a line of electric force stemming from the picture element electrode. As shown in FIG. 10, no sooner is voltage applied than the liquid crystal molecules 203 around the extremities (near a data bus line 202) respectively of microelectrode parts 201 tilt towards the center of each of the picture elements. Over each slits 204 and each microelectrode part 201, the respective liquid crystal molecules 203, which are going to tilt in directions which are opposite to each other, collide with one another. Eventually, these liquid crystal molecules 203 tilt in the same direction as the slits 204 extend, under an influence of the liquid crystal molecule 203 around the extremities respectively of the microelectrode parts 201.

However, liquid crystal molecules 203 between the data bus line 202 and each of the extremities of the respective microelectrode parts 201 tilt in a direction approximately perpendicular to the data bus line 202 when voltage is applied. This causes dark parts in this portion. If the widths respectively of the microelectrode parts 201 are made larger (for example, set at 6 μm), this increases a dark area, and accordingly reducing the brightness.

It is conceivable that, for the purpose of making the dark area smaller, each of the microelectrode parts 201 are stretched so that the interval between the microelectrode part 201 and the data bus line 202 is made narrower. However, mere reduction in the interval between the microelectrode part 201 and the data bus line 202 would result in increasing a parasitic capacitance between the microelectrode part 201 and the data bus line 202, thus causing a crosstalk. This leads to deterioration in the display quality. In other words, improvement in the brightness and check of the crosstalk are in a tradeoff relationship.

The applicants of the present invention closely observed the alignment state of the liquid crystal molecules in the liquid crystal display device including the picture element electrode with the shape as shown in FIG. 10. As a result of this observation, it was found that the liquid crystal molecules 203 tilt in a direction approximately perpendicular to the data bus line 202 in a part in the extremity of each of the microelectrode parts 201 (a part indicated by reference symbol A in FIG. 10) which has no portion opposite to its neighboring microelectrode part 201. The extremity of each of the microelectrode parts 201 is a factor in increasing the parasitic capacitance due to its vicinity to the data bus line 202.

Figure 11:
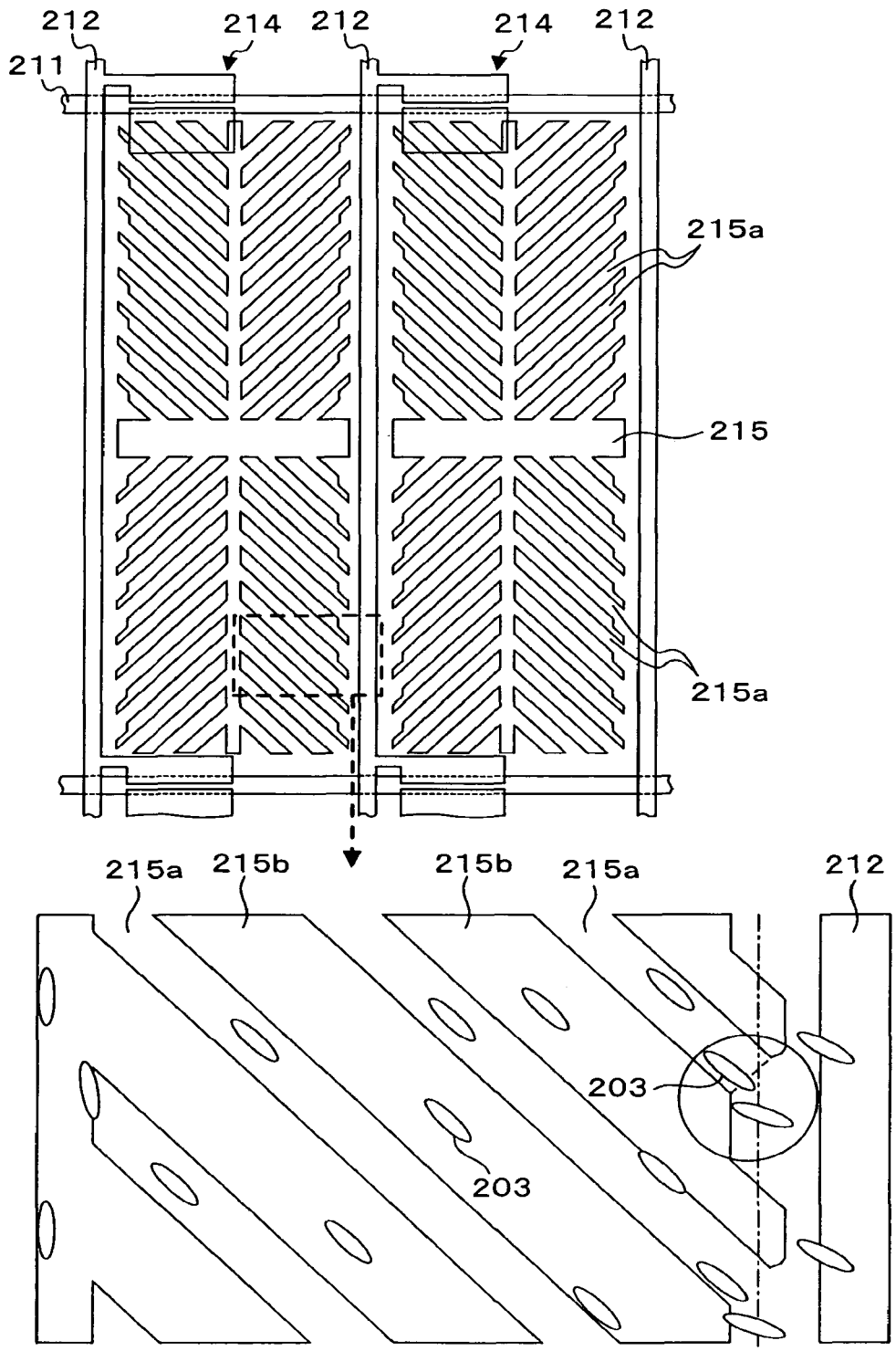
FIG. 11 is a plan view, and a partially enlarged view of the plan view, both showing a liquid crystal display device according to a first example of a sixth embodiment of the present invention.

With this taken into consideration, in the case of this embodiment, an interval between the data bus line 212 and each of the microelectrode parts 215b is made narrower, and concurrently a notch is provided in a part which constitutes the extremity of each of the microelectrode parts 215b, and which does not make a contribution to aligning the liquid crystal molecules in the same direction as each of the slits 215a extends, as shown in FIG. 11. In other words, a notch is provided in a part of the microelectrode part (a part encompassed by a circle in FIG. 11) which has no portion opposite to its neighboring microelectrode part. This avoids increasing the parasitic capacitance. This can improve the transmittance to be observed while a white display is being performed, and can save the power consumption. In addition, this avoids deteriorating the display quality.

It should be noted that reference numeral 211 denotes a gate bus line; 212, the data bus line; 214, a TFT; and 215, a picture element electrode. In addition, a dot-dashed line in the enlarged view of FIG. 11 denotes positions respectively of the extremities of the microelectrode parts of the conventional MVA mode liquid crystal display device.

It is very difficult to form microelectrode parts, in which extremities have an acute angle, by use of a photolithography process. Usually, the extremities respectively of the microelectrode parts are round. In addition, the roundness varies from one extremity to another due to a slight change in a condition under which a photolithography process is performed. This is a cause for making the optical characteristics nonuniform. For this reason, it is preferable that the extremities respectively of the microelectrode parts be shaped like an arc with a predetermined curvature, or like a polygon, when it is designed.

The applicants of the present invention further closely observed the alignment state of the liquid crystal molecules in the liquid crystal display device whose picture element electrodes have the shape as shown in FIG. 10. As a result of this observation, it was found that the liquid crystal molecules 203 did not tilt in a direction at an angle of 45 degrees in the vicinity of the base end of each of the slits 204 (a part indicated by reference symbol B in FIG. 10), and that this was a cause for decreasing a degree of white brightness. It is conceivable that this stemmed from the following reason.

The stem part of each of the picture element electrode (a part connecting the microelectrode parts with one another: in other words, a connection electrode 205) is formed so as to be in parallel with the gate bus line 202. With regard to liquid crystal molecules 203 in an area B surrounded by this connection electrode 205 and the microelectrode part 201, some of the liquid crystal molecules 203 are going to tilt in a direction orthogonal to a line of electric force stemming from the connection electrode 205, and the others are going to tilt in a direction orthogonal to a line of electric force stemming from the microelectrode part 201. As a result, the two groups of the liquid crystal molecules 203 collide with each other. Eventually, the two groups tilt in a direction which keeps a balance between the two groups, or in a direction of a line which bisects an angle between the connection electrode 205 and the microelectrode part 201. This direction deviates from the direction in which each of the slits 204 extends. This decreases the transmittance while a white display is being performed.

Figure 12:
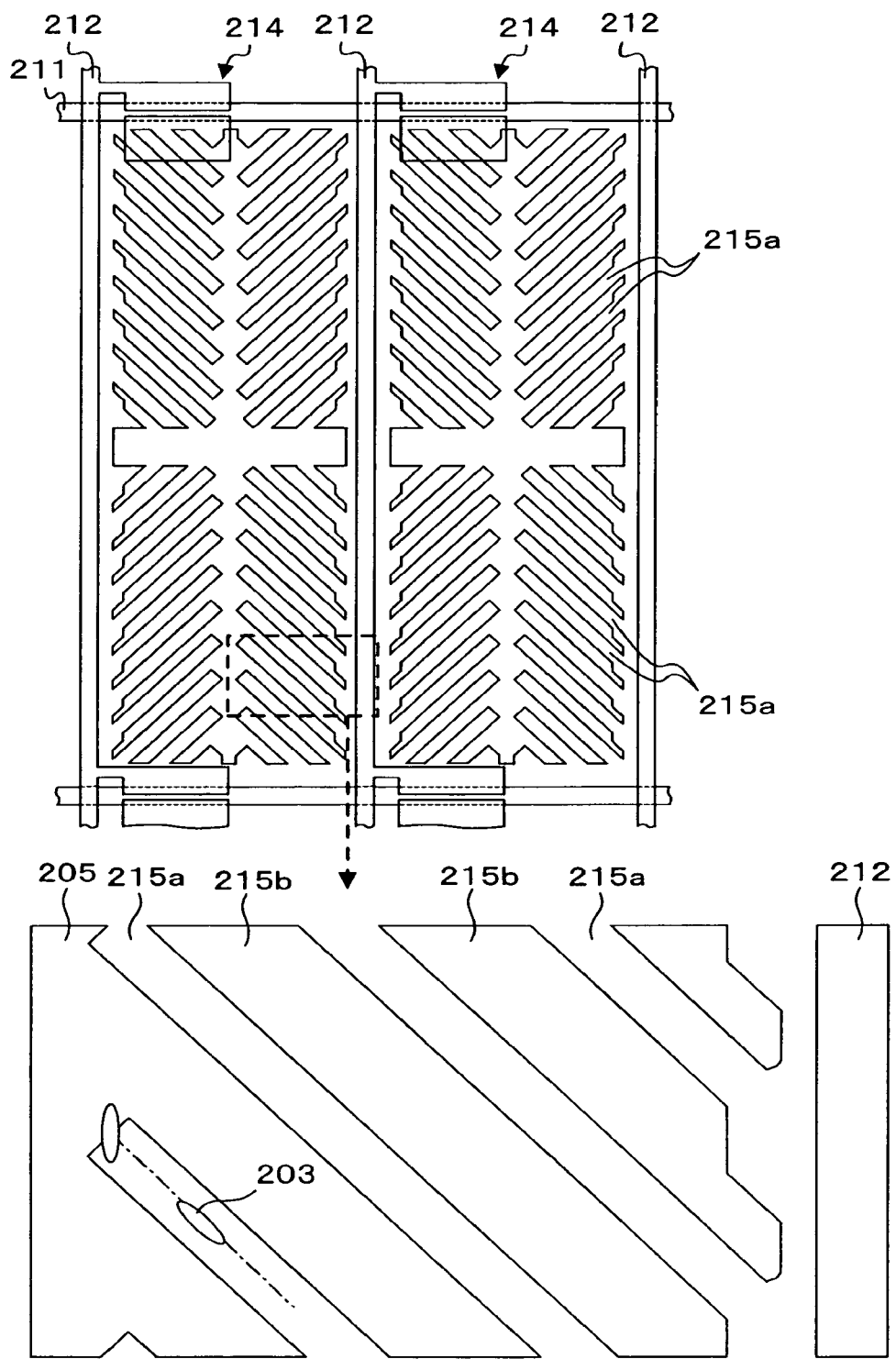
FIG. 12 is a plan view, and a partially enlarged view of the plan view, both showing a liquid crystal display device according to a second example of the sixth embodiment of the present invention.
Figure 13:
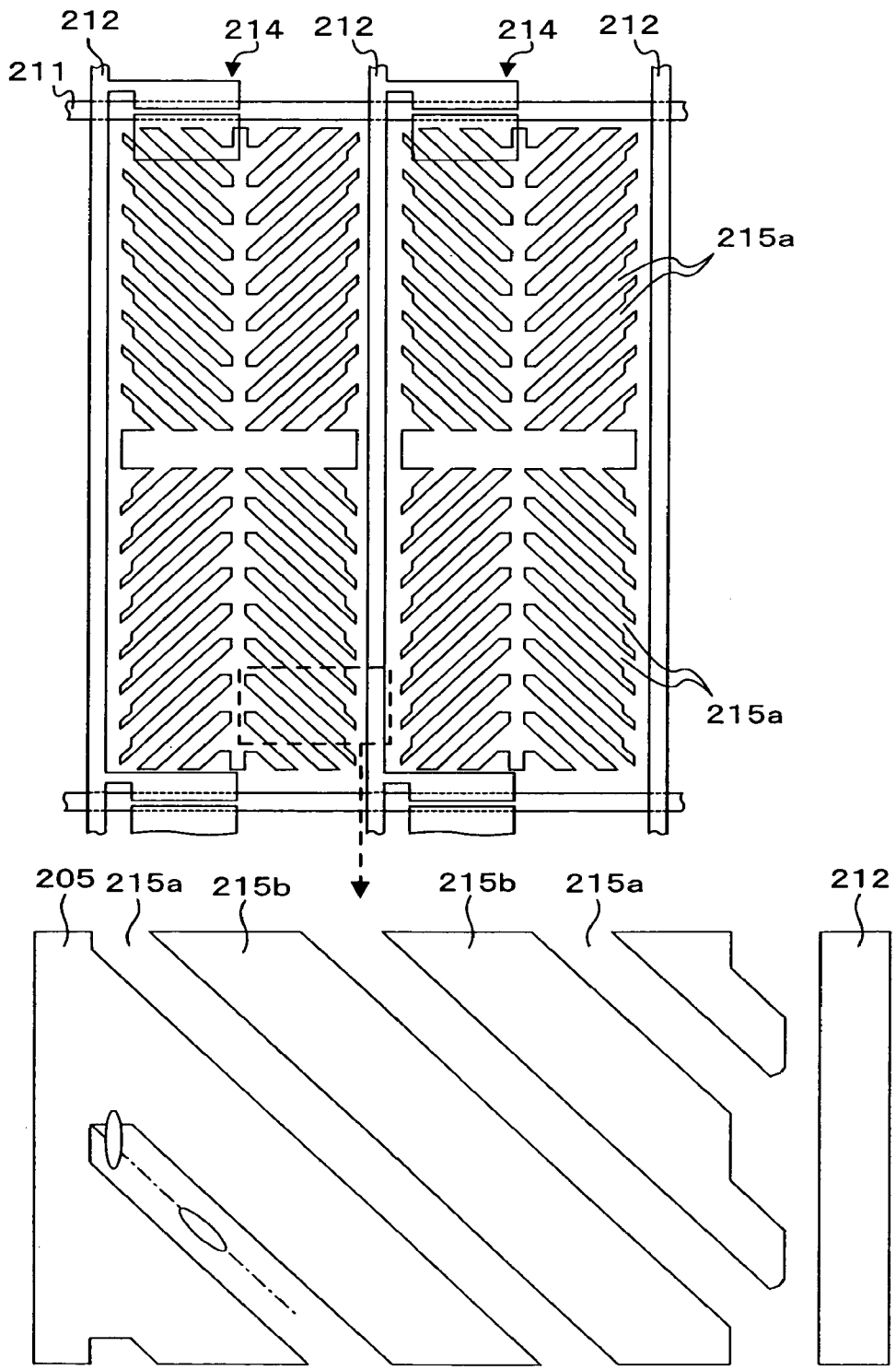
FIG. 13 is a plan view, and a partially enlarged view of the plan view, both showing a liquid crystal display device according to a third example of the sixth embodiment of the present invention.

With this taken into consideration, in the case of this embodiment, the base end of each of the slits is designed to have a shape which is symmetrical along the center line of the slit. Specifically, for example, as shown in FIG. 12, the base end of each of the slits 215a is designed to have a shape in which the two angles at the bottom of the base end are 90 degrees. Otherwise, for example, as shown in FIG. 13, the base end is designed to be shaped like an isosceles triangle. These shapes cause the liquid crystal molecules 203 around the base end of each of the slits 215a to tilt in the same direction as the center line of the slit 215a extends. This improves the brightness.

Hereinbelow, descriptions will be provided for a result of examining characteristics respectively of the liquid crystal display devices according to examples of this embodiment which have been actually manufactured while comparing with comparative examples. It should be noted that, each of the liquid crystal display devices respectively according to the examples and the comparative examples has an opposing substrate with the same structure as that of the opposing substrate of the liquid crystal display device according to the first embodiment. In addition, diacrylate is added to the liquid crystal (liquid crystal with negative dielectric anisotropy). This liquid crystal is filled in the space between the TFT substrate and the opposing substrate. Thereafter, beams of ultraviolet light are irradiated to the diacrylate while predetermined voltage is being applied between the picture element electrode and the common electrode. A polymer is formed in the liquid crystal layer in this manner. In addition, polarizing plates are arranged respectively on the two sides of the liquid crystal panel.

FIRST COMPARATIVE EXAMPLE

A liquid crystal display device having picture element electrodes as shown in FIG. 1 was manufactured. In the case of the liquid crystal display device according to the first comparative example, the thickness d of the liquid crystal layer was 3.8 µm, the width L of each of the microelectrode parts was 3 µm, and the width S of each of the slits was 3.5 µm. In this occasion, L+d−S took on 3.3 µm, and did not satisfy the equation (1). When a display was performed with middle gray-scale on the entire surface of the liquid crystal display device according to the first comparative example, tile-shaped patterns were observed.

SECOND COMPARATIVE EXAMPLE

A liquid crystal display device having picture element electrodes as shown in FIG. 1 was manufactured. In the case of the liquid crystal display device according to the second comparative example, the thickness d of the liquid crystal layer was 4 µm, the width L of each of the microelectrode parts was 3 µm, and the width S of each of the slits was 3.5 µm. In this occasion,
L+d−S took on 3.5 µm, and did not satisfy the equation (1). When a display was performed with middle gray-scale on the entire surface of the liquid crystal display device according to the second comparative example, tile-shaped patterns were observed.

THIRD COMPARATIVE EXAMPLE

A liquid crystal display device having picture element electrodes as shown in FIG. 1 was manufactured. In the case of the liquid crystal display device according to the third comparative example, the thickness d of the liquid crystal layer was 4 µm, the width L of each of the microelectrode parts was 6 µm, and the width S of each of the slits was 3.5 µm. In this occasion,
L+d−S took on 6.5 µm, and satisfied the equation (1). When a display was performed with middle gray-scale on the entire surface of the liquid crystal display device according to the third comparative example, no tile-shaped pattern was observed. However, when the brightness was measured while a white display was being performed on this liquid crystal display device, it was found that the brightness decreased by approximately 10% in comparison with the liquid crystal display device according to the second comparative example.

FIRST EXAMPLE

A liquid crystal display device having picture element electrodes as shown in FIG. 11 was manufactured. In the case of the liquid crystal display device according to the first example, the thickness d of the liquid crystal layer was 4 µm, the width L of each of the microelectrode parts was 6 µm, and the width S of each of the slits was 3 µm. In this occasion, L+d−S took on 7 µm, and satisfied the equation (1). When a display was performed with middle gray-scale on the entire surface of the liquid crystal display device according to the first example, no tile-shaped pattern was observed. In addition, when the brightness was measured while a white display was being performed on this liquid crystal display device, it was found that the brightness was improved by approximately 7% in comparison with the liquid crystal display device according to the third comparative example.

SECOND EXAMPLE

A liquid crystal display device having picture element electrodes as shown in FIG. 12 was manufactured. In the case of the liquid crystal display device according to the second example, the thickness d of the liquid crystal layer was 4 µm, the width L of each of the microelectrode parts was 6 µm, and the width S of each of the slits was 3 µm. In this occasion, L+d−S took on 7 µm, and satisfied the equation (1). When a display was performed with middle gray-scale on the entire surface of the liquid crystal display device according to the second example, no tile-shaped pattern was observed. In addition, when the brightness was measured while a white display was being performed on this liquid crystal display device, it was found that the brightness was improved by approximately 7.1% in comparison with the liquid crystal display device according to the third comparative example.

THIRD EXAMPLE

A liquid crystal display device having picture element electrodes as shown in FIG. 13 was manufactured. In the case of the liquid crystal display device according to the third example, the thickness d of the liquid crystal layer was 4 µm, the width L of each of the microelectrode parts was 6 µm, and the width S of each of the slits was 3 µm. In this occasion, L+d−S took on 7 µm, and satisfied the equation (1). When a display was performed with middle gray-scale on the entire surface of the liquid crystal display device according to the third example, no tile-shaped pattern was observed. In addition, when the brightness was measured while a white display was being performed on this liquid crystal display device, the brightness was improved by approximately 7.1% in comparison with the liquid crystal display device according to the third comparative example.

Through comparison of the first to the third examples with the first to the third comparative examples, it was confirmed that the liquid crystal display devices according to this embodiment were effective for improving the display quality, and that the transmittance to be observed while a white display was being performed was so high that the liquid crystal display device was effective in saving power consumption.

SEVENTH EMBODIMENT

Hereinafter, descriptions will be provided for a seventh embodiment of the present invention.

In the case of the liquid crystal display device according to the first embodiment, the aperture ratio can be made larger, since the liquid crystal display device does not include structural components such as protrusions and wide slits. If, however, the auxiliary capacitance were not sufficiently large relative to the picture element capacitance, voltage to be applied to the liquid crystal decreases to a large extent in a frame period (approximately 16.7 ms). Accordingly, the transmittance intensity is saturated before it reaches its peak. This is a phenomenon which is termed as a two-step response. In a case where the transmission intensity is saturated while it is less than or equal to 90% due to a two-step response, even if the liquid crystal were caused to rise sharply, a speed at which the liquid crystal panel responds can not be increased. With this taken into consideration, in the case of this embodiment, a capacitance value of the auxiliary capacitance is intended to be increased while the aperture ratio is being maintained, thereby solving the aforementioned problems. Specific descriptions will be provided for the present invention with reference to FIGS. 14 and 15.

Figure 14:
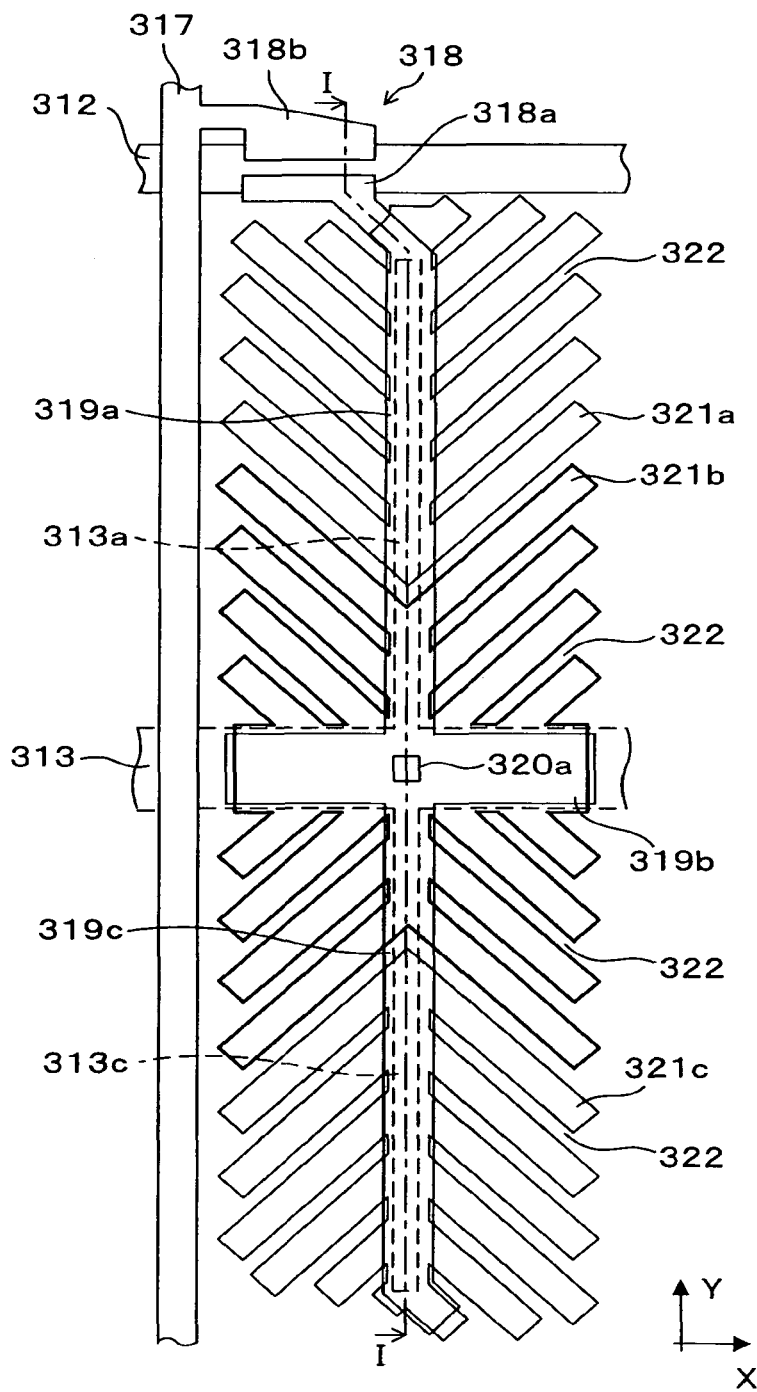
FIG. 14 is a plan view showing a liquid crystal display device according to a seventh embodiment of the present invention.
Figure 15:
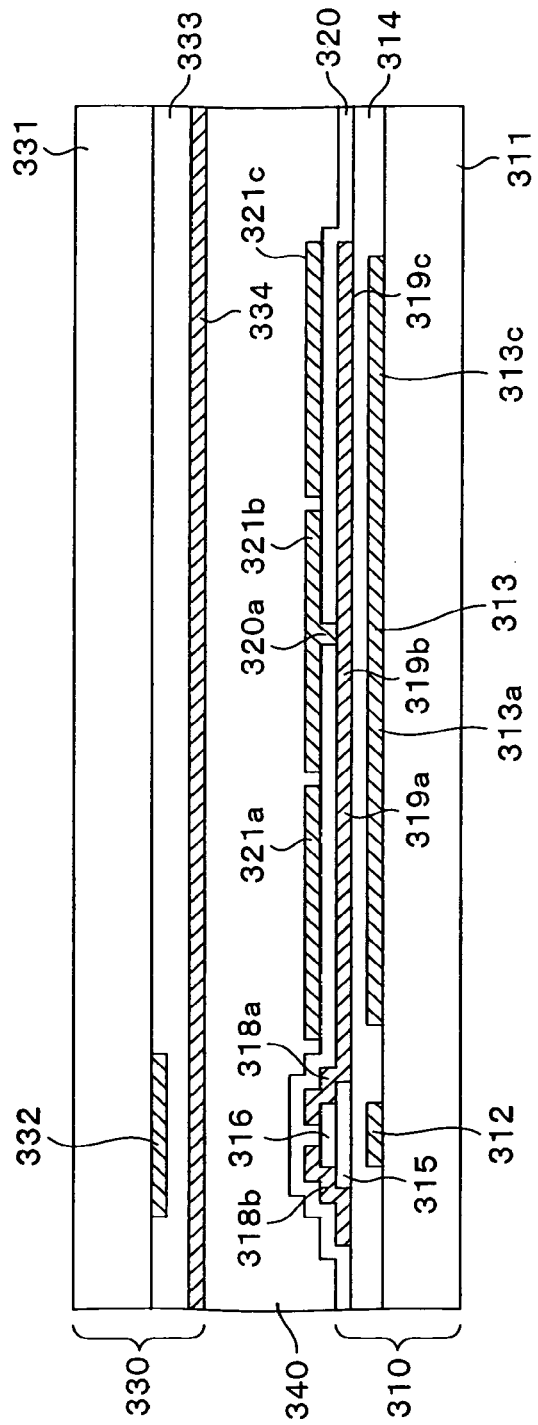
FIG. 15 is a cross-sectional view taken along the I-I line in FIG. 14.

FIG. 14 is a plan view showing one picture element in a liquid crystal display device according to the seventh embodiment of the present invention. FIG. 15 is a cross-sectional view taken along the I-I line in FIG. 14. Incidentally, an illustration of a polarizing plate is omitted in FIG. 14.

On a TFT substrate 310, a plurality of gate bus lines 312 extending in the horizontal direction (X-axis direction) and a plurality of data bus lines 317 extending in the perpendicular direction (Y-axis direction) are formed as shown in FIG. 14. Picture element regions are defined by the gate bus lines 312 and the data bus lines 317, and are shaped like a rectangle. In the center of each of the picture element regions, an auxiliary capacitance bus line 313 is formed so as to be in parallel with the gate bus line 312.

In each of the picture element regions, auxiliary capacitance lower electrodes 313a and 313c, a TFT 318, an auxiliary capacitance electrode 319b, control electrodes 319a and 319c, and a first to a third sub picture element electrodes 321a to 321c are formed. The auxiliary capacitance lower electrodes 313a and 313c are formed so as to be in parallel with a center line of the picture element region, the center line being in parallel with the Y axis. The auxiliary capacitance lower electrodes 313a and 313c are electrically connected with the auxiliary capacitance bus line 313.

With regard to the TFT 318, a part of the gate bus line 312 is used as the gate electrode. A drain electrode 318a and a source electrode 318b are arranged to be opposed to each other with the gate bus line 312 interposed therebetween.

The control electrodes 319a and 319c are formed in positions respectively opposite to the auxiliary capacitance lower electrodes 313a and 313c with a first insulating film 314 interposed therebetween. The control electrodes 319a and 319c are electrically connected with the drain electrode 318a. In addition, the auxiliary capacitance electrode 319b is formed so as to be opposite to the auxiliary capacitance bus line 313 with the first insulating film 314 interposed therebetween. The auxiliary capacitance electrode 319b is electrically connected with the control electrodes 319a and 319c. An auxiliary capacitance is constituted of: a group consisting of the auxiliary capacitance bus line 313 as well as the auxiliary capacitance lower electrodes 313a and 313c; a group consisting of the auxiliary capacitance electrode 319b as well as the control electrodes 319a and 319c; and the first insulating film 314 between the two groups.

The sub picture element electrodes 321a to 321c are formed of a transparent conductive material such as ITO, and are arranged, on a second insulating film 320, along the data bus line 317. As shown in FIG. 14, the sub picture element electrode 321a (capacitively-coupled picture element electrode) is arranged in a range upper in the Y axis direction of the picture element region, and is divided into two fields (domain control fields) with a center line in parallel with the Y axis defined as the boundary. In addition, slits 322 extending in a direction at an angle of 45 degrees to the X axis are formed in the right field. Slits 322 extending in a direction at an angle of 135 degrees to the X axis are formed in the left field. This sub picture element electrode 321a is capacitively coupled to the control electrode 319a through the second insulating film 320.

The sub picture element electrode 321b (directly-connected picture element electrode) is arranged in the center of the picture element region. The sub picture element electrode 321b is divided into four fields (domain control fields) with a center line in parallel with the X axis and with a center line in parallel with the Y axis defined as the boundaries. Slits 322 extending in a direction at an angle of 45 degrees to the X axis are formed in the upper right field. Slits 322 extending in a direction at an angle of 135 degrees to the X axis are formed in the upper left field. Slits 322 extending in a direction at an angle of 225 degrees to the X axis are formed in the lower left field. Slits 322 extending in a direction at an angle of 315 degrees to the X axis are formed in the lower right field. This sub picture element electrode 321b is electrically connected to the auxiliary capacitance electrode 319b through a contact hole 320a.

The sub picture element electrode 321c (capacitively-coupled picture element electrode) is arranged in a range lower in the Y axis direction of the picture element region, and is divided into two fields (domain control fields) with a center line in parallel with the Y axis defined as the boundary. In addition, slits 322 extending in a direction at an angle of 315 degrees to the X axis are formed in the right field. Slits 322 extending in a direction at an angle of 225 degrees to the X axis are formed in the left field. This sub picture element electrode 321c is capacitively coupled to the control electrode 319c through the second insulating film 320.

Hereinbelow, further detailed descriptions will be provided for structures respectively of the TFT substrate 310 and an opposing substrate 330 with reference to the plan view of FIG. 14 and the cross-sectional view of FIG. 15.

The gate bus line 312, the auxiliary capacitance bus line 313 and the auxiliary capacitance lower electrodes 313a and 313c are formed on a glass substrate 311 which constitutes the base of the TFT substrate 310. The gate bus line 312, the auxiliary capacitance bus line 313 and the auxiliary capacitance lower electrodes 313a and 313c are simultaneously formed through patterning a metallic film, into which, for example, Al and Ti are laminated, by use of a photolithography process.

The first insulating film (gate insulating film) 314, made of $SiO_2$, SiN or the like, is formed over the gate bus line 312, the auxiliary capacitance bus line 313, as well as the auxiliary capacitance lower electrodes 313a and 313c. A semiconductor film (amorphous silicon or polysilicon film) 315, which constitutes an active layer of the TFT 318, is formed in a predetermined area in the first insulating film 314. A channel protecting film 316 made of SiN or the like is formed on the semiconductor film 315. The drain electrode 318a and the source electrode 318b of the TFT 318 are formed respectively on the two sides of the channel protecting film 316.

The data bus line 317 and the auxiliary capacitance electrode 319b as well as the control electrodes 319a and 319c are formed on the first insulating film 314. The data bus line 317 is connected to the source electrode 318b of the TFT 318. The control electrodes 319a and 319c are connected to the drain electrode 318a of the TFT 318. As shown in FIG. 15, the auxiliary capacitance electrode 319b is formed in a position opposite to the auxiliary capacitance bus line 313 with the first insulating film 314 interposed therebetween. The control electrode 319a is formed in a position opposite to the auxiliary capacitance lower electrode 313a with the first insulating film 314 interposed therebetween. The control electrode 319c is formed in a position opposite to the auxiliary capacitance lower electrode 313c with the first insulating film 314 interposed therebetween.

The data bus line 317, the drain electrode 318a, the source electrode 318b and the auxiliary capacitance electrode 319b as well as the control electrodes 319a and 319c are simultaneously formed through patterning a metallic film, into which, for example, Ti, Al and Ti are laminated, by use of a photolithography process.

The second insulating film 320 made, for example, of SiN is formed over the data bus line 317, the drain electrode 318a, the source electrode 318b and the auxiliary capacitance electrode 319b as well as the control electrodes 319a and 319c. The sub picture element electrodes 321a to 321c are formed on the second insulating film 320. As described above, the sub picture element electrodes 321a to 321c are respectively provided with the slits 322 extending in the respective directions oblique to the X axis. In the case of this embodiment, the width of each of the slits 322 provided to the sub picture element electrodes 321a to 321c is 3.5 μm, and the width of a conductive material portion (microelectrode part) between each two neighboring slits 322 is 6 μm.

The sub picture element electrode 321a is capacitively coupled to the control electrode 319a through the second insulating film 320. The sub picture element electrode 321b is electrically connected to the auxiliary capacitance electrode 319b through the contact hole 320a, which has been formed in the second insulating film 320. The sub picture element electrode 321c is capacitively coupled to the control electrode 319c through the second insulating film 320.

A vertical alignment film (not illustrated) made of polyimide or the like is formed on the sub picture element electrodes 321a to 321c.

On the other hand, black matrices 332, color filters 333 and a common electrode 334 are formed on a glass substrate 331 (underneath the glass substrate 331 in FIG. 15) which constitutes the base of the opposing substrate 330.

The black matrix 332 is made, for example, of black resin or a metal such as Cr, and is arranged in a position opposite to the gate bus line 312, the data bus line 317, the auxiliary capacitance bus line 313 and the TFT 318 on the TFT substrate 310. Color filters 333 are classified into three types, such as red, green and blue. A color filter with any one of the three colors is arranged in each of the picture element regions.

The common electrode 334 is formed of a transparent conductive material such as ITO, and is arranged on the color filter 333 (on the lower side of the color filter 333 in FIG. 15). A vertical alignment film (not illustrated) made of polyimide or the like is formed on the common electrode 334 (on the lower side of the common electrode 334 in FIG. 15).

A liquid crystal layer 340 is arranged between the TFT substrate 310 and the opposing substrate 330. The liquid crystal layer 340 is made of liquid crystal with negative dielectric anisotropy which is contained between the TFT substrate 310 and the opposing substrate 330. A polymer is formed in the liquid crystal layer 340, the polymer determining directions in which liquid crystal molecules are aligned when voltage is applied. This polymer is formed in the following process. A polymer component (a monomer such as diacrylate) is added to the liquid crystal. Then, beams of ultraviolet light are irradiated to the polymer component while voltage is applied between the common electrode 334 and each of the sub picture element electrodes 321a to 321c. Thereby, the polymer component is polymerized into the polymer.

It should be noted that, in the case of this embodiment, liquid crystal with negative dielectric anisotropy is used. If liquid crystal with positive dielectric anisotropy were used instead, the liquid crystal molecules are aligned in parallel with the surfaces respectively of the substrates while no voltage is being applied. This hinders applied voltage from being made larger when the polymer component is intended to be polymerized. Accordingly, this makes it difficult for the alignment directions of the liquid crystal molecules to match the directions in which the slits extend.

In the case of this embodiment, the auxiliary capacitance lower electrodes 313a and 313c as well as the control electrodes 319a and 319c are arranged in an area along a boundary between neighboring domain control fields which are different from each other in alignment direction of liquid crystal molecules, or in an area where light is not transmitted. This arrangement enables the auxiliary capacitance to be made larger without decreasing the aperture ratio. On the contrary, the widths respectively of the auxiliary capacitance bus line 313 and the auxiliary capacitance electrode 319b may be made smaller in response to the capacitance constituted of the auxiliary capacitance lower electrodes 313a and 313c as well as the control electrodes 319a and 319c. In this case, the aperture ratio can be increased while the capacitance value of the auxiliary capacitance is being maintained.

Figure 16:
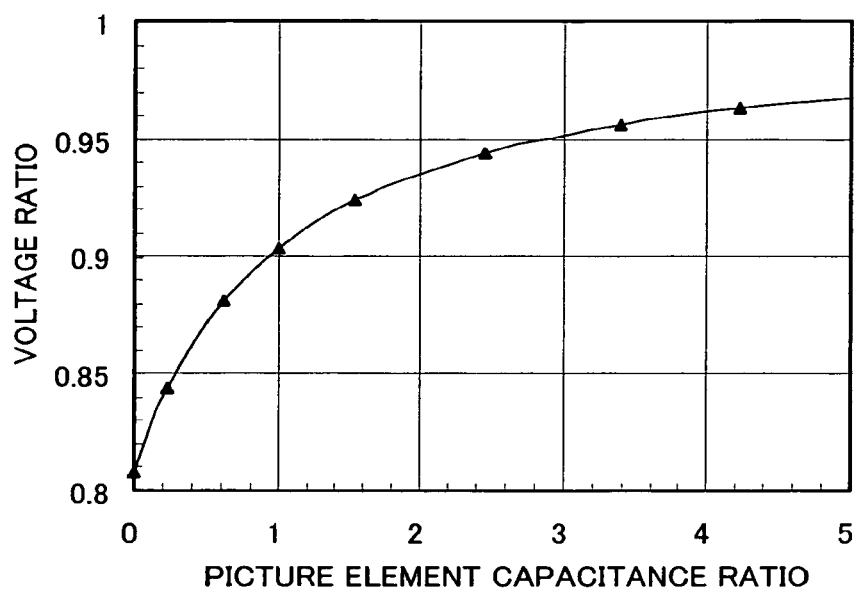
FIG. 16 is a diagram showing relationship between a capacitance ratio of a picture element and a voltage ratio.

FIG. 16 is a diagram showing a relationship between a picture element capacitance ratio (a ratio of the auxiliary capacitance to the picture element capacitance) and a voltage ratio with the picture element capacitance ratio and the voltage ratio represented respectively by the horizontal axis and the vertical axis. Note that, in this case, 4 μm is the thickness (cell gap) of the liquid crystal layer; 0.33 μm is the thickness of the first insulating film between a group of the auxiliary capacitance bus line and the auxiliary capacitance lower electrodes and a group of the auxiliary capacitance electrode and the control electrodes; −3.5 is a variation $\Delta \in$ in conductivity of the liquid crystal; and 53% is the aperture ratio. In addition, the voltage ratio represents a ratio of a write-in voltage during a white display to voltage which is applied to the liquid crystal layer. The write-in voltage during the white display is set at 1.

In this case, with regard to the auxiliary capacitance of the liquid crystal display device according to the first embodiment as shown in FIG. 3, its picture element capacitance ratio was 1.5. On the other hand, with regard to the auxiliary capacitance of the liquid crystal display device according to this embodiment, its picture element capacitance ratio was 2.5. With regard to the liquid crystal display device according to the first embodiment, when the picture element capacitance ratio was converted to a ratio of voltage to be applied to the liquid crystal, the voltage ratio was 0.92. With regard to the liquid crystal display device according to this embodiment, when the picture element capacitance ratio was converted to a ratio of voltage to be applied to the liquid crystal, the voltage ratio was 0.94. It has been already found that, in a case where the voltage ratio became smaller than a voltage ratio which caused the transmission intensity to measure 90%, even if the liquid crystal molecules rose sharply, the response speed of the liquid crystal panel did not increase. The voltage ratio which caused the transmission intensity to measure 90% affected not only the optical characteristics of the liquid crystal but also the alignment uniformity of the liquid crystal molecules. In each of the cases of the liquid crystal display devices according to the first and the seventh embodiments, its respective voltage ratio which caused the transmission intensity to measure 90% was 0.93. It has been learned through these that the liquid crystal display device according to this embodiment had preferable response characteristics.

The liquid crystal display device according to the first embodiment and the liquid crystal display device according to this embodiment were actually manufactured, and their respective response speeds were measured. In other words, for each of the two liquid crystal display devices, a rise time (τr) in which the transmission intensity rose from 10% to 90% was measured, and a fall time (τf) in which the transmission intensity fell from 90% to 10% was measured. Then, a response speed defined by summation of the rise time and the fall time was measured. As a result of the measurements, it was proved that a response speed of the liquid crystal display device according to the first embodiment was 20 ms whereas a response speed of the liquid crystal display device according to this embodiment was as short as 12 ms.

(Eighth Embodiment)

Hereinbelow, descriptions will be provided for an eighth embodiment of the present invention.

In the case of the aforementioned liquid crystal display device according to the seventh embodiment, the voltage which is applied to the sub picture element electrode 321b directly connected to the TFT 318 is different from the voltage which is applied to the sub picture element electrodes 321a and 321c connected to the TFT 318 though capacitive coupling. This causes electric potential difference between the sub picture element electrode 321b and each of the sub picture element electrodes 321a and 321c. This electric potential difference causes the alignment direction of the liquid crystal molecules between the sub picture element electrode 321b and the sub picture element electrode 321a as well as the alignment direction of the liquid crystal molecules between the sub picture element electrode 321b and the sub picture element electrode 321c to deviate respectively from the directions in which the slits 322 extend. A phenomenon of this kind is termed as an azimuth deviation (or a φ deviation). If the azimuth deviation occurred, the birefringence of the liquid crystal decreases locally. This causes a dark line to occur. This is a cause for decreasing the light transmittance.

Figure 17:
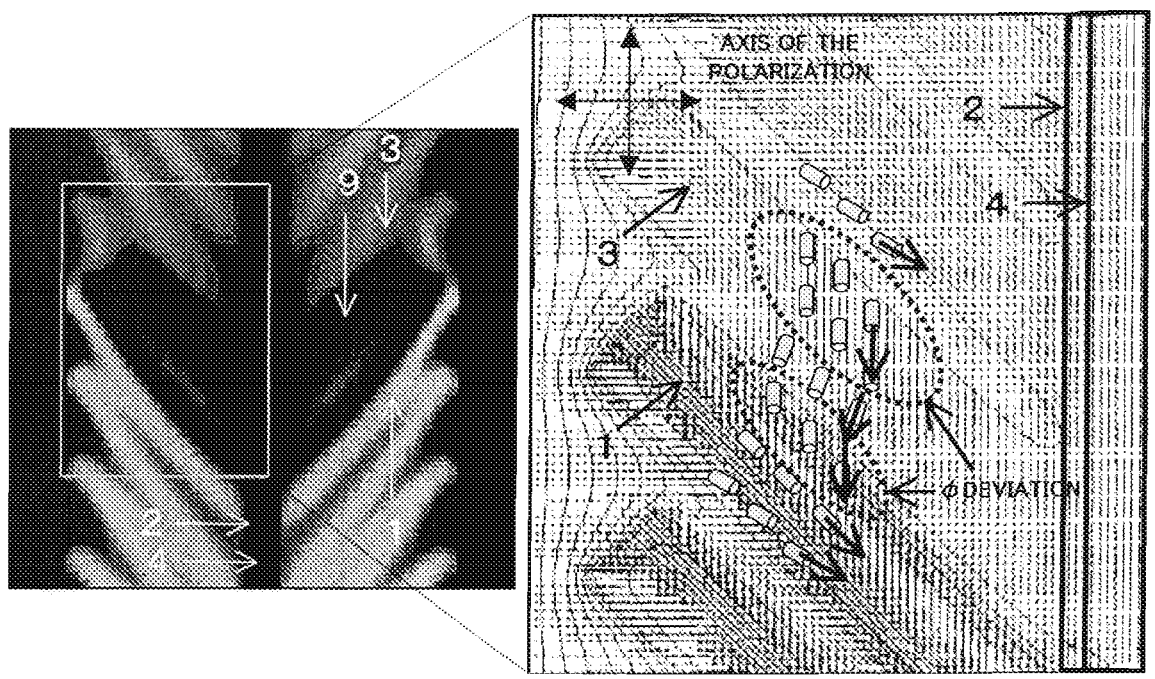
FIG. 17 is a diagram showing transmittance characteristics and alignment characteristics in the case of the liquid crystal display device according to the seventh embodiment.

FIG. 17 is a diagram showing transmittance characteristics and alignment characteristics in the case of the liquid crystal display device according to the seventh embodiment. In FIG. 17, reference numeral 2 denotes an auxiliary capacitance lower electrode (corresponding to the auxiliary capacitance lower electrodes 313a and 313c in FIG. 14); 4, a control electrode (corresponding to the control electrodes 319a and 319c in FIG. 14); 1, a sub picture element electrode connected to the TFT (corresponding to the sub picture element electrode 321b in FIG. 14); and 3, a sub picture element electrode capacitively coupled to the control electrode 4 (corresponding to the sub picture element electrodes 321a and 321c in FIG. 14).

As shown in FIG. 17, an electric potential difference occurs between the sub picture element electrodes 1 and 3. This causes a phenomenon (an azimuth deviation) where the alignment directions of liquid crystal molecules deviate from the directions in which the slits extend. In addition, portions where the respective azimuth deviations occur turn into dark lines since the birefringence of the liquid crystal decreases in each of the portions. In the case of the liquid crystal display device according to the seventh embodiment, as indicated by reference numeral 9 in FIG. 17, dark lines occur respectively on the two sides (portions encompassed respectively by dashed lines in the right diagram in FIG. 17) of the microelectrode part in an edge of the sub picture element electrode 3 (a microelectrode part which is the closest to the sub picture element electrode 1).

With this taken into consideration, in the case of this embodiment, the dark lines are inhibited from occurring between the sub picture element electrode directly connected to the TFT and each of the sub picture element electrodes capacitively coupled to the TFT. This enables the substantial aperture ratio to be improved. Hereinbelow, specific descriptions will be provided for this embodiment with reference to FIG. 18.

Figure 18:
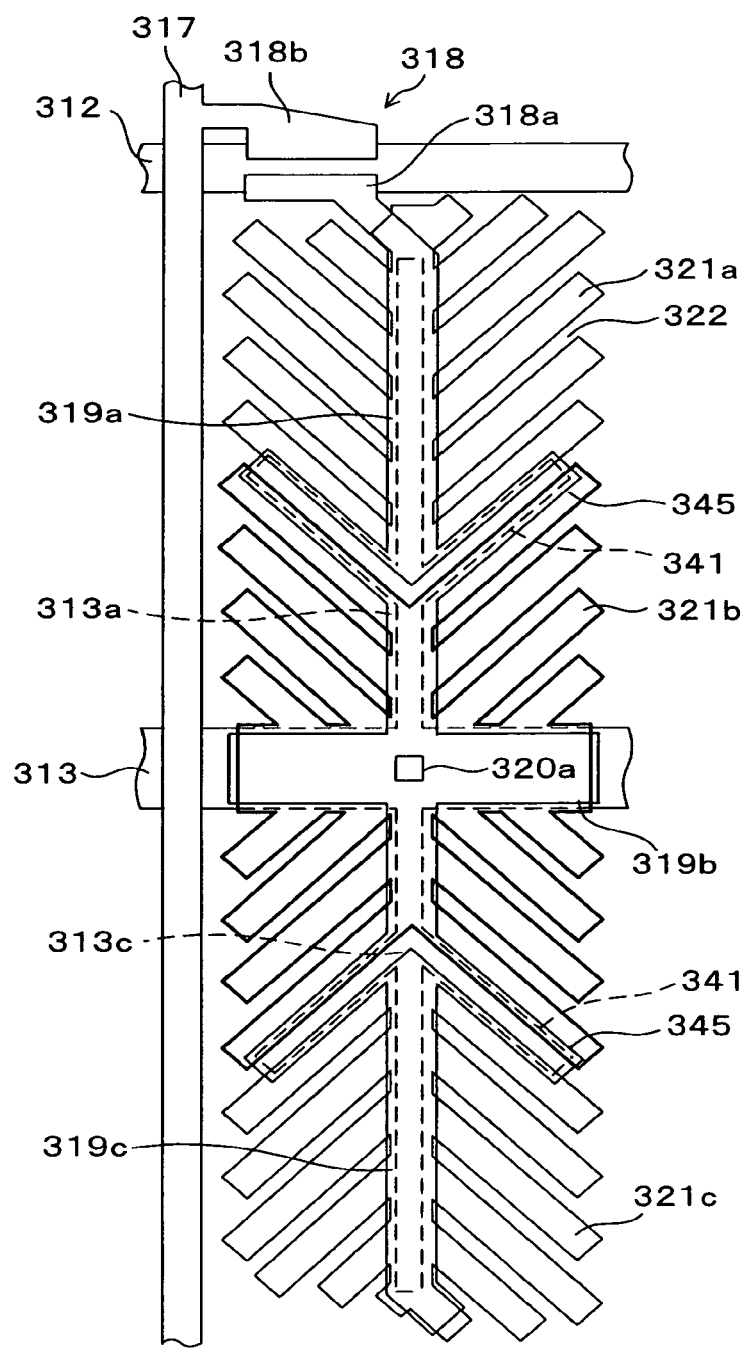
FIG. 18 is a plan view showing a liquid crystal display device according to an eighth embodiment of the present invention.

FIG. 18 is a plan view showing a picture element in a liquid crystal display device according to the eighth embodiment of the present invention. Incidentally, if components and equivalents in FIG. 18 were the same as, or similar to, those in FIG. 14, the components and equivalents in FIG. 18 are denoted by the same reference numerals and symbols as those in FIG. 14 are. Thus, detailed descriptions will be omitted for the same, or similar, components and equivalents in FIG. 18.

In the case of this embodiment, a group of an auxiliary capacitance lower electrode 341 and a control electrode 345 is arranged under an area between a sub picture element electrode 321b directly connected to a TFT 318 and a sub picture element electrode 321a capacitively coupled to a control electrode 319a. The other group of an auxiliary capacitance lower electrode 341 and a control electrode 345 is arranged under an area between the sub picture element electrode 321b directly connected to the TFT 318 and a sub picture element electrode 321c capacitively coupled to a control electrode 319c. The auxiliary capacitance lower electrode 341 is formed so as to be in parallel with each of the slits 322 in the vicinity of the auxiliary capacitance lower electrode 341, and is connected to auxiliary capacitance lower electrodes 313a and 313c. In addition, the control electrodes 345 are formed in the respective positions opposite to the auxiliary capacitance lower electrodes 341 with a first insulating film interposed therebetween, and are connected respectively to the control electrodes 319a and 319c.

As described above, in the case of the liquid crystal display device according to this embodiment, one control electrode 345, whose voltage is equal to that of a drain electrode 318a of the TFT 318, is formed under the area between the sub picture element electrode 321b and the sub picture element electrode 321a. The other control electrode 345, whose voltage is equal to that of the drain electrode 318a of the TFT 318, is formed under the area between the sub picture element electrode 321b and the sub picture element electrode 321c. Accordingly, one electric field in the horizontal direction occurs between the sub picture element electrode 321b and the sub picture element electrode 321a. The other electric field in the horizontal direction occurs between the sub picture element electrode 321b and the sub picture element electrode 321c. One electric field in oblique directions occurs between the sub picture element electrode 321a and the control electrode 345. The other electric field in oblique directions occurs between the sub picture element electrode 321c and the control electrode 345.

Electric field intensity (electric field density) is in proportion to an electric potential difference and a distance between electrodes. In accordance with this law, influence which each of the electric fields in the oblique directions has on the liquid crystal molecules is larger than influence which each of the electric fields in the horizontal direction has on the liquid crystal molecules, while the interval between the sub picture element electrode 321b and each of the sub picture element electrodes 321a and 321c is 3.5 µm (equal to the width of each of the slits 322); and the thickness of the insulating film between the control electrode 345 and each of the sub picture element electrodes 321a and 321c is 0.33 µm. Accordingly, only in one (the one side being opposite to the sub picture element electrode 321b) of the two sides of microelectrode parts, which are the extremities of the sub picture element electrodes 321a and 321c, do dark lines occur. This improves the substantial aperture ratio.

Figure 19:
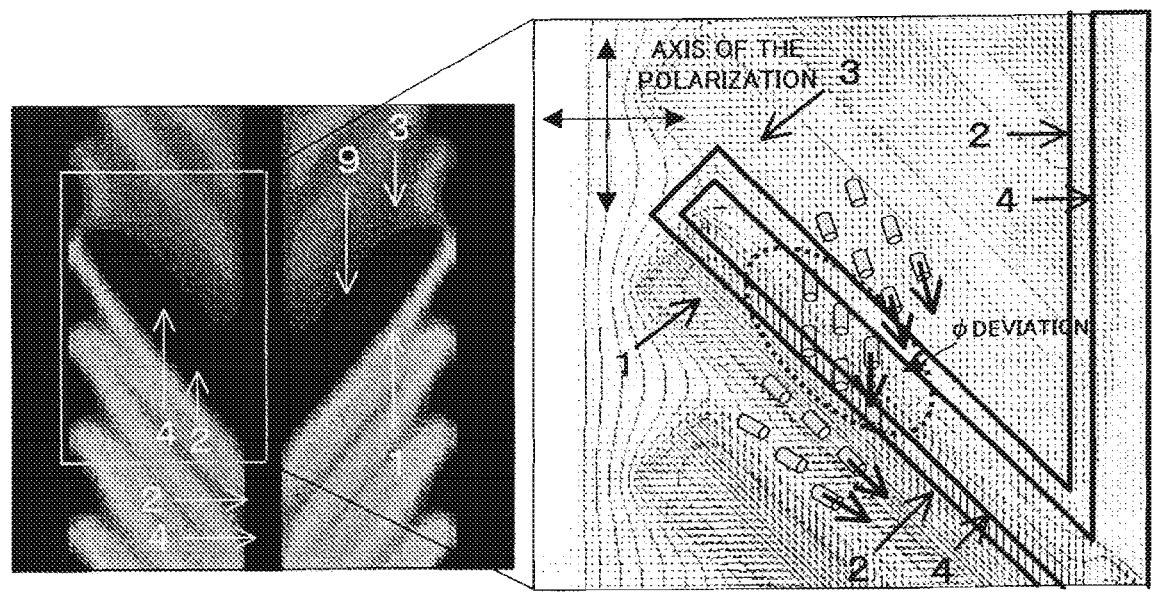
FIG. 19 is a diagram showing transmittance characteristics and alignment characteristics in the case of the liquid crystal display device according to the eighth embodiment.

FIG. 19 is a diagram showing transmittance characteristics and alignment characteristics in the case of the liquid crystal display device according to this embodiment. If components and equivalents in FIG. 19 were the same as those in FIG. 17, the components and equivalents in FIG. 19 are denoted by the same reference numerals as those in FIG. 17 are. In the case of the liquid crystal display device according to this embodiment, only in one of the two sides of the microelectrode part (a side encompassed by a dashed line in FIG. 19), which was an edge of the sub picture element electrode 3, did a dark line occur, as shown in FIG. 19. Through comparing FIG. 19 with FIG. 17, it is learned that the liquid crystal display device according to this embodiment has an improved substantial aperture ratio in comparison with the liquid crystal display device as shown in FIG. 17.

Furthermore, the liquid crystal display device according to this embodiment has larger auxiliary capacitance than that according to the seventh embodiment, since the auxiliary capacitance lower electrodes 341 are formed respectively under the control electrodes 345. This brings about an advantage of further reducing the response time of the liquid crystal panel.

Figure 20:
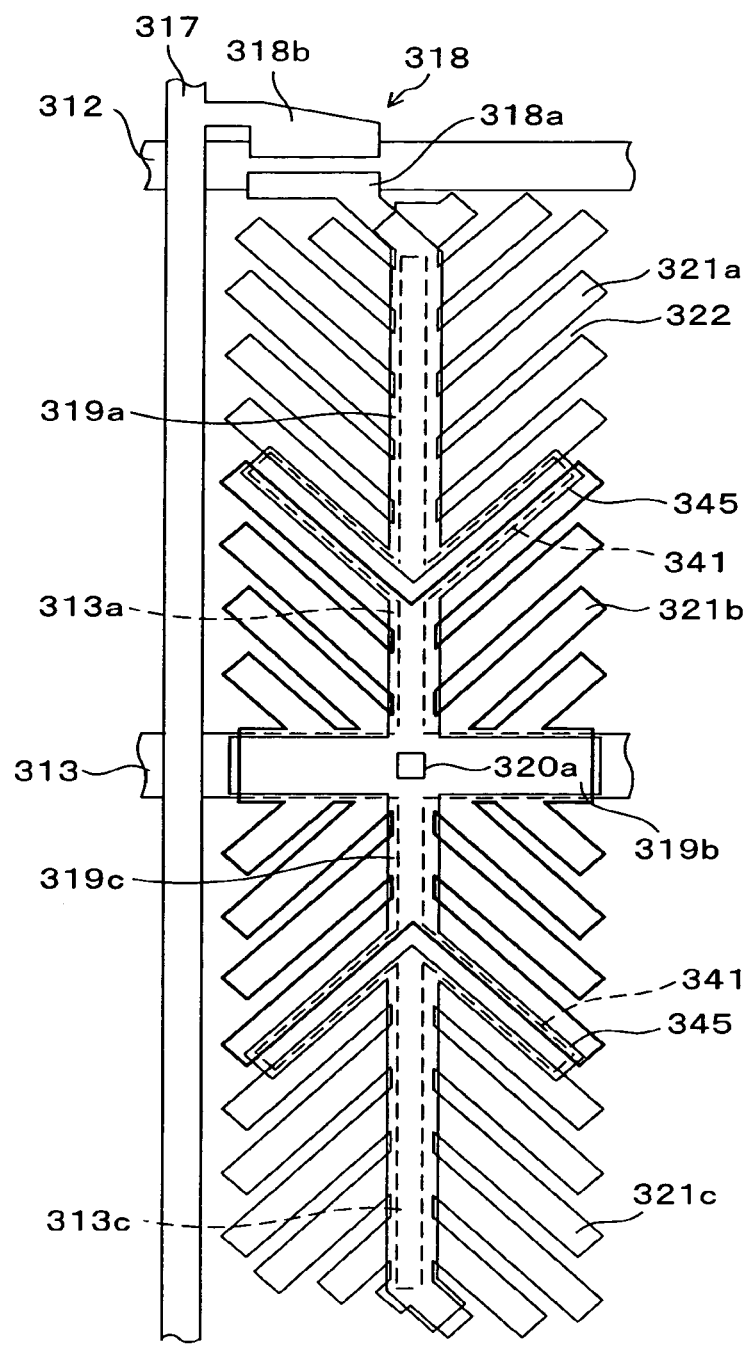
FIG. 20 is a plan view showing another example of a liquid crystal display device according to the eighth embodiment.

As shown in FIG. 20, the widths respectively of the auxiliary capacitance bus line 313 and the auxiliary capacitance electrode 319b may be made smaller in response to a capacitance constituted of the control electrodes 345 and the auxiliary capacitance lower electrode 341. The smaller widths respectively of the auxiliary capacitance bus line 313 and the auxiliary capacitance electrode 319b brings about another advantage of further improving the substantial aperture ratio.

In the case of the liquid crystal display device as shown in FIG. 18, when the picture element capacitance ratio was converted into a ratio of voltage to be applied to liquid crystal, the voltage ratio was 0.96. In the case of the liquid crystal display device as shown in FIG. 20, when the picture element capacitance ratio was converted into a ratio of voltage to be applied to liquid crystal, the voltage ratio was 0.94. In addition, the liquid crystal display devices respectively as shown in FIGS. 18 and 20 were actually manufactured, and their respective response speeds were measured. As a result of the measurement, 10 ms was the response speed of the liquid crystal display device as shown in FIG. 18, and 12 ms was the response speed of the liquid crystal display device as shown in FIG. 20.

(Ninth Embodiment)

Figure 21:
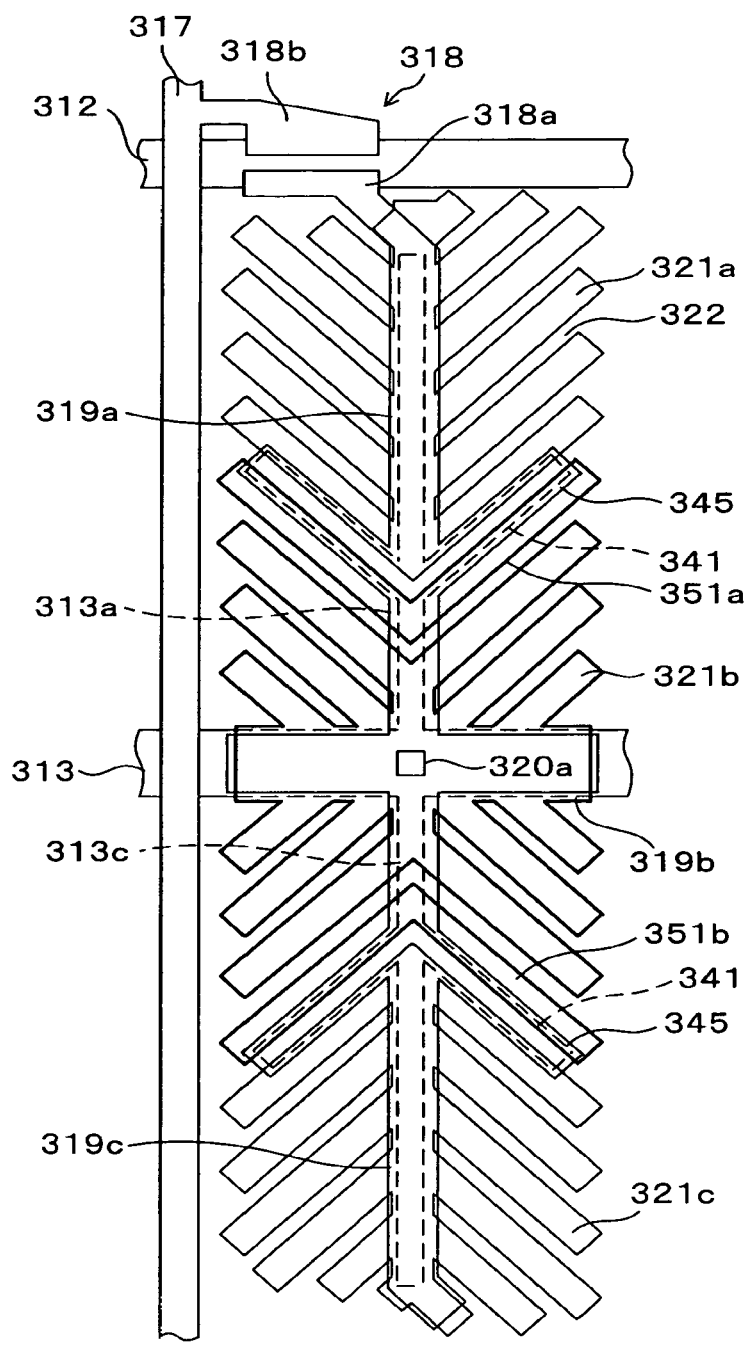
FIG. 21 is a plan view showing a liquid crystal display device according to a ninth embodiment of the present invention.

FIG. 21 is a plan view showing a picture element of a liquid crystal display device according to a ninth embodiment of the present invention. If components and equivalents in FIG. 21 were the same as, or similar to, those in FIG. 18, the components and equivalents in FIG. 21 are denoted by the same reference numerals and symbols as those in FIG. 18 are. Thus, detailed descriptions will be omitted for the same, or similar components and equivalents in FIG. 21.

In the case of this embodiment, a sub picture element electrode 351a is formed between a sub picture element electrode 321b (a directly-connected picture element electrode) and a sub picture element electrode 321a (a capacitively-coupled picture element electrode). A sub picture element electrode 351b is formed between the sub picture element electrode 321b (the directly-connected picture element electrode) and a sub picture element electrode 321c (a capacitively-coupled picture element electrode). The sub picture element electrodes 351a and 351b are formed of ITO, in common with the sub picture element electrodes 321a to 321c. In addition, the sub picture element electrodes 351a and 351b extend in the same direction as microelectrode parts of the sub picture element electrodes 321a to 321c adjacent to the sub picture element electrodes 351a and 351b extend.

A group of an auxiliary capacitance lower electrode 341 and a control electrode 345 is formed in an area between the sub picture element electrode 351a and the sub picture element electrode 321a. The other group of an auxiliary capacitance lower electrode 341 and a control electrode 345 is formed in an area between the sub picture element electrode 351b and the sub picture element electrode 321c. In addition, the sub picture element electrode 351a is capacitively coupled to control electrodes (control electrodes 319a and 345) through a second insulating film. The sub picture element electrode 351b is capacitively coupled to control electrodes (control electrodes 319c and 345) through the second insulating film. In the case of this embodiment, a capacitance between a sub picture element electrode 351 and a corresponding Accordingly, voltage which is larger than that to be applied to the control electrode 321a is applied to the sub picture element electrode 351a. Voltage which is larger than that to be applied to the control electrode 321c is applied to the sub picture element electrode 351b. In other words, in the case of this embodiment, voltage applied to the control electrode 321b is larger than voltage applied to the control electrodes 351a and 351b, which is larger than voltage applied to the control electrodes 321a and 321c.

As described above, in the case of this embodiment, an electric potential difference between neighboring sub picture element electrodes is smaller when the sub picture element electrode 351 is present than when the sub picture element electrode 351 is absent. This further inhibits a dark line from occurring due to an azimuth deviation.

Figure 22:
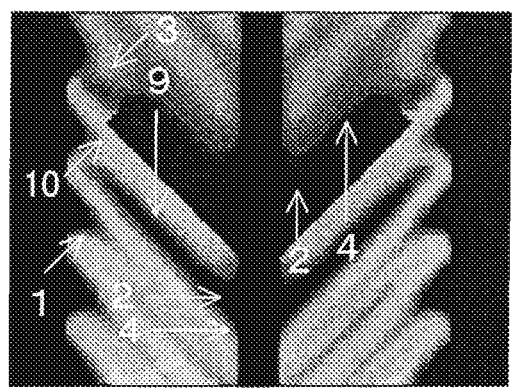
FIG. 22 is a diagram showing transmittance characteristics in the case of the liquid crystal display device according to the ninth embodiment.

FIG. 22 is a diagram showing transmittance characteristics in the case of the liquid crystal display device according to this embodiment. If components and equivalents in FIG. 22 were the same as those in FIG. 19, the components in FIG. 22 are denoted by the same reference numerals as those in FIG. 19 are. Through comparing FIG. 22 and FIG. 19, it is learned that the liquid crystal display device according to this embodiment has a further improved substantial aperture ratio than the liquid crystal display device as shown in FIG. 19.

With regard to the liquid crystal display device according to this embodiment, when the picture element capacitance ratio was converted to a ratio of voltage to be applied to the liquid crystal, the voltage ratio was 0.94. In addition, the liquid crystal display device according to this embodiment was actually manufactured, and its response speed was measured. As a result of the measurement, the response speed was 12 ms.

(Tenth Embodiment)

Hereinbelow, descriptions will be provided for a tenth embodiment of the present invention.

In the case of the liquid crystal display device as shown in FIG. 1, as described above, the alignment of the liquid crystal molecules is put out of order in the base end and the extremity of each of the slits when voltage is applied. This is a cause of deteriorating the substantial aperture ratio. In addition, if each of the microelectrode parts were extended toward a position near the corresponding data bus line, the substantial aperture ratio can be improved.

Figure 23A:
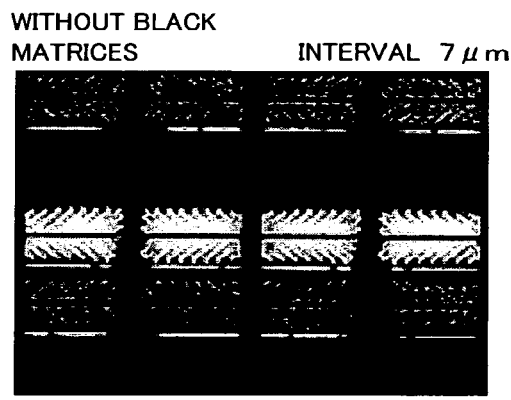
FIGS. 23A and 23B are diagrams respectively showing a light transmission condition to be observed when voltage is applied in the case of a liquid crystal display device (without black matrices) in which an interval between a microelectrode part and a data bus line is 7 μm, and a light transmission condition to be observed when voltage is applied in the case of a liquid crystal display device (without black matrices) in which an interval between a microelectrode part and a data bus line is 5 μm.
Figure 23B:
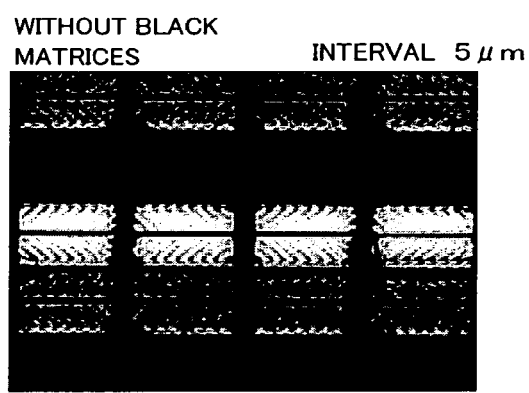
Figure 24A:
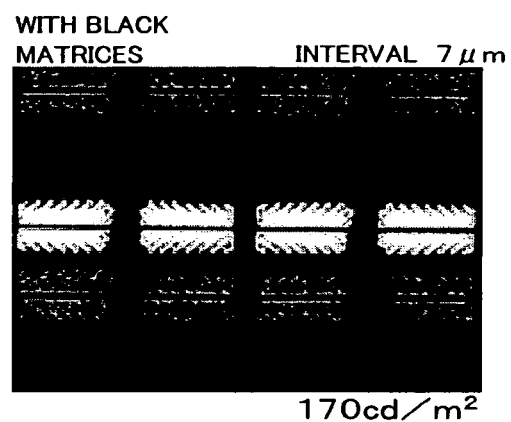
FIGS. 24A and 24B are diagrams respectively showing a light transmission condition to be observed when voltage is applied in the case of a liquid crystal display device (with black matrices) in which an interval between a microelectrode part and a data bus line is 7 μm, and a light transmission condition to be observed when voltage is applied in the case of a liquid crystal display device (with black matrices) in which an interval between a microelectrode part and a data bus line is 5 μm.
Figure 24B:
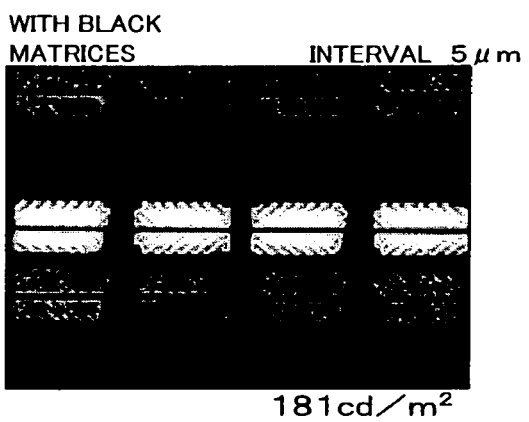

FIGS. 23A and 24A are diagrams respectively showing a light transmission condition to be observed when voltage is applied in the case of a liquid crystal display device in which an interval between a microelectrode part and a data bus line is 7 μm. FIGS. 23B and 24B are diagrams respectively showing a light transmission condition to be observed when voltage is applied in the case of a liquid crystal display device in which an interval between a microelectrode part and a data bus line is 5 µm. FIGS. 23A and 23B are diagrams respectively showing a light transmission condition to be observed when voltage is applied in the case of a liquid crystal display device having no black matrices (BM). FIGS. 24A and 24B are diagrams respectively showing a light transmission condition to be observed when voltage is applied in the case of a liquid crystal display device having black matrices (BM). In each of the liquid crystal display devices, the width of its microelectrode part was 6 µm, and the width of its slit was 3.5 µm.

From each of FIGS. 23A and 23B, it was learned that a dark portion occurred due to alignment disorder of liquid crystal molecules in an end portion of the microelectrode part. In addition, through comparing FIG. 23A with FIG. 23B, it was learned that an area representing the dark portion was smaller when the interval between the microelectrode part and the data bus line was made small. In the case of an actual liquid crystal display device, a space between a microelectrode part and a corresponding data bus line is covered with a black matrix, as shown in FIGS. 24A and 24B. When brightness of the liquid crystal display device as shown in FIG. 24A was measured, it was 170 cd/m$^2$. When brightness of the liquid crystal display device as shown in FIG. 24B was measured, it was 181 cd/m$^2$.

If, as described above, each of the microelectrode parts were extended to a position near the data bus line, and a space between each of the microelectrode parts and the data bus line were covered with the black matrix, the substantial aperture ratio of the liquid crystal display device can be made larger, and the brightness of it can be improved. However, if an interval between each of the microelectrode parts and the data bus line were made further smaller, this causes deterioration in the display quality due to a crosstalk.

FIGS. 25A and 25B are diagrams respectively showing results of examining transition characteristics of two liquid crystal display devices from a time when voltages were applied to their respective liquid crystals till a time when alignment of their respective liquid crystals became stable by use of a high-speed camera. Incidentally, FIG. 25A shows transition characteristics of the liquid crystal display device with linear polarizing plates arranged respectively on the two sides of its liquid crystal panel. FIG. 25B shows transition characteristics of the liquid crystal display device with circular polarizing plates (a linear polarizing plate+a ¼ wavelength plate) arranged respectively on the two sides of its liquid crystal panel. In the case of each of the two liquid crystal display devices, the interval between each of the microelectrode parts and the data bus line was 7 µm, the width of each of the microelectrode parts was 6 µm, and the width of each of the slits was 3.5 µm. In the case of a normal liquid crystal display device, 16.7 ms was one frame.

Through FIGS. 25A and 25B, it was learned that, if the circular polarizing plate were used, the brightness and the response speed were able to be improved. However, the circular polarizing plate is expensive in comparison with the linear polarizing plate. In some cases, the circular polarizing plate may not be used depending on an intended use of the liquid crystal display device. From FIG. 25A, it was learned that it took longer time for liquid crystal molecules in the base end and the extremity of each of the slits to become stable in terms of their alignment.

With this taken into consideration, in the case of this embodiment, the brightness and the response characteristics of the liquid crystal display device is increased by improving the alignment of the liquid crystal molecules in the base end and the extremity of each slits of the picture element electrodes. Detailed descriptions will be provided for the liquid crystal display device according to this embodiment with reference to the below-mentioned examples 1 to 4.

It should be noted that, in the case of each of the following examples, if a film made of a dielectric material were formed so as to have the same shape as each of the slits does, the film may be used instead of the slit. The film made of the dielectric material can control the alignment direction of the liquid crystal molecules in the same manner as the slit can. Accordingly, the film can obtain the same effect as the slit does.

FIRST EXAMPLE

Figure 26:
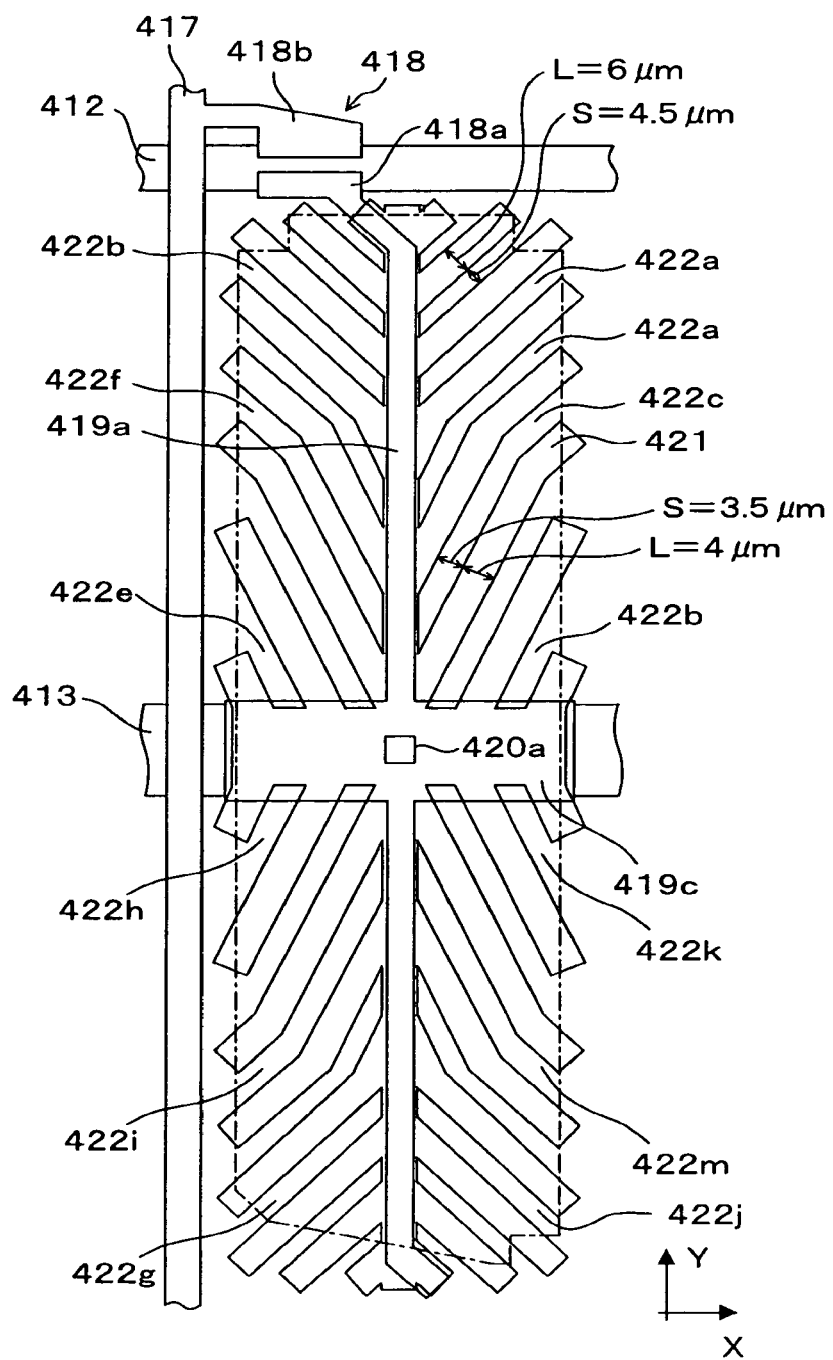
FIG. 26 is a plan view showing a liquid crystal display device according to a first example of a tenth embodiment.

FIG. 26 is a plan view showing a picture element in a liquid crystal display device according to a first example of the tenth embodiment.

A gate bus line 412 extending in the horizontal direction (the X-axis direction) and a data bus line 417 extending in the vertical direction (the Y-axis direction) are formed in a TFT substrate. An auxiliary capacitance bus line 413 is formed so as to be in parallel with the gate bus line 412 in the center of each of the rectangular picture element regions defined by the gate bus lines 412 and the data bus lines 417.

In each of the picture element regions, a TFT 418, a control electrode 419a, an auxiliary capacitance electrode 419c and a picture element electrode 421 are formed.

With regard to the TFT 418, a part of the gate bus line 412 is used as the gate electrode. A drain electrode 418a and a source electrode 418b are arranged so as to be opposite to each other with the gate bus line 412 interposed therebetween. The control electrode 419a is electrically connected with the drain electrode 418a of the TFT 418. In addition, the auxiliary capacitance electrode 419c is formed in a position opposite to the auxiliary capacitance bus line 413 with a first insulating film interposed therebetween, and is electrically connected to the drain electrode 418a of the TFT 418 through the control electrode 419a.

The picture element electrode 421 is formed of a transparent conductive material such as ITO, and is divided into four fields (domain control fields) with a center line in parallel with the X axis and a center line in parallel with the Y axis defined as their boundaries. Alignment directions of liquid crystal molecules respectively of the four fields are different from one field to another. In a first field upper right, formed are slits 422a extending in a direction at an angle of 45 degrees to the X axis, slits 422b extending in a direction at an angle of 65 degrees to the X axis, as well as slits 422c made of a combination of slits extending in a direction at an angle of 45 degrees to the X axis and slits extending in a direction at an angle of 65 degrees to the X axis. In a second field upper left, formed are slits 422d extending in a direction at an angle of 135 degrees to the X axis, slits 422e extending in a direction at an angle of 115 degrees to the X axis, as well as slits 422f made of a combination of slits extending in a direction at an angle of 135 degrees to the X axis and slits extending in a direction at an angle of 115 degrees to the X axis. Furthermore, in a third field lower left, formed are slits 422g extending in a direction at an angle of 225 degrees to the X axis, slits 422h extending in a direction at an angle of 245 degrees to the X axis, as well as slits 422i made of a combination of slits extending in a direction at an angle of 225 degrees to the X axis and slits extending in a direction at an angle of 245 degrees to the X axis. Moreover, in a fourth field lower right, formed are slits 422j extending in a direction at an angle of 315 degrees to the X axis, slits 422k extending in a direction at an angle of 295 degrees to the X axis, as well as slits 422m made of a combination of slits extending in a direction at an angle of 315 degrees to the X axis and slits extending in a direction at an angle of 295 degrees to the X axis.

The picture element electrode 421 is electrically connected to the auxiliary capacitance electrode 419c through a contact hole 420a formed in a second insulating film. The surface of the picture element electrode 421 is covered with a vertical alignment film made of polyimide or the like.

Incidentally, a dot-dashed line in FIG. 26 indicates a position of the edge of a black matrix to be formed in an opposing substrate. The opposing substrate of the liquid crystal display device according to the first example has the same structure as the opposing substrate of the liquid crystal display device according to the first embodiment. For this reason, descriptions will be omitted for the structure of the opposing substrate of the liquid crystal display device according to the first example. In addition, in the case of the liquid crystal display device according to the first example, a liquid crystal layer made of liquid crystal with negative dielectric anisotropy is arranged between the TFT substrate and the opposing substrate. The liquid crystal layer includes a polymer which has been made in the following process. A polymer component (a monomer or an oligomer) is added to the liquid crystal. Then, beams of ultraviolet light are irradiated to the polymer component while voltage is applied to the liquid crystal. Thereby, the polymer component is polymerized into the polymer. This polymer determines directions in which the liquid crystal molecules are aligned when voltage is applied.

In the case of the liquid crystal display device as shown in FIG. 1, for example in the first field, a force which causes the liquid crystal molecules in the vicinity of a connecting electrode part to tilt in a direction (a direction at an angle of 0 degrees) orthogonal to the connecting electrode part is added to the liquid crystal molecules due to a line of electric force generated by the connecting electrode part. The connecting electrode part is arranged along the center line of the picture element electrode, which center line is in parallel with the Y axis. In addition, a force which causes the liquid crystal molecules in the vicinity of the connecting electrode part to tilt in a direction at an angle of 45 degrees to the X axis is added to the liquid crystal molecules due to the slits. As a result, the liquid crystal molecules in the vicinity of the connecting electrode part actually tilt in a direction which makes the two forces balanced against each other. In other words, a direction in which the liquid crystal molecules in the vicinity of the connecting electrode part tilt is a direction at an angle of smaller than 45 degrees to the X axis.

On the other hand, in the case of the liquid crystal display device according to the present example as shown in FIG. 26, for example in the first field, a direction in which each of the slits in the vicinity of the connecting electrode part extends is a direction at an angle of larger than 45 degrees to the X axis. This enables the liquid crystal molecules in the vicinity of the connecting electrode part to tilt in a direction at an angle of approximately 45 degrees. Accordingly, a dark portion is inhibited from occurring in the vicinity of the connecting electrode part, and the transmittance is improved. Furthermore, since the alignment stability of the liquid crystal molecules in the vicinity of the connecting electrode part is improved, the response characteristics are improved.

SECOND EXAMPLE

Figure 27:
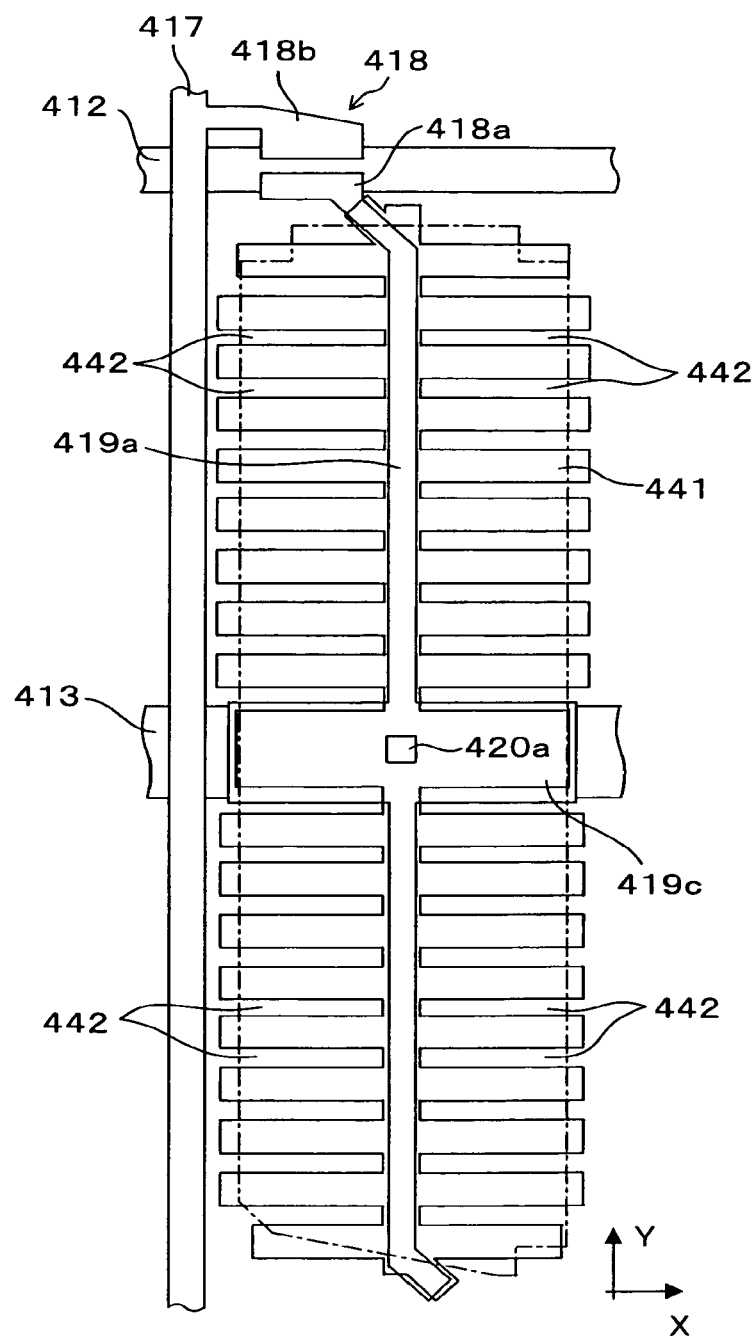
FIG. 27 is a plan view showing a liquid crystal display device according to a second example of the tenth embodiment.

FIG. 27 is a plan view showing a picture element of a liquid crystal display device according to a second example of the tenth embodiment. The liquid crystal display device according to the second example is different from the liquid crystal display device according to the first example as shown in FIG. 26, in that the shape of each of the slits provided to the picture element electrode in the liquid crystal display device according to the second example is different from that in the liquid crystal display device according to the first example. Except for the shape of each of the slits, the liquid crystal display device according to the second example has basically the same constitution as the liquid crystal display device according to the first example. For this reason, if the components and equivalents in FIG. 27 were the same as, or similar to, those in FIG. 26, the components and equivalents in FIG. 27 are denoted by the same reference numerals and symbols as those in FIG. 26 are. Thus, detailed descriptions will be omitted for the same, or similar components and equivalents in FIG. 27.

In the case of the liquid crystal display device according to the second example, a picture element electrode 441 is divided into four fields (domain control fields) with a center line in parallel with the X axis and a center line in parallel with the Y axis defined as their boundaries, as shown in FIG. 27. Each of the fields is provided with slits 442 extending in a direction in parallel with the X axis. When voltage is applied, the liquid crystal molecules in each of the fields are aligned in a direction towards the center of the picture element electrode along the slits 442. In other words, when voltage is applied, the liquid crystal molecules in the upper right and the lower right fields tilt in a direction at an angle of 180 degrees to the X axis, and the liquid crystal molecules in the upper left and the lower left fields tilt in a direction at an angle of 0 degrees to the X axis.

In the case of the liquid crystal display device according to the second example, the number of alignment divisions is two. For this reason, the liquid crystal display device according to the second example has worse viewing angle characteristics than the liquid crystal display device with the four alignment divisions according to the first example. However, a direction in which the liquid crystal molecules near each of the extremities respectively of the slits 442 (near the data bus line) tilt agrees with the direction in which each of the slits 442 extends. This brings about an advantage of avoiding a defect in alignment which would otherwise occur in each of the extremities respectively of the slits 442. Moreover, alignment stability of the liquid crystal molecules in each of the extremities respectively of the slits 442 is improved.

THIRD EXAMPLE

Figure 28:
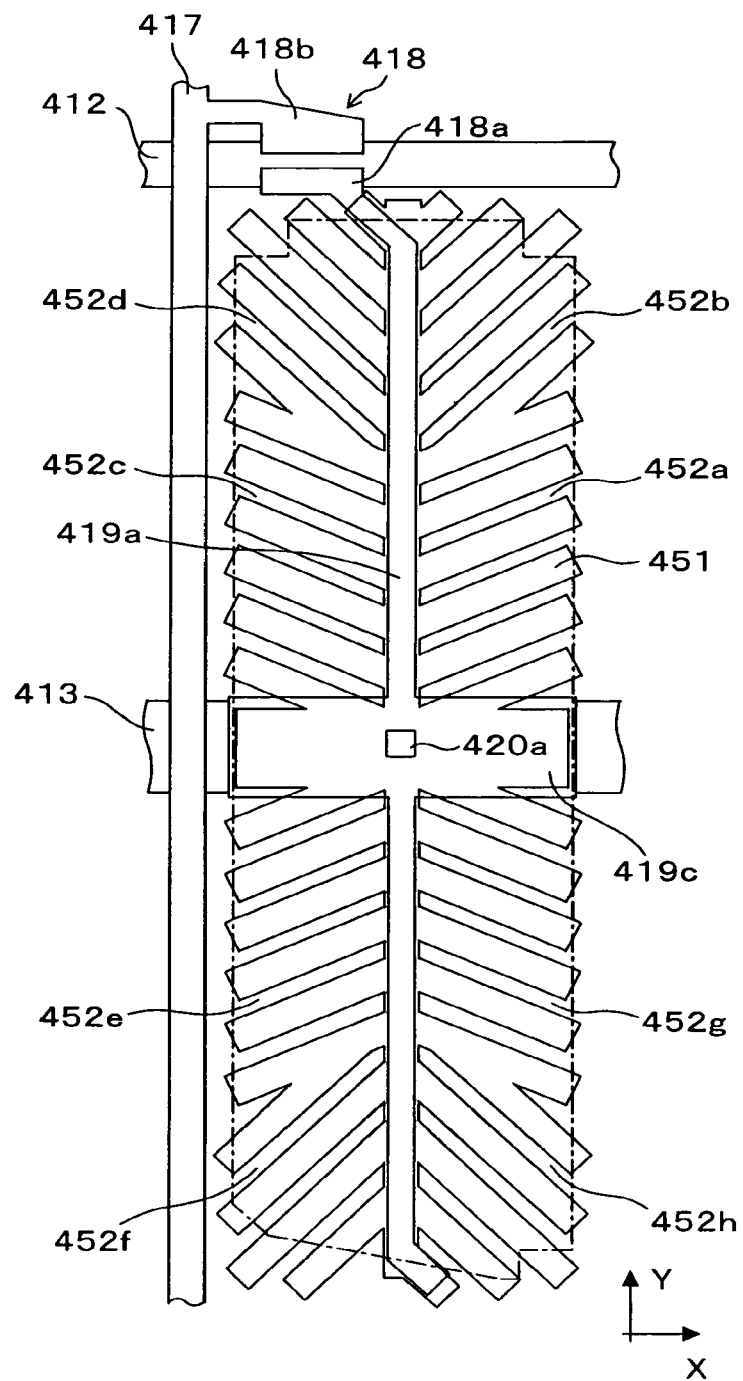
FIG. 28 is a plan view showing a liquid crystal display device according to a third example of the tenth embodiment.

FIG. 28 is a plan view showing a picture element of a liquid crystal display device according to a third example of the tenth embodiment. Incidentally, the liquid crystal display device according to the third example is different from the liquid crystal display device according to the first example as shown in FIG. 26, in that the shape of each of the slits provided to the picture element electrode in the liquid crystal display device according to the third example is different from that in the liquid crystal display device according to the first example. Except for the shape of each of the slits, the liquid crystal display device according to the third example has basically the same constitution as the liquid crystal display device according to the first example. For this reason, if the components and equivalents in FIG. 28 were the same as, or similar to, those in FIG. 26, the components and equivalents in FIG. 28 are denoted by the same reference numerals and symbols as those in FIG. 26 are. Thus, detailed descriptions will be omitted for the same, or similar components and equivalents in FIG. 28.

In the case of the liquid crystal display device according to the third example, a picture element electrode 451 is divided into four fields (domain control fields) with a center line in parallel with the X axis and a center line in parallel with the Y axis defined as their boundaries, as shown in FIG. 28. A first field upper right is provided with slits 452a extending in a direction at an angle of 25 degrees to the X axis and slits 452b extending in a direction at an angle of 45 degrees to the X axis. Furthermore, a second field upper left is provided with slits 452c extending in a direction at an angle of 155 degrees to the X axis and slits 452d extending in a direction at an angle of 135 degrees to the X axis. In addition, a third field lower left is provided with slits 452e extending in a direction at an angle of 205 degrees to the X axis and slits 452f extending in a direction at an angle of 225 degrees to the X axis. Moreover, a fourth field lower right is provided with slits 452g extending in a direction at an angle of 335 degrees to the X axis and slits 452h extending in a direction at an angle of 315 degrees to the X axis.

In the case of the third example, too, one picture element region is divided into four fields (domain control fields) which are different from one another in alignment direction of liquid crystal molecules, by the slits provided to the picture element electrode 451. In addition, each of the fields is provided with slits extending in one of directions respectively at angles of 45 degrees, 135 degrees, 225 degrees and 315 degrees to the X axis, and with slits extending in one of directions respectively at angles of 25 degrees, 155 degrees, 205 degrees and 335 degrees to the X axis. Thereby, a dark portion can be inhibited from occurring in each of the extremities respectively of the slits (near the data bus line) in comparison with the liquid crystal display device shown in FIG. 1.

FOURTH EXAMPLE

Figure 29:
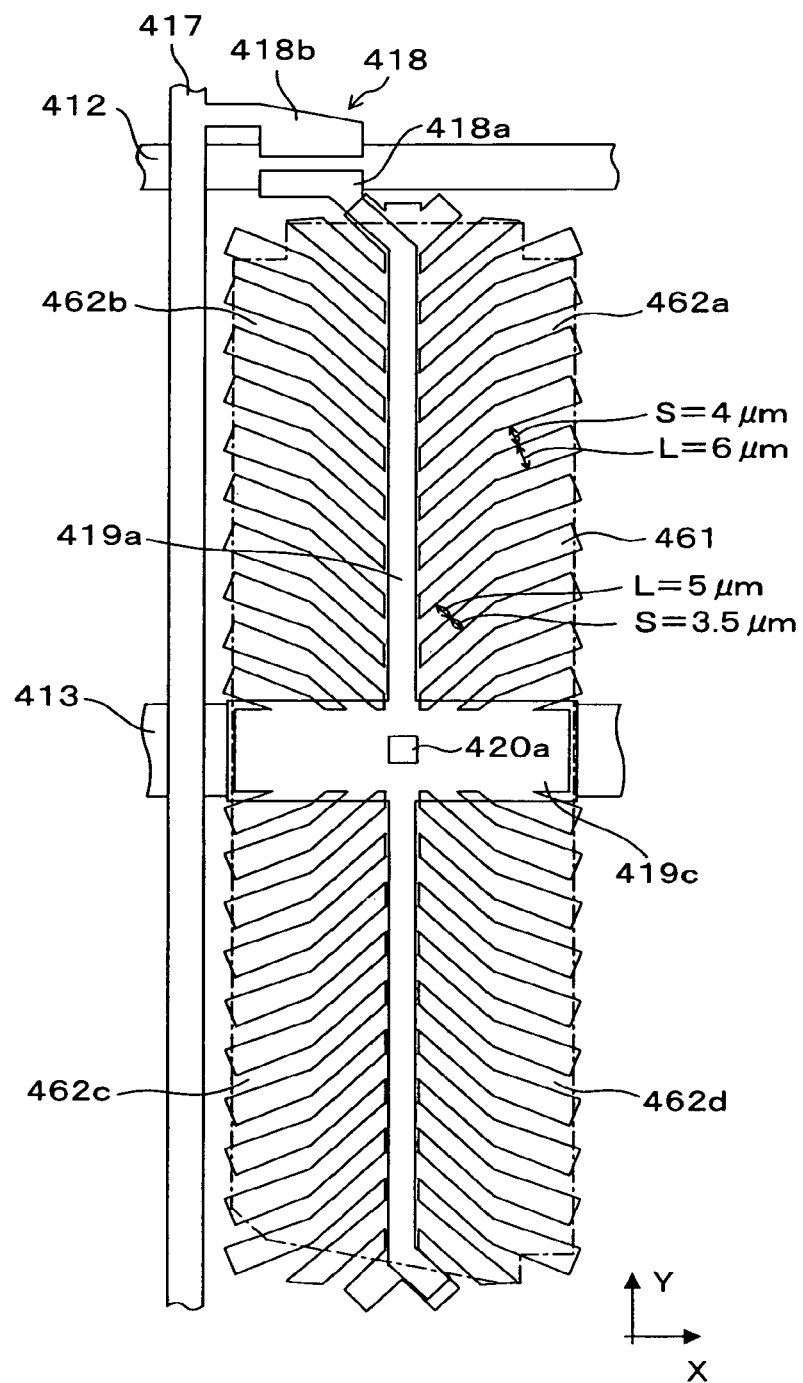
FIG. 29 is a plan view showing a liquid crystal display device according to a fourth example of the tenth embodiment.

FIG. 29 is a plan view showing a picture element of a liquid crystal display device according to a fourth example of the tenth embodiment. Incidentally, the liquid crystal display device according to the fourth example is different from the liquid crystal display device according to the first example as shown in FIG. 26, in that the shape of each of the slits provided to the picture element electrode in the liquid crystal display device according to the fourth example is different from that in the liquid crystal display device according to the first example. Except for the shape of each of the slits, the liquid crystal display device according to the fourth example has basically the same constitution as the liquid crystal display device according to the first example. For this reason, if the components and equivalents in FIG. 29 were the same as, or similar to, those in FIG. 26, the components and equivalents in FIG. 29 are denoted by the same reference numerals and symbols as those in FIG. 26 are. Thus, detailed descriptions will be omitted for the same, or similar components and equivalents in FIG. 29.

In the case of the liquid crystal display device according to the fourth example, too, a picture element electrode 461 is divided into four fields (domain control fields) by a center line in parallel with the X axis and a center line in parallel with the Y axis defined as their boundaries, as shown in FIG. 29. A first field upper right is provided with slits 462a. With regard to each of the slits 462a, its portion near the base end (near the connecting electrode part) extends in a direction at an angle of 60 degrees to the X axis, and its portion near the extremity (near the data bus line) extends in a direction at an angle of 25 degrees to the X axis. In addition, a second field upper left is provided with slits 462b. With regard to each of the slits 462b, its portion near the base end extends in a direction at an angle of 135 degrees to the X axis, and its portion near the extremity extends in a direction at an angle of 155 degrees to the X axis.

Furthermore, a third field lower left is provided with slits 462c. With regard to each of the slits 462c, its portion near the base end extends in a direction at an angle of 225 degrees to the X axis, and its portion near the extremity extends in a direction at an angle of 205 degrees to the X axis. Moreover, a fourth field lower right is provided with slits 462d. With regard to each of the slits 462d, its portion near the base end extends in a direction at an angle of 315 degrees to the X axis, and its portion near the extremity extends in a direction at an angle of 335 degrees to the X axis.

In the case of the fourth example, too, one picture element region is divided into four fields which are different from one another in alignment direction of liquid crystal molecules, by the slits provided to the picture element electrode 461. In addition, the extremity of each of the slits is provided at an angle of approximately 90 degrees to the data bus line 417. Accordingly, a dark portion can be inhibited from occurring in the extremity of each of the slits. Furthermore, the alignment stability of the liquid crystal molecules in the extremity of each of the slits is improved. Moreover, it was proved that, if the width of each of the microelectrode parts near the data bus line were made larger as in the case of the fourth example, this inhibits display unevenness from occurring due to a stepper exposure process to be performed while an ITO film is being patterned.

ELEVENTH EXAMPLE

As described above, if a sub picture element electrode (directly-connected picture element electrode) directly connected to a TFT and a sub picture element electrode (capacitively-coupled picture element electrode) connected to the TFT through capacitive coupling were formed in a single picture element, this can inhibit the display quality from being deteriorated when the screen is viewed in an oblique direction.

Figure 30:
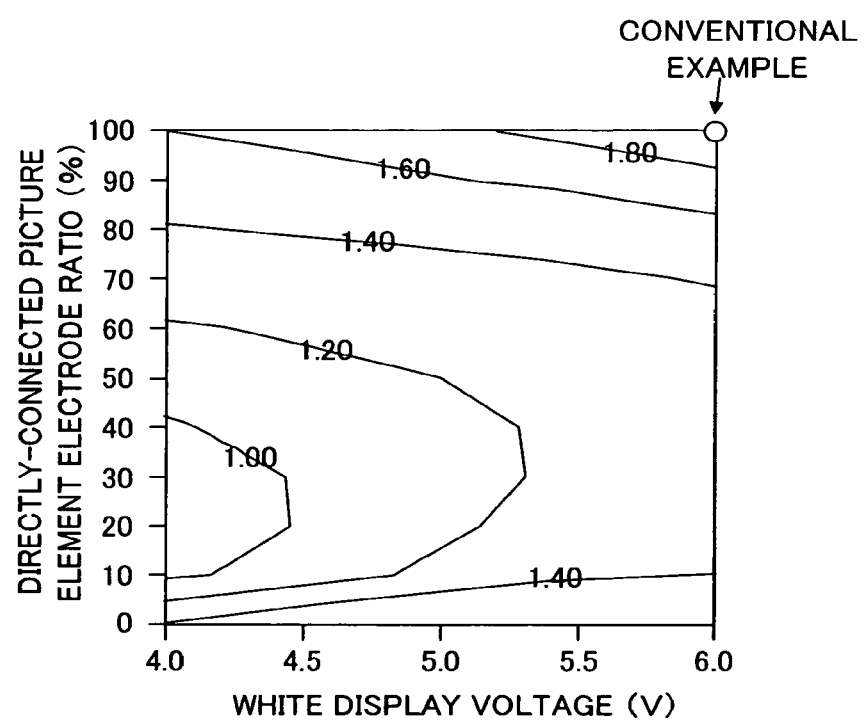
FIG. 30 is a diagram showing relationship among white display voltage, a directly-connected picture element electrode ratio and an amount of difference in gamma values.

FIG. 30 is a diagram showing relationship among white display voltage, a directly-connected picture element electrode ratio and an amount of difference in gamma values, which relationship is observed while the horizontal axis represents the white display voltage, and while the vertical axis represents a ratio of an area of the directly-connected picture element electrode to an area of the entire picture element electrode (the directly-connected picture element electrode ratio). In FIG. 30, if the directly-connected picture element electrode ratio were 0%, this means that the entire picture element electrode is constituted only of the capacitively-coupled picture element electrode. If the directly-connected picture element electrode ratio were 100%, this means that the entire picture element electrode is constituted only of the directly-connected picture element electrode. The amount of difference in gamma values represents an average of differences between the respective gamma values to be observed when the liquid crystal panel is viewed from the front and the respective gamma values to be observed when the liquid crystal panel is viewed in a direction at a polar angle of 60 degrees (in a direction at an angle of 60 degrees to the normal line of the panel). This diagram shows that, the smaller the amount of difference in gamma values is, the better the display quality to be observed when the panel is viewed in an oblique direction is.

In the case of the liquid crystal display device (a conventional example) as shown in FIG. 1, the directly-connected picture element electrode ratio is 100%. For this reason, according to FIG. 30, if the white display voltage were 6V, the amount of difference in gamma values is 2. In addition, according to FIG. 30, if the directly-connected picture element electrode ratio were in a range of 10% to 40% and the white display voltage were 4V, the amount of difference in gamma values is less than or equal to 1. It is learned through this that the display quality to be observed when the liquid crystal panel is viewed in an oblique direction is preferable. In this case, however, the white display voltage is lower, accordingly darkening the screen. In a case where the white display voltage is 6V, if the area ratio of the directly-connected picture element electrode were in a range of 10% to 70%, this enables the display to be brighter. Concurrently, this causes the amount of difference in gamma values to be less than 1.4. Accordingly, a relatively preferable display quality can be maintained even when the panel is viewed in an oblique direction. As a consequence, it is preferable that the area ratio of the directly-connected picture element electrode be in a range of 10% to 70%.

Figure 31:
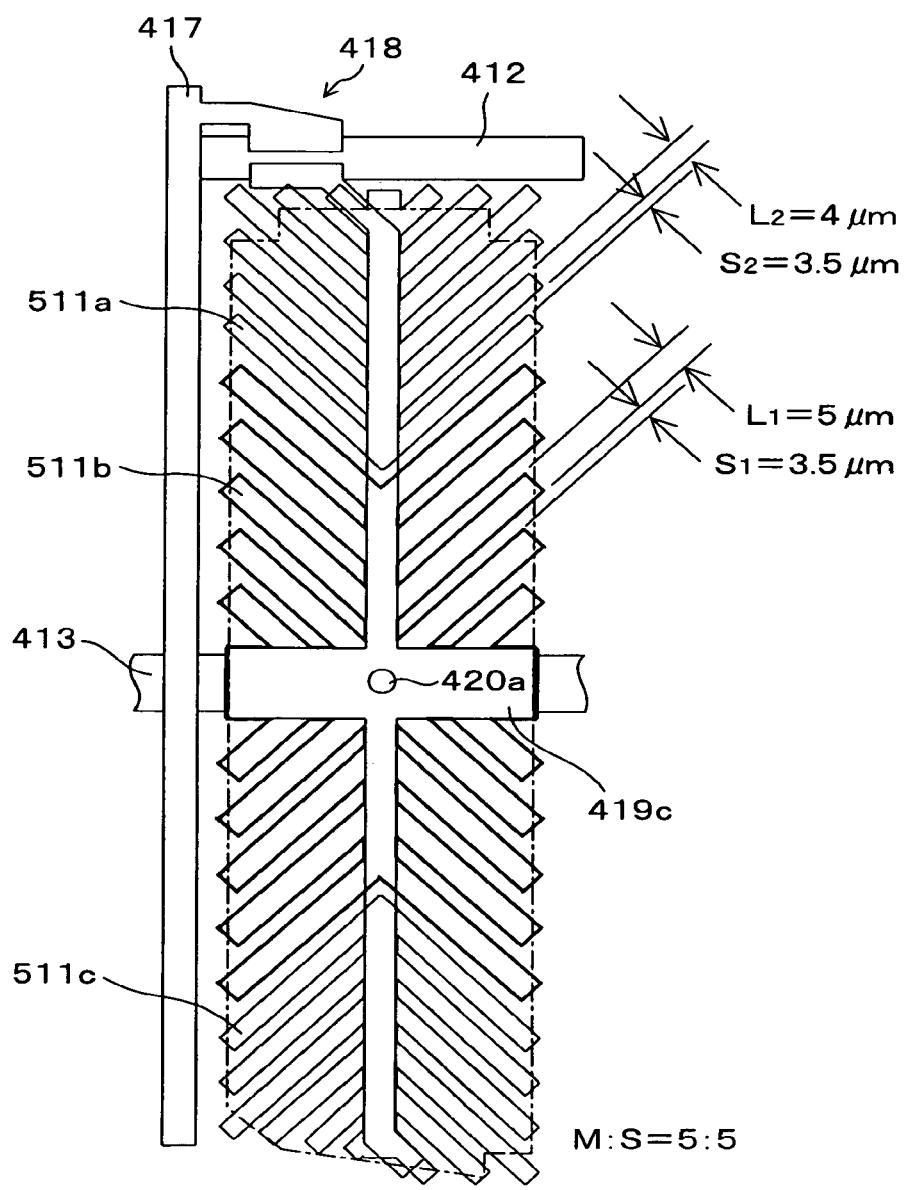
FIG. 31 is a plan view showing a liquid crystal display device (Part 1) according to an eleventh embodiment of the present invention.

FIG. 31 is a plan view showing a liquid crystal display device (Part 1) according to an eleventh embodiment of the present invention. In the case of this liquid crystal display device, the width L1 of each of the microelectrode parts of a directly-connected picture element electrode 511$b$ is 5 µm; the width S1 of each of the slits of the directly-connected picture element electrode 511$b$ is 3.5 µm; the width L2 of each of the microelectrode parts of capacitively-coupled picture element electrodes 511$a$ and 511$c$ is 4 µm; the width S2 of each of the slits of the capacitively-coupled picture element electrodes 511$a$ and 511$c$ is 3.5 µm; and a ratio of an area M of the directly-connected picture element electrode 511$b$ to an area S aggregating areas respectively of the capacitively-coupled picture element electrodes 511$a$ and 511$c$ is 5:5 (i.e. M:S=5:5).

Figure 32:
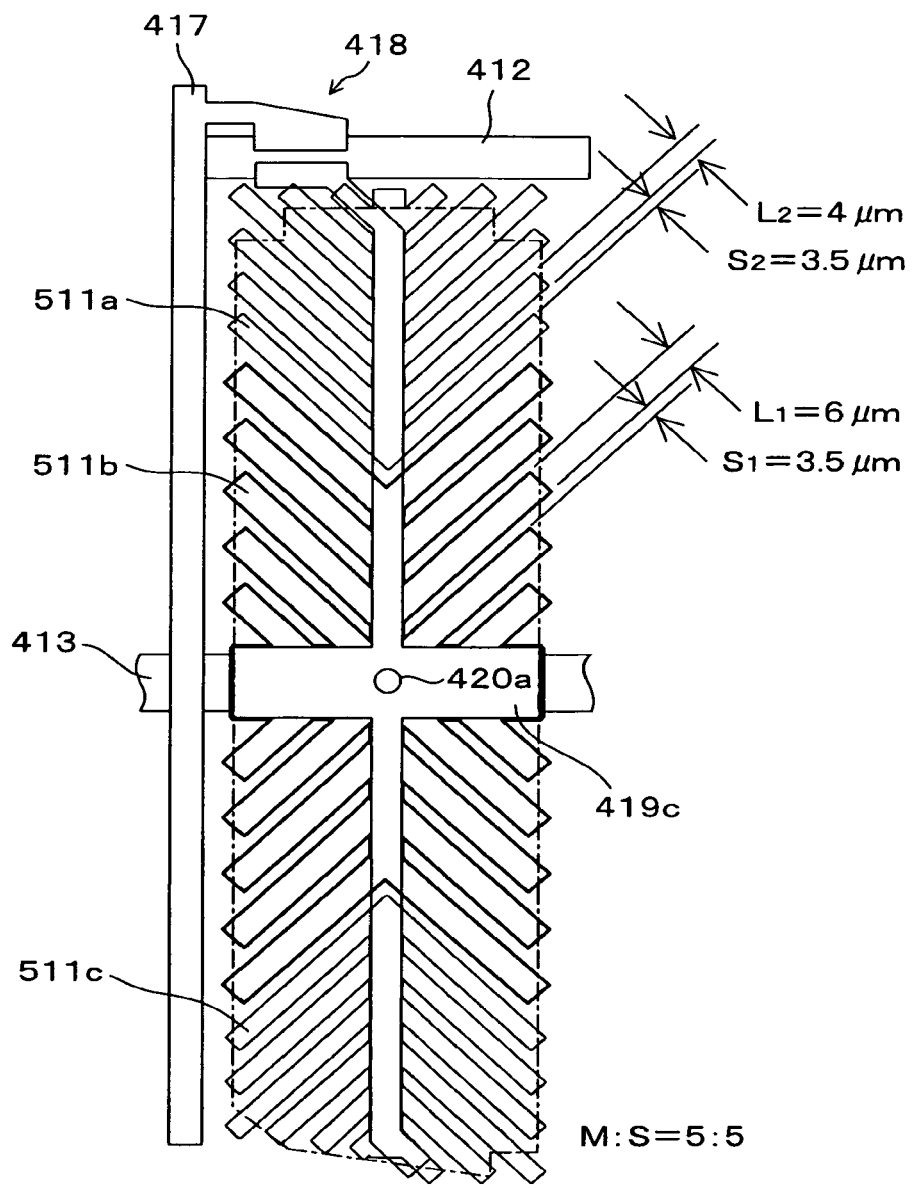
FIG. 32 is a plan view showing the liquid crystal display device (Part 2) according to the eleventh embodiment of the present invention.

FIG. 32 is a plan view showing a liquid crystal display device (Part 2) according to the eleventh embodiment of the present invention. In the case of this liquid crystal display device, the width L1 of each of the microelectrode parts of a directly-connected picture element electrode 511$b$ is 6 µm; the width S1 of each of the slits of the directly-connected picture element electrode 511$b$ is 3.5 µm; the width L2 of each of the microelectrode parts of capacitively-coupled picture element electrodes 511$a$ and 511$c$ is 4 µm; the width S2 of each of the slits of the capacitively-coupled picture element electrodes 511$a$ and 511$c$ is 3.5 µm; and a ratio of an area M of the directly-connected picture element electrode 511$b$ to an area S aggregating areas respectively of the capacitively-coupled picture element electrodes 511$a$ and 511$c$ is 5:5 (i.e. M:S=5:5).

Figure 33:
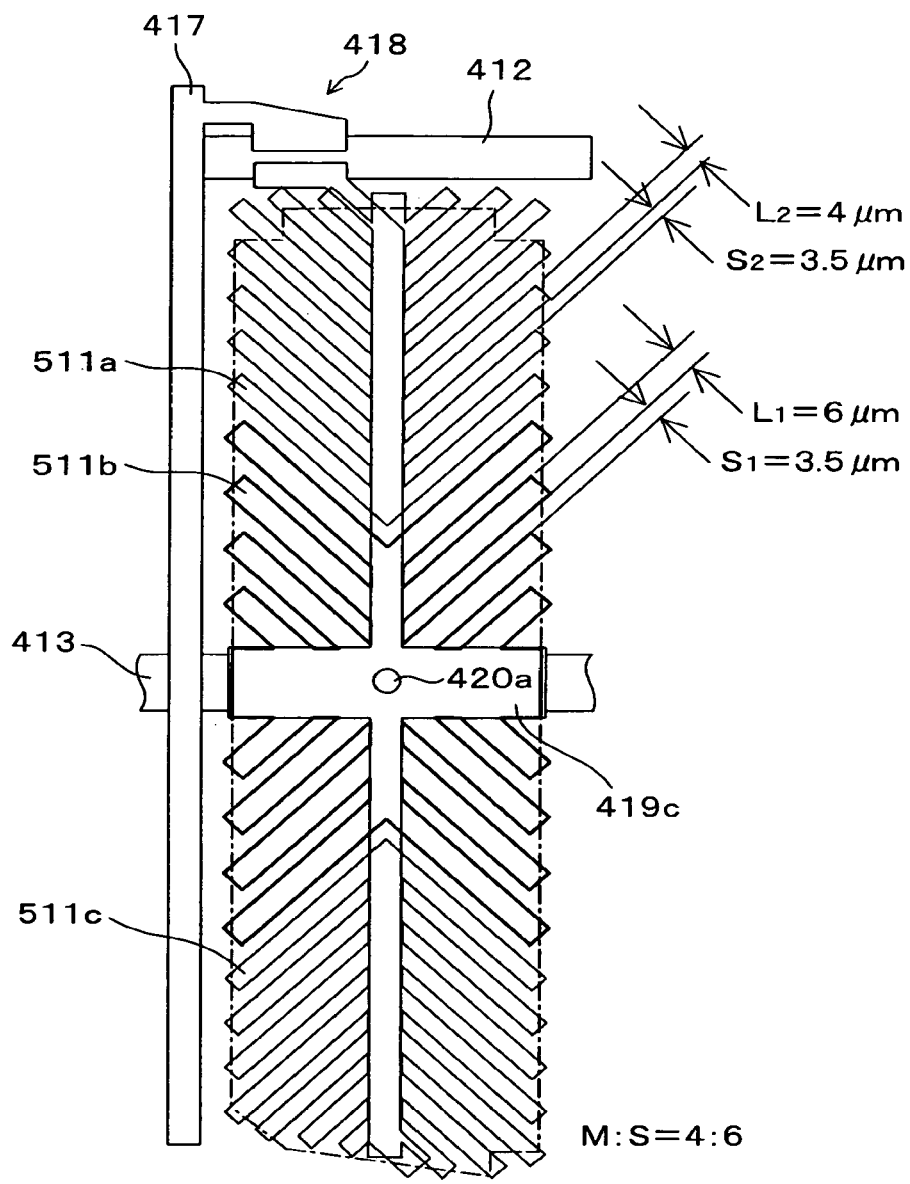
FIG. 33 is a plan view showing the liquid crystal display device (Part 3) according to the eleventh embodiment of the present invention.

FIG. 33 is a plan view showing a liquid crystal display device (Part 3) according to the eleventh embodiment of the present invention. In the case of this liquid crystal display device, the width L1 of each of the microelectrode parts of a directly-connected picture element electrode 511$b$ is 6 µm; the width S1 of each of the slits of the directly-connected picture element electrode 511$b$ is 3.5 µm; the width L2 of each of the microelectrode parts of capacitively-coupled picture element electrodes 511$a$ and 511$c$ is 4 µm; the width S2 of each of the slits of the capacitively-coupled picture element electrodes 511$a$ and 511$c$ is 3.5 µm; and a ratio of an area M of the directly-connected picture element electrode 511$b$ to an area S aggregating areas respectively of the capacitively-coupled picture element electrodes 511$a$ and 511$c$ is 4:6 (i.e. M:S=4:6).

Figure 34:
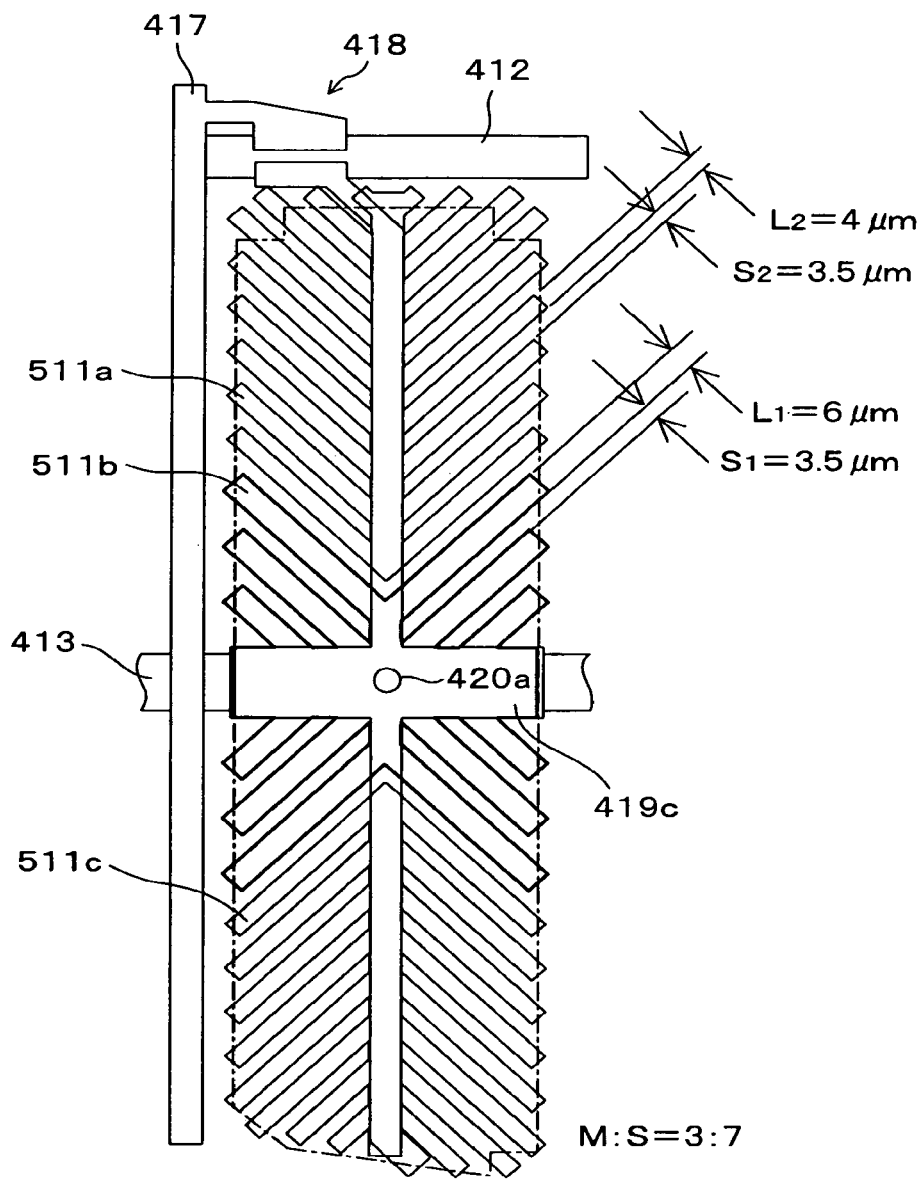
FIG. 34 is a plan view showing the liquid crystal display device (Part 4) according to the eleventh embodiment of the present invention.

FIG. 34 is a plan view showing a liquid crystal display device (Part 4) according to the eleventh embodiment of the present invention. In the case of this liquid crystal display device, the width L1 of each of the microelectrode parts of a directly-connected picture element electrode 511$b$ is 6 µm; the width S1 of each of the slits of the directly-connected picture element electrode 511$b$ is 3.5 µm; the width L2 of each of the microelectrode parts of capacitively-coupled picture element electrodes 511$a$ and 511$c$ is 4 µm; the width S2 of each of the slits of the capacitively-coupled picture element electrodes 511$a$ and 511$c$ is 3.5 µm; and a ratio of an area M of the directly-connected picture element electrode 511$b$ to an area S aggregating areas respectively of the capacitively-coupled picture element electrodes 511$a$ and 511$c$ is 3:7 (i.e. M:S=3:7).

If the width of each of the microelectrode parts were made larger, this can inhibit display unevenness from occurring due to a stepper exposure process to be performed while the ITO film is being patterned. However, this makes weaker a force to control alignment of the liquid crystal molecules. As shown in FIGS. 31 to 34, if the width of each of the microelectrode parts of the directly-connected picture element electrode 511$b$ were made larger, and concurrently if the width of each of the microelectrode parts of the capacitively-coupled picture element electrodes 511$a$ and 511$c$ were made smaller, this can inhibit display unevenness from occurring due to the stepper exposure process while the force to control the alignment of the liquid crystal molecules is being maintained. In addition, if the directly-connected picture element electrode ratio were in a range of 10% to 70%, this makes the amount of difference in gamma values smaller. Accordingly, this improves the display quality to be observed when the screen is viewed in an oblique direction.

With regard to the aforementioned first embodiment (see FIG. 3), descriptions have been provided of the case where the single picture element is provided with the directly-connected picture element electrode and the capacitively-coupled picture element electrodes and accordingly a plurality of fields whose transmittance-applied voltage characteristics (T-V characteristics) are different from each other are formed in the single picture element. If, however, conditions (an intensity and a wavelength of a beam of ultraviolet light, and the like) where the polymer component added to the liquid crystal is polymerized were changed, this also can form, in the single picture element, a plurality of fields whose transmittance-applied voltage characteristics are different from each other.

When the polymer component added to the liquid crystal is intended to be polymerized, conditions under which voltage is applied may be changed for each of a red (R) picture element, a green (G) picture element and a blue (B) picture element, thereby irradiating beams of ultraviolet light. This can uniform the gamma characteristics respectively of the red (R) picture element, the green (G) picture element and the blue (B) picture element. Accordingly, this can realize a liquid crystal display device whose color deviation is extremely little.

In addition, if a single picture element were provided with fields whose monomers are polymerized under conditions different from one field to another, a plurality of fields whose transmittance-applied voltage characteristics are different from one field to another can be formed in the single picture element. Otherwise, if a single picture element were provided with fields which are different from one field to another in surface energy of the substrate surface and thereafter the polymer component added to the liquid crystal is polymerized, a plurality of fields whose transmittance-applied voltage characteristics are different from one field to another can be formed in the single picture element. For example, if a resin film were formed on parts of the substrate, conditions under which the monomer added to the liquid crystal is polymerized can be changed, and the surface energy of the substrate surface can be changed.

Furthermore, if the single picture element were provided with a plurality of types of fields which are different from one another in width of their microelectrode parts and in the width of their slits (a line and a space), the plurality of types of fields whose transmittance-applied voltage characteristics are different from one field to another can be formed in the single picture element.

Furthermore, the polymer component added to the liquid crystal may be polymerized by use of a heating process, although the polymer component added to the liquid crystal according to each of the aforementioned embodiments is polymerized by irradiating beams of ultraviolet light to the polymer component. Otherwise, the polymer component may be polymerized by use of both a process of irradiating beams of ultraviolet light to the polymer component and a process of heating the polymer component.

Moreover, in order to compensate an optical anisotropy of the liquid crystal layer, an optical phase-difference film which has a slow axis in a direction in parallel with the substrate surface (the surface of the liquid crystal panel) may be arranged in the case of each of the aforementioned embodiments.

What is claimed is:

1. A liquid crystal display device comprising:
   a first substrate and a second substrate which are arranged to be opposite to each other;
   liquid crystal with negative dielectric anisotropy contained between the first and second substrates;
   a polymer which determines directions in which liquid crystal molecules tilt;
   a plurality of gate bus lines;
   a plurality of data bus lines; and
   a plurality of picture elements located on the first substrate,
   wherein at least one of the picture elements on the first substrate comprises:
   a switching element;
   a first sub picture element electrode and a second sub picture element electrode being disposed adjacent to the first sub picture element electrode with a gap therebetween,
   wherein the first sub picture element electrode connects to the switching element and the second sub picture element electrode connects, via capacitive coupling, to the switching element,
   wherein the first substrate further comprises a control electrode that is connected to the switching element and the first sub picture element electrode, and further wherein the control electrode is capacitively coupled to the second sub picture element electrode through an insulating film,
   wherein said data bus lines extend perpendicular to said gate bus lines in areas adjacent both said first sub picture element electrode and said second sub picture element electrode,
   wherein the area of the second sub picture element electrode is larger than the area of the first sub picture element electrode,
   wherein at least one of the first and second sub picture element electrodes is divided into at least two regions such that at least two domains of different liquid crystal orientation directions are defined within a single sub picture element;
   wherein a first of the at least two regions and a second of the at least two regions are located in a diagonal manner with respect to each other, and thus are not aligned in either a row direction or a column direction with respect to each other; and
   wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions.

2. The liquid crystal display device of claim 1, the first substrate further comprises a gate bus line, wherein:
   a pair of polarizing plates are arranged on surfaces of the first and the second substrates that are opposite the liquid crystal, and
   an absorption axis of one of the polarizing plates is arranged in parallel with the gate bus line, and an absorption axis of the other of the polarizing plates is arranged in perpendicular with the gate bus line.

3. The liquid crystal display device of claim 1, wherein:
   said plurality of gate bus lines extend in a first direction,
   said plurality of data bus lines extend in a second direction, wherein said second direction is different from said first direction,
   a pair of adjacent ones of gate bus lines and a pair of adjacent ones of said data bus lines define a picture element region that is rectangular in shape, and
   said first sub picture element electrode and said second sub picture element electrode are located within said rectangular picture element region.

4. The liquid crystal display device of claim 1, wherein said control electrode includes a portion that extends in a direction generally parallel to one of the data bus lines.

5. The liquid crystal display device of claim 4, wherein said portion of the control electrode that is generally parallel to one of the data bus lines extends from the switching element at least until the gap between the first and second sub picture electrodes.

6. A liquid crystal display device comprising:
   a first substrate and a second substrate which are arranged to be opposite to each other;
   liquid crystal with negative dielectric anisotropy contained between the first and second substrates;
   a polymer which determines directions in which liquid crystal molecules tilt;
   a plurality of gate bus lines;
   a plurality of data bus lines; and
   a plurality of picture elements located on the first substrate,
   wherein at least one of the picture elements on the first substrate comprises:
   a switching element;
   a first sub picture element electrode and a second sub picture element electrode being disposed adjacent to the first sub picture element electrode with a gap therebetween,
   wherein the first sub picture element electrode connects to the switching element and the second sub picture element electrode connects, via capacitive coupling, to the switching element,
   wherein said data bus lines extend perpendicular to said gate bus lines in areas adjacent both said first sub picture element electrode and said second sub picture element electrode,
   wherein the area of the second sub picture element electrode is larger than the area of the first sub picture element electrode,
   wherein at least one of the first and second sub picture element electrodes is divided into at least two regions such that at least two domains of different liquid crystal orientation directions are defined within a single sub picture element;

wherein a first of the at least two regions and a second of the at least two regions are located in a diagonal manner with respect to each other, and thus are not aligned in either a row direction or a column direction with respect to each other;

wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions; and further comprising a control electrode which is connected to the switching element and the first sub picture element electrode, and which is capacitively coupled to the second sub picture element electrode through an insulating film, which is arranged in a portion opposite to an area along a boundary between the regions of the first sub picture element electrode and the regions of the second sub picture element electrode.

7. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt;
a plurality of gate bus lines;
a plurality of data bus lines; and
a plurality of picture elements located on the first substrate, wherein at least one of the picture elements on the first substrate comprises:
a switching element;
a first sub picture element electrode and a second sub picture element electrode being disposed adjacent to the first sub picture element electrode with a gap therebetween,
wherein the first sub picture element electrode connects to the switching element and the second sub picture element electrode connects, via capacitive coupling, to the switching element,
wherein the first substrate further comprises a control electrode that is connected to the switching element and the first sub picture element electrode, and further wherein the control electrode is capacitively coupled to the second sub picture element electrode through an insulating film,
wherein said data bus lines extend perpendicular to said gate bus lines in areas adjacent both said first sub picture element electrode and said second sub picture element electrode,
wherein the gap extends in the same direction as a storage capacitor bus line or at least one of the gate bus lines,
wherein at least one of the first and second sub picture element electrodes is divided into at least two regions such that at least two domains of different liquid crystal orientation directions are defined within a single sub picture element;
wherein a first of the at least two regions and a second of the at least two regions are located in a diagonal manner with respect to each other, and thus are not aligned in either a row direction or a column direction with respect to each other; and wherein the first region and the second region each include a micro-cutout pattern comprising plurality of cutouts extending in a slanted direction with respect to an edge of the first or second region, respectively, and further wherein the cutouts of the first region and the cutouts of the second region are generally parallel to each other both within each of the regions as well as across the first and second regions.

8. The liquid crystal display device of claim 7, wherein said control electrode includes a portion that extends in a direction generally parallel to one of the data bus lines.

9. The liquid crystal display device of claim 8, wherein said portion of the control electrode that is generally parallel to one of the data bus lines extends from the switching element at least until the gap between the first and second sub picture electrodes.

10. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of picture elements located on the first substrate, wherein at least one of the picture elements on the first substrate comprises:
a switching element;
a first sub picture element electrode and a second sub picture element electrode being disposed adjacent to the first sub picture element electrode with a gap therebetween,
wherein the first sub picture element electrode connects to the switching element and the second sub picture element electrode connects, via capacitive coupling, to the switching element,
wherein at least one of the first and second sub picture element electrodes includes a micro-cutout pattern comprising a plurality of cutouts extending in a slanted direction with respect to an edge of the associated sub picture element electrode, and further wherein the cutouts are generally parallel to each other within the associated sub picture element electrode, and
wherein the gap extends in the same direction as the cutouts adjacent to the gap.

11. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of data bus lines;
a plurality of gate bus lines;
a plurality of picture elements located on the first substrate, wherein at least one of the picture elements on the first substrate comprises:
a switching element;
a first sub picture element electrode and a second sub picture element electrode being disposed adjacent to the first sub picture element electrode with a gap therebetween,
wherein at least one of the first and second sub picture element electrodes is divided into at least two regions such that at least two domains of different liquid crystal orientation directions are defined within a single sub picture element;

wherein a first of the at least two regions and a second of the at least two regions are located in a diagonal manner with respect to each other, and thus are not aligned in either a row direction or a column direction with respect to each other; and wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions, wherein the first sub picture element electrode connects to the switching element and the second sub picture element electrode connects, via capacitive coupling, to the switching element, wherein the first substrate further comprises a control electrode that is connected to the switching element and the first sub picture element electrode, and further wherein the control electrode is capacitively coupled to the second sub picture element electrode through an insulating film, wherein said gate bus lines extend in said row direction, wherein said data bus lines extend in said column direction between adjacent ones of said gate bus lines, and wherein the area of the second sub picture element electrode is larger than the area of the first sub picture element electrode.

12. The liquid crystal display device of claim 11, wherein:
a pair of polarizing plates are arranged on surfaces of the first and the second substrates opposite the liquid crystal, and an absorption axis of one of the polarizing plates is arranged in parallel with at least one of the gate bus lines, and an absorption axis of the other of the polarizing plates is arranged in perpendicular with the at least one gate bus line.

13. The liquid crystal display device of claim 11, the first substrate further comprises a storage capacitor bus line, wherein the gap extends in the same direction as the storage capacitor bus line or at least one of the gate bus lines.

14. The liquid crystal display device of claim 11, wherein:
a pair of adjacent ones of gate bus lines and a pair of adjacent ones of said data bus lines define a picture element region that is rectangular in shape, and
wherein said first sub picture element electrode and said second sub picture element electrode are located within said rectangular picture element region.

15. The liquid crystal display device of claim 11, wherein said control electrode includes a portion that extends in a direction generally parallel to one of the data bus lines.

16. The liquid crystal display device of claim 15, wherein said portion of the control electrode that is generally parallel to one of the data bus lines extends from the switching element at least until the gap between the first and second sub picture electrodes.

17. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of data bus lines;
a plurality of gate bus lines;
a plurality of picture elements located on the first substrate,
wherein at least one of the picture elements on the first substrate comprises:
a switching element;
a first sub picture element electrode and a second sub picture element electrode being disposed adjacent to the first sub picture element electrode with a gap therebetween,
wherein at least one of the first and second sub picture element electrodes is divided into at least two regions such that at least two domains of different liquid crystal orientation directions are defined within a single sub picture element;
wherein a first of the at least two regions and a second of the at least two regions are located in a diagonal manner with respect to each other, and thus are not aligned in either a row direction or a column direction with respect to each other; and
wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions,
wherein the first sub picture element electrode connects to the switching element and the second sub picture element electrode connects, via capacitive coupling, to the switching element,
wherein said gate bus lines extend in said row direction,
wherein said data bus lines extend in said column direction between adjacent ones of said gate bus lines, and
a control electrode which is connected to the switching element and the first sub picture element electrode, and which is capacitively coupled to the second sub picture element electrode through an insulating film, and which is arranged in a portion opposite to an area along a boundary between the regions of the first sub picture element electrode and the regions of the second sub picture element electrode.

18. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of picture elements located on the first substrate,
wherein at least one of the picture elements on the first substrate comprises:
a switching element;
a first sub picture element electrode and a second sub picture element electrode being disposed adjacent to the first sub picture element electrode with a gap therebetween,
wherein at least one of the first and second sub picture element electrodes is divided into at least two regions such that at least two domains of different liquid crystal orientation directions are defined within a single sub picture element;
wherein a first of the at least two regions and a second of the at least two regions are located in a diagonal manner with respect to each other, and thus are not aligned in either a row direction or a column direction with respect to each other; and
wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions wherein the first sub picture element electrode connects to the switching element and the second sub picture element electrode connects, via capacitive coupling, to the switching element, wherein the gap extends in the same direction as the cutouts adjacent to the gap.

19. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of picture elements located on the first substrate, wherein at least one of the picture elements on the first substrate comprises:
a switching element;
a first sub picture element electrode and a second sub picture element electrode being disposed adjacent to the first sub picture element electrode with a gap therebetween,
wherein the first sub picture element electrode connects to the switching element and the second sub picture element electrode connects, via capacitive coupling, to the switching element;
wherein the first substrate further comprises a data bus line;
wherein the first substrate further comprises a control electrode that is connected to the switching element and the first sub picture element electrode, and further wherein the control electrode is capacitively coupled to the second sub picture element electrode through an insulating film,
wherein a pair of polarizing plates are arranged on surfaces of the first and the second substrates that are opposite the liquid crystal, and an absorption axis of one of the polarizing plates is arranged in parallel with the data bus line, and an absorption axis of the other of the polarizing plates is arranged in perpendicular with the data bus line,
wherein the area of the second sub picture element electrode is larger than the area of the first sub picture element electrode,
wherein at least one of the first and second sub picture element electrodes is divided into at least two regions such that at least two domains of different liquid crystal orientation directions are defined within a single sub picture element;
wherein a first of the at least two regions and a second of the at least two regions are located in a diagonal manner with respect to each other, and thus are not aligned in either a row direction or a column direction with respect to each other; and
wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions.

20. The liquid crystal display device of claim 19, wherein said control electrode includes a portion that extends in a direction generally parallel to one of the data bus lines.

21. The liquid crystal display device of claim 20, wherein said portion of the control electrode that is generally parallel to one of the data bus lines extends from the switching element at least until the gap between the first and second sub picture electrodes.

22. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of picture elements located on the first substrate, wherein at least one of the picture elements on the first substrate comprises:
a switching element;
a first sub picture element electrode and a second sub picture element electrode being disposed adjacent to the first sub picture element electrode with a gap therebetween,
wherein the first sub picture element electrode connects to the switching element and the second sub picture element electrode connects, via capacitive coupling, to the switching element;
wherein the first substrate further comprises a data bus line;
wherein a pair of polarizing plates are arranged on surfaces of the first and the second substrates that are opposite the liquid crystal, and an absorption axis of one of the polarizing plates is arranged in parallel with the data bus line, and an absorption axis of the other of the polarizing plates is arranged in perpendicular with the data bus line, and
wherein the area of the second sub picture element electrode is larger than the area of the first sub picture element electrode,
wherein at least one of the first and second sub picture element electrodes is divided into at least two regions such that at least two domains of different liquid crystal orientation directions are defined within a single sub picture element;
wherein a first of the at least two regions and a second of the at least two regions are located in a diagonal manner with respect to each other, and thus are not aligned in either a row direction or a column direction with respect to each other;
wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions; and
further comprising a control electrode which is connected to the switching element and the first sub picture element electrode, and which is capacitively coupled to the second sub picture element electrode through a insulating film, which is arranged in a portion opposite to an area along a boundary between the regions of the first sub picture element electrode and the regions of the second sub picture element electrode.

23. A liquid crystal display device comprising:
a first substrate and a second substrate which are arranged to be opposite to each other;
liquid crystal with negative dielectric anisotropy contained between the first and second substrates;
a polymer which determines directions in which liquid crystal molecules tilt; and
a plurality of picture elements located on the first substrate,
wherein at least one of the picture elements on the first substrate comprises:
a switching element;
a first sub picture element electrode and a second sub picture element electrode being disposed adjacent to the first sub picture element electrode with a gap therebetween,
wherein the first sub picture element electrode connects to the switching element and the second sub picture element electrode connects, via capacitive coupling, to the switching element;
wherein the first substrate further comprises a data bus line;
wherein the first substrate further comprises a control electrode that is connected to the switching element and the first sub picture element electrode, and further wherein the control electrode is capacitively coupled to the second sub picture element electrode through an insulating film,
wherein a pair of polarizing plates are arranged on surfaces of the first and the second substrates that are opposite the liquid crystal, and an absorption axis of one of the polarizing plates is arranged in parallel with the data bus line, and an absorption axis of the other of the polarizing plates is arranged in perpendicular with the data bus line,
the first substrate further comprises a storage capacitor bus line,
the gap extends in the same direction as the storage capacitor bus line,
wherein at least one of the first and second sub picture element electrodes is divided into at least two regions such that at least two domains of different liquid crystal orientation directions are defined within a single sub picture element;
wherein a first of the at least two regions and a second of the at least two regions are located in a diagonal manner with respect to each other, and thus are not aligned in either a row direction or a column direction with respect to each other; and
wherein the first region and the second region each include a micro-cutout pattern comprising a plurality of cutouts extending in a slanted direction with respect to an edge of the first or second region, respectively, and further wherein the cutouts of the first region and the cutouts of the second region are generally parallel to each other both within each of the regions as well as across the first and second regions.

24. The liquid crystal display device of claim 23 wherein said control electrode includes a portion that extends in a direction generally parallel to one of the data bus lines.

25. The liquid crystal display device of claim 24, wherein said portion of the control electrode that is generally parallel to one of the data bus lines extends from the switching element at least until the gap between the first and second sub picture electrodes.

* * * * *